US007425986B2

United States Patent
Kawai et al.

(10) Patent No.: US 7,425,986 B2
(45) Date of Patent: Sep. 16, 2008

(54) CONVERSION APPARATUS FOR IMAGE DATA DELIVERY

(75) Inventors: Tomoaki Kawai, Kanagawa (JP); Yoshio Iizuka, Kanagawa (JP); Takashi Oya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 969 days.

(21) Appl. No.: 10/402,187

(22) Filed: Mar. 27, 2003

(65) Prior Publication Data
US 2003/0206238 A1 Nov. 6, 2003

(30) Foreign Application Priority Data
Mar. 29, 2002 (JP) ............................. 2002-093697
Mar. 29, 2002 (JP) ............................. 2002-093698
Mar. 29, 2002 (JP) ............................. 2002-093994

(51) Int. Cl.
*H04N 5/232* (2006.01)

(52) U.S. Cl. .............................. 348/211.3; 348/231.99; 348/231.3; 348/207.99; 348/207.11; 348/211.99; 348/211.1; 348/14.13; 375/240.25; 455/557

(58) Field of Classification Search ............. 348/211.3, 348/231.99, 231.3, 207.99, 207.1, 207.11, 348/211.99, 211.1, 552, 14.13; 375/240.25; 455/556.2, 557
See application file for complete search history.

(56) References Cited

U.S. PATENT DOCUMENTS

| | | | | |
|---|---|---|---|---|
| 5,479,206 A * | 12/1995 | Ueno et al. | ............... | 348/211.5 |
| 5,548,335 A * | 8/1996 | Mitsuhashi et al. | .......... | 348/373 |
| 5,978,020 A * | 11/1999 | Watanabe et al. | ...... | 348/207.99 |
| 6,133,941 A | 10/2000 | Ono | | |
| 6,408,315 B1 * | 6/2002 | McManus et al. | ........ | 715/500.1 |
| 6,552,743 B1 * | 4/2003 | Rissman | ................... | 348/207.2 |
| 6,556,627 B2 | 4/2003 | Kitamura et al. | | |
| 6,816,837 B1 * | 11/2004 | Davis | ......................... | 704/275 |
| 6,894,727 B2 | 5/2005 | Okada et al. | | |
| 6,903,762 B2 * | 6/2005 | Prabhu et al. | ............ | 348/207.1 |
| 2002/0010756 A1 | 1/2002 | Kazuho | | |
| 2002/0059431 A1 * | 5/2002 | Terada | ......................... | 709/227 |
| 2002/0149695 A1 * | 10/2002 | Kayanuma | ................... | 348/375 |
| 2006/0070105 A1 | 3/2006 | Kawai | | |

FOREIGN PATENT DOCUMENTS

| | | |
|---|---|---|
| CN | 1327340 A | 12/2001 |
| CN | 1336609 | 2/2002 |
| EP | 1 187 488 | 3/2002 |

(Continued)

OTHER PUBLICATIONS

Chinese Office Action, dated May 13, 2005, concerning corresponding Chinese Patent Appln. No. 031214878.

(Continued)

*Primary Examiner*—Tuan Ho
*Assistant Examiner*—Usman Khan
(74) *Attorney, Agent, or Firm*—Morgan & Finnegan, LLP

(57) ABSTRACT

A conversion apparatus is connected to a camera server delivering image information obtained by image sensing to a display operation terminal. When image information is received from the camera server, the conversion apparatus converts the received image information to a format for a portable display terminal, and delivers it to the portable display terminal.

8 Claims, 47 Drawing Sheets

FOREIGN PATENT DOCUMENTS

| | | |
|---|---|---|
| JP | 4-229382 | 8/1992 |
| JP | 8-56326 | 2/1996 |
| JP | 9-326873 | 12/1997 |
| JP | 10-40185 | 2/1998 |
| JP | 10-42278 | 2/1998 |
| JP | 10-93941 | 4/1998 |
| JP | 10-136347 | 5/1998 |
| JP | 11-196404 | 7/1999 |
| JP | 11-305318 | 11/1999 |
| JP | 2000-004435 | 1/2000 |
| JP | 2000-013519 | 1/2000 |
| JP | 2000-188741 | 7/2000 |
| JP | 2000-278771 | 10/2000 |
| JP | 2001-169278 | 6/2001 |
| JP | 2001-169292 | 6/2001 |
| JP | 2001-218194 | 8/2001 |
| JP | 2002-016902 | 1/2002 |
| JP | 2002-027427 | 1/2002 |
| JP | 2002-077839 | 3/2002 |
| KR | A2002-0009114 | 2/2002 |

OTHER PUBLICATIONS

Korean Office Action, dated Sep. 28, 2005.

* cited by examiner

FIG. 7

| ENTRY NUMBER | TIME PERIOD | RANGE OF PTZ VALUES | POSITION OF SUPERIMPOSITION | ADVERTISEMENT FILE |
|---|---|---|---|---|
| 1 | 13:00~18:00 | (10, 30, 1)~(180, −10, 5) | UPPER RIGHT LARGE | file1.jpg |
| 2 | 15:00~20:00 | (10, 30, 1)~(180, −10, 5) | UPPER LEFT SMALL | file2.avi |
| 3 | 10:00~20:00 | (*, *, *)~(*, *, *) | LOWER LEFT MEDIUM | file3.txt |
| ... | ... | ... | ... | ... |

FIG. 11A

| KEY BUTTON | CAMERA CONTROL COMMAND |
|---|---|
| 4+(TWO-DIGIT NUMBER) | REQUEST FOR CHANGE OF LEFT PAN ANGLE |
| 6+(TWO-DIGIT NUMBER) | REQUEST FOR CHANGE OF RIGHT PAN ANGLE |
| 2+(TWO-DIGIT NUMBER) | REQUEST FOR CHANGE OF UPPER TILT ANGLE |
| 8+(TWO-DIGIT NUMBER) | REQUEST FOR CHANGE OF LOWER TILT ANGLE |
| 0+(TWO-DIGIT NUMBER) | REQUEST FOR CHANGE OF ZOOM |
| * | REQUEST FOR CAMERA CONTROL RIGHT |

FIG. 11B

| RESPONSE | RESPONSE SOUND |
|---|---|
| CAMERA CONTROL OK | ANGLE IS ($\theta$, $\phi$) AND ZOOM IS z |
| CAMERA CONTROL NG | CAMERA CONTROL FAILED |
| CONTROL RIGHT OK | CAMERA CONTROL IS NOW POSSIBLE |
| WAIT FOR CONTROL | THE NUMBER OF CLIENTS WAITING FOR CAMERA IS N |
| WAIT FOR CONTROL NG | WAIT FOR CONTROL IS NO LONGER POSSIBLE BECAUSE OF CONGESTION |
| TIMEOUT | CAMERA CONTROL TIMEOUT |

FIG. 13

| CONVERSION SERVER ADDRESS | CAMERA SERVER ADDRESS | PAN | −20 |
|---|---|---|---|

FIG. 14

| PORTABLE DISPLAY TERMINAL IDENTIFIER | DIGITAL SOUND DATA(GSM AMR) |
|---|---|

FIG. 15

| 00000000000 | DIGITAL SOUND DATA(GSM AMR) |

FIG. 18

| CAMERA NUMBER | CAMERA NAME | SOUND OF CAMERA NAME | ADDRESS |
|---|---|---|---|
| 1 | SHINJUKU STATION | "SHINJUKU STATION CAMERA" | 100.20.30.101 |
| 2 | Mt. Fuji | "Mt. Fuji CAMERA" | 100.20.30.102 |
| 3 | HOKKAIDO | "HOKKAIDO CAMERA" | 100.20.30.103 |
| ... | ... | ... | ... |

FIG. 19

| CAMERA SERVER ADDRESS | TIME PERIOD | RANGE OF PTZ VALUES | POSITION OF SUPERIMPOSITION | ADVERTISEMENT FILE |
|---|---|---|---|---|
| 100.20.30.100 | 13:00~18:00 | (10, 30, 1)~(180, -10, 5) | UPPER RIGHT LARGE | file1.jpg |
| 100.20.30.100 | 15:00~20:00 | (10, 30, 1)~(180, -10, 5) | UPPER LEFT SMALL | file2.avi |
| 100.20.30.100 | 10:00~12:00 | (*, *, *)~(*, *, *) | LOWER LEFT MEDIUM | file3.txt |
| 100.20.30.101 | 13:00~18:00 | (10, 30, 1)~(180, -10, 5) | UPPER RIGHT LARGE | file4.jpg |
| 100.20.30.101 | 15:00~20:00 | (10, 30, 1)~(180, -10, 5) | UPPER LEFT SMALL | file5.avi |
| ... | ... | ... | ... | ... |

| IMAGE NUMBER | IMAGE NAME | IP ADDRESS | PORT NUMBER | CAMERA NAME |
|---|---|---|---|---|
| 0 | Akiba1 | xxx.xx.18.38 | xxxx1 | Camera1 |
| 1 | Shibuya1 | xxx.x.20.112 | xxxx2 | Camera1 |
| 2 | Shibuya2 | xxx.x.20.112 | xxxx2 | Camera2 |
| ... | ... | ... | ... | ... |
| 5 | Musako1 | xxx.xxx.2.83 | xxxx3 | Camera1 |

| SOUND NUMBER | SOUND NAME | IP ADDRESS | PORT NUMBER | MICROPHONE/ FILE NAME |
|---|---|---|---|---|
| 0 | Game | xxx.x.xxx.28 | xxxx3 | game.wav |
| 1 | Gourumet | xx.xx.xxx.125 | xxx18 | Mic.1 |
| 2 | Playspot | xxx.x.xxx.95 | xxx32 | play.mp3 |
| ... | ... | ... | ... | ... |
| 6 | Accomo | xxx.x.xxx.8 | xxxx5 | acom.au |

| IMAGE NUMBER | SOUND NUMBER 1 | SOUND NUMBER 2 | ... | SOUND NUMBER N |
|---|---|---|---|---|
| 0 | 2 | N/A | ... | N/A |
| 1 | 0 | 3 | ... | N/A |
| 2 | 5 | 2 | ... | 4 |
| ... | ... | ... | ... | ... |
| 5 | 6 | 1 | ... | 2 |

FIG. 31A

| CONDITION NUMBER | TIME PERIOD | PAN | TILT | ZOOM | AGE | SEX | ATTRIBUTE 1 | ATTRIBUTE 2 |
|---|---|---|---|---|---|---|---|---|
| 0 | 1100-1300 | 10, 40 | -10, 20 | None | None | None | None | None |
| 1 | 0700-0900 | Min, 40 | Min, 0 | 2.0, Max | 18, Max | Both | YYYY | xxxx |
| 2 | 2200-0100 | None | None | 1.0, 2.5 | 18, 25 | Female | None | None |
| 3 | | -50, 30 | 20, 50 | 1.0, 2.5 | 45, 55 | Male | ZZZ | Zzz |
| ... | ... | ... | ... | ... | ... | ... | ... | ... |
| 10 | 1700-2000 | 120, 150 | 10, 50 | Min, 1.5 | all | Both | None | None |

| IMAGE NUMBER | CONDITION | SOUND NUMBER 1 | SOUND NUMBER 2 | ... | SOUND NUMBER N |
|---|---|---|---|---|---|
| 0 | 3 | 2 | N/A | ... | N/A |
| 1 | 1 | 0 | 3 | ... | N/A |
| 2 | None | 5 | 2 | ... | 4 |
| ... | ... | ... | ... | ... | ... |
| 5 | 8 | 6 | 1 | ... | 2 |

282

CONVERSION APPARATUS FOR IMAGE DATA DELIVERY

FIELD OF THE INVENTION

The present invention relates to a technique for altering image data provided from an image sensing apparatus connected to a network and delivering the image data to image display apparatuses.

BACKGROUND OF THE INVENTION

A camera providing a function enabling an image from the camera located at a remote site to be viewed via a network such as internet is disclosed in Japanese Patent Laid-Open No. 10-040185. Hereinafter, such a camera having a networking function is referred to as a camera server apparatus. In the example of conventional technique, an image from the camera server apparatus can be viewed simultaneously at a plurality of terminal apparatuses such as personal computers, and in addition, the pan and/or tilt angles and the zoom ratio of the camera can be controlled from remote locations using a plurality of terminal apparatuses.

In the case where a plurality of terminal apparatuses are allowed to control one camera in such a camera server apparatus system allowing the camera to be controlled, the right to control only one physically available camera should be mediated. For this, if a concept of control right disclosed in Japanese Patent Laid-Open No. 10-042278 is introduced, the user can control the camera only during a period over which he or she has the control right. On the other hand, a technique of superimposing information on an image from this camera server apparatus is disclosed in Japanese Patent Laid-Open No. 11-196404.

In recent years, due to advancement in technology of cellular phones and portable terminals, there arises the possibility that camera images can be viewed and manipulated from the above apparatuses. However, if the image from the camera server apparatus is to be provided not only to the terminal of the personal computer or the like but also to the portable terminal of the cellular phone or the like, the camera server apparatus needs to have two interfaces for both of these terminals because the portable terminal is different from the terminal of the personal computer or the like in image providing scheme, image format and the like. As a result, the cost of the camera server apparatus is increased. Similarly, a dedicated interface for control the camera from the portable terminal should be provided separately on the camera server apparatus side, resulting in increased complexity and cost of the camera server apparatus.

In addition, an advertisement can not be flexibly superimposed on the image on the camera server apparatus that does not have a function to superimpose an advertisement and the like on the image. If the volume of information to be superimposed on the image is considerably high, retaining superimposed information in the camera server apparatus is a function different from the original function for delivering an image, and thus superimposition of information is not feasible in terms of cost. Furthermore, it is impossible in the conventional technique to superimpose advertisement information on an image to be provided to the cellular phone while superimposing no advertisement information on an image to be provided to the conventional terminal, for example.

In addition, the technique in which a camera located at a remote site is controlled via a network to obtain and display an image is characterized in high degree of freedom as to camera control such as pan, tilt, zoom and backlight correction of the camera. In addition, the television conference system in which images and voices at a plurality of sites are sent and received via a network with the image and the voice combined together as a pair is generally used. In addition, the technique in which the image and sound are played back while they are downloaded via a network is called streaming, and the live delivery technique in which the coding, network delivery, reception and playback of the image and sound are performed at a time is used.

As for the matching of the image with voice, an image sensing apparatus outputting the image and sound with camera parameters matched with sound is described in Japanese Patent Laid-Open No. 11-305318. In addition, an apparatus selecting and outputting the image and sound is described in Japanese Patent Laid-Open No. 08-56326. In addition, an example of the television conference system in which a plurality of sites are connected together, and the switching is made between the image and voice to be used is disclosed in Japanese Patent Laid-Open No. 10-93941.

In a so-called web camera in which a camera located at a remote site is controlled via a network, only the image can be obtained, and no sound is obtained in general. On the other hand, the television conference system allows to send/receive the image and voice in addition to camera control, but employs a method in which the image and voice are inputted in the same bidirectional communication apparatus at the same point due to the utilization purpose. In addition, the destination to which the image and voice are communicated is generally specified on purpose by the user of the terminal.

In addition, in the image streaming technique, one image with sound is delivered to numerous receiving apparatuses, and combining of arbitrary image with arbitrary sound is not normally performed. In addition, the previously disclosed apparatus selecting and combining the image and sound cannot combine an image with arbitrary sound on the network.

In addition, the image delivery system continuously delivering the image via a data transmission medium such as internet and intranet has already been popularized in the society, and is used in a variety of fields such as transmission of live images, indoor and outdoor monitoring and observation of animals and plants.

These image delivery systems use image delivery servers for delivering images, and many of the image delivery servers employ the JPEG coding mode (international standard image coding mode defined by ISO/IEC 10918) as an image coding mode.

On the other hand, coded image data conforming to the JPEG coding mode (JPEG coded data) sent from the image delivery server is received by a client terminal, and is decoded and then displayed on the screen. Since many of currently popularized PCs (personal computers) and PDAs (personal data assistants) have a function for decoding JPEG coded data as a standard function, the PC and PDA are used as client terminals.

In recent years, the cellular phone has sprung into wide use, and for the portable terminal used in Japan, the cellular phone surpasses the notebook PC and PDA in penetration rate. In addition, the function of the cellular phone has been rapidly improved, and the cellular phone compatible with the third generation communication mode recently commercialized in Japan is provided as a standard function with a function for decoding coded data (MPEG4 coded data) conforming to the MPEG4 coding mode (international standard voice and image coding mode defined by ISO/IEC 14496). However, the cellular phone is not normally provided with a function for decoding JPEG coded data, and it is therefore impossible to directly send JPEG coded data from the image delivery server to the cellular phone.

For solving this problem, two methods are presented. The first method is a method in which the image delivery server is modified so that MPEG4 coded data can be sent. In this method, however, the existing image delivery server should be replaced with a new image delivery server, and thus the cost for the replacement is considerably increased in proportion to the number of image delivery servers to be installed.

The second method is a method in which a relay server is installed at some midpoint in the communication path between the image delivery server and the cellular phone, and JPEG coded data is converted into MPEG4 coded data by this relay server. The advantage of this method is that a plurality of image delivery servers are connected to one relay server, whereby the number of relay servers to be installed can significantly be reduced, and thus the cost for installation is significantly reduced.

However, the method in which the relay server is installed has a disadvantage. That is, since the image size normally decodable by the cellular phone is the QCIF (Quarter CIF) size (lateral: 176 pixels; longitudinal: 144 pixels) while the image size normally dealt with by the conventional image delivery server is the QVGA (Quarter VGA) size (lateral: 320 pixels; longitudinal: 240 pixels) or 1/16 VGA size (lateral: 160 pixels; longitudinal: 120 pixels), JPEG coded data of the QVGA size or 1/16 VGA size must be converted into MPEG4 coded data of the QCIF size, and the image quality may be degraded due to this conversion of coded data.

For example, the conventional method of converting the resolution of JPEG coded data is such that as disclosed in Japanese Patent Laid-Open No. 4-229382, the image size is reduced by a factor of laterally m/8 and longitudinally n/8 (m and n are each an integer number equal to or greater than 1 and equal to or smaller than 7) by taking out only lower coefficient components from orthogonal conversion data in one block obtained during processing of JPEG image decoding and subjecting them to inverse orthogonal conversion. However, conversion from the QVGA size to the QCIF size results in laterally 0.55 times (4.4/8 times) and longitudinally 0.6 times (4.8/8 times), and conversion from the 1/16 VGA size to the QCIF size results in laterally 1.1 times (8.8/8 times) and longitudinally 1.2 times (9.6/8 times). Thus, m nor n is an integer number, and it is thus impossible to perform conversion from the QVGA size or 1/16 VGA size to the QCIF size.

In addition, conventional general methods of converting the image resolution include a method in which the image is thinned out by taking pixels in a fixed ratio (scaledown), a method in which same pixels are repeatedly inserted (scaleup), and a method in which the weighted average value of a plurality of neighboring pixels is calculated to generate a new pixel value. These methods allow the image size to be converted in any ratio. However, these conventional methods have problems described below with reference to FIGS. 44 to 47.

FIG. 44 shows the correspondence between image areas before and after the QVGA size image is converted into the QCIF size image by the conventional technique. As shown in this figure, an image area of laterally 320 pixels and longitudinally 240 pixels is scaled down to an image area of laterally 176 pixels and longitudinally 144 pixels. It corresponds to a conversion factor of laterally 0.55 times (4.4/8 times) and longitudinally 0.6 times (4.8/8 times) as described previously.

FIG. 45 illustrates the shifting of block border lines caused by the conversion of image size in FIG. 44. In this figure, solid lines show positions of border lines laterally spaced by 8 pixels and longitudinally spaced by 8 pixels, and dotted lines show positions of border lines laterally spaced by 4.4 (=8× 0.55) pixels and longitudinally spaced by 4.8 (=8×0.6) pixels. That is, positions of block border lines in the image before conversion are shifted from positions shown by solid lines to positions shown by dotted lines due to the conversion of image size in FIG. 44. Then, the image after conversion is divided again along block border lines in positions shown by solid lines, and is subjected to MPEG4 image coding, and therefore the image obtained after being subjected to MPEG4 image decoding has block border lines in both positions shown by dotted lines and solid lines.

Block border lines in positions shown by dotted lines are created at the time of coding the image by JPEG coding in the image delivery server, and block deformations become more noticeable in positions shown by dotted lines as the compression rate of JPEG coding is increased. In addition, block border lines in positions shown by solid lines are created at the time of coding the image by MPEG4 image coding in the relay server, and block deformations also becomes more noticeable in positions shown by solid lines as the compression rate of MPEG4 image coding is increased.

The communication traffic between the image delivery server and the cellular phone is currently several tens to several hundreds kilobits per second, which is insufficient for transmitting a moving image to move smoothly, and therefore the compression rate of the image is normally set to a high level. Thus, block deformations appear plainly in both positions shown by dotted lines and solid lines shown in FIG. 45, and consequently the quality of images viewed by the user of the cellular phone is significantly reduced.

FIG. 46 shows the correspondence between image areas before and after the 1/16 VGA size image is converted into the QCIF size image by the conventional technique. As shown in this figure, an image area of laterally 160 pixels and longitudinally 120 pixels is scaled up to an image area of laterally 176 pixels and longitudinally 144 pixels. It corresponds to a conversion factor of laterally 1.1 times (8.8/8 times) and longitudinally 1.2 times (9.6/8 times) as described previously.

FIG. 47 illustrates the shifting of block border lines caused by the conversion of image size in FIG. 46. In this figure, solid lines show positions of border lines laterally spaced by 8 pixels and longitudinally spaced by 8 pixels, and dotted lines show positions of border lines laterally spaced by 8.8 (=8× 1.1) pixels and longitudinally spaced by 9.6 (=8×1.2) pixels. That is, positions of block border lines existing in the image before conversion are shifted from positions shown by solid lines to positions shown by dotted lines due to the conversion of image size in FIG. 46. Then, the image after conversion is divided again along block border lines in positions shown by solid lines, and is subjected to MPEG4 image coding, and therefore the image obtained after being subjected to MPEG4 image decoding has block border lines in both positions shown by dotted lines and solid lines.

That is, in the case of the 1/16 VGA size image, block deformations occur in both positions shown by dotted lines and solid lines, and consequently the quality of images viewed by the user of the cellular phone is significantly reduced.

SUMMARY OF THE INVENTION

The present invention has been made in consideration of the above situation, and has as its first object to eliminate the necessity to additionally provide an interface in a camera server apparatus to communicate with a portable terminal and the like, thus making it possible to avoid an increase in the cost of the camera server apparatus.

The second object is to eliminate the necessity to additionally provide a dedicated interface for controlling the camera server apparatus, thus avoiding an increase in the cost of the camera server apparatus.

The third object is to provide no redundant functions such as information superimposition processing in the camera server apparatus, thus avoiding an increase in the cost of the camera server apparatus while realizing superimposition of information on an image provided from the camera server apparatus.

According to the present invention, the foregoing first object is attained by providing an image processing apparatus comprising: an image information reception unit adapted to receive image information obtained by sensing from an image sensing apparatus capable of delivering the image information to a first image display apparatus; and an image information delivering unit adapted to convert the image information received by the image information reception unit to a format for a second image display apparatus different in type from the first image display apparatus, and deliver the converted image information to the second display apparatus.

The fourth object is to make it possible to code image data and sound data existing at different locations on a network as an image with sound and send the same to a receiving apparatus in a system in which a camera located at a remote site is controlled via the network to obtain an image.

According to the present invention, the foregoing fourth object is attained by providing an information delivery apparatus comprising: an image data reception unit adapted to receive image data from a plurality of image sending apparatuses capable of sending the image data; a sound data reception unit adapted to receive sound data from a plurality of sound sending apparatuses; a coding unit adapted to selectively combine the image data received by the image data reception unit with the sound data received by the sound data reception unit, and code the combined data as image data with sound; and a delivering unit adapted to deliver the image data with sound generated by the coding unit to a receiving apparatus.

The fifth object is to minimize reduction of image quality due to conversion, particularly an apparent increase in block deformation when coded data sent from an image delivery server is converted to a different data format by a relay server.

According to the present invention, the foregoing fifth object is also attained by providing a conversion processing method in which image data of a first size coded by a first coding method in which data is divided into first blocks and coded is converted into image data of a second size coded by a second coding method in which data is divided in second blocks and coded, comprising: clipping image data equivalent to the second size from image data of the first size along a borderline of the first block, and coding the clipped image data equivalent to the second size by the second coding method.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 shows a database configuration of an advertisement server apparatus according to the first embodiment of the present invention;

FIGS. 11A and 11B show correspondence tables between key buttons and camera control commands and between responses from the camera server apparatus and response sounds played back in the portable display terminal according to the first embodiment of the present invention;

FIG. 13 shows a data format of the camera control command according to the first embodiment of the present invention;

FIG. 14 shows a format of sound data exchanged between a delivery server apparatus and the conversion server apparatus according to the first embodiment of the present invention;

FIG. 15 shows a data format of sound data exchanged between the delivery server apparatus and the conversion server apparatus according to the first embodiment of the present invention;

FIG. 18 shows a correspondence table of camera numbers-camera names-camera addresses according to the second embodiment of the present invention;

FIG. 19 is a configuration of an advertisement information table according to a third embodiment of the present invention;

FIGS. 26A to 26C show table configurations for the relay server to manage image information, sound information and image-sound correspondences according to the sixth embodiment of the present invention;

FIGS. 31A and 31B show table configurations for the relay server to manage condition information and image-sound correspondences according to a seventh embodiment of the present invention;

DETAILED DESCRIPTION OF THE PREFERRED EMBODIMENTS

Preferred embodiments of the present invention will be described in detail in accordance with the accompanying drawings.

First Embodiment

The first embodiment is aimed at realizing superimposition of information. such as an advertisement on an image captured by a camera server apparatus, capable of being remote-controlled, in a conversion server apparatus during delivery, delivering of the image to a portable display terminal, and camera control from the portable display terminal.

Figure 1:
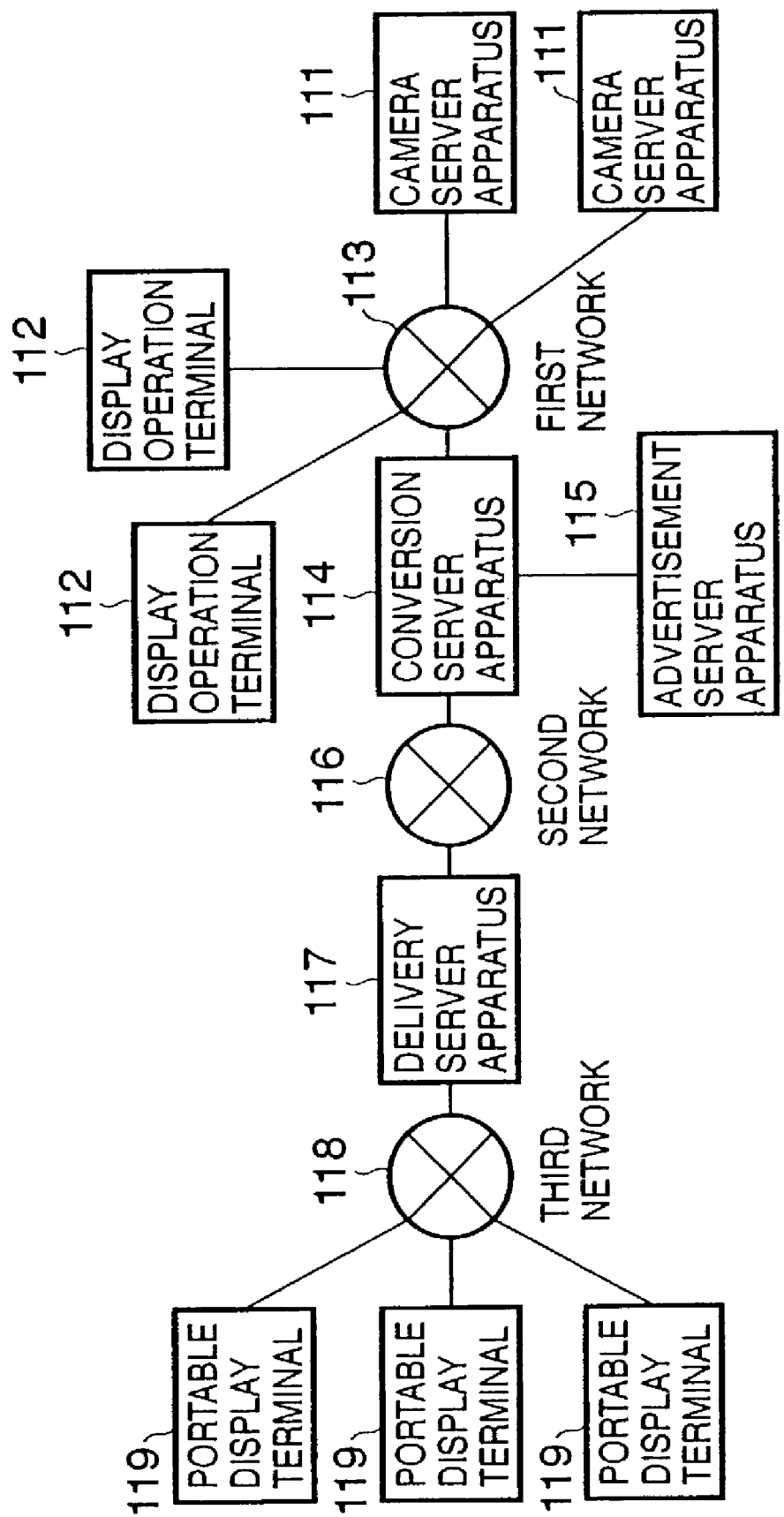
FIG. 1 is a schematic diagram showing a physical configuration of an information delivery system according to a first embodiment of the present invention.

FIG. 1 is a schematic diagram of a physical configuration of an image delivery system according to the first embodiment. As shown in FIG. 1, the image delivery system is constituted by a camera server apparatus system consisting of a camera server apparatus 111, a display operation terminal 112 and a first network 113, and a conversion server apparatus 114, an advertisement server apparatus 115, a second network 116, a delivery server apparatus 117, a third network 118 and a portable display terminal 119.

In the camera server apparatus system, the address of the camera server apparatus 111 is designated from the operation display terminal 112 via the first network 113 to establish connection to obtain a real-time image sensed by the camera server apparatus 111, and a camera control right is obtained to perform camera control as necessary. A plurality of display operation terminals 112 and camera server apparatuses 111 may exist as long as they can be identified on the network.

Figure 2:
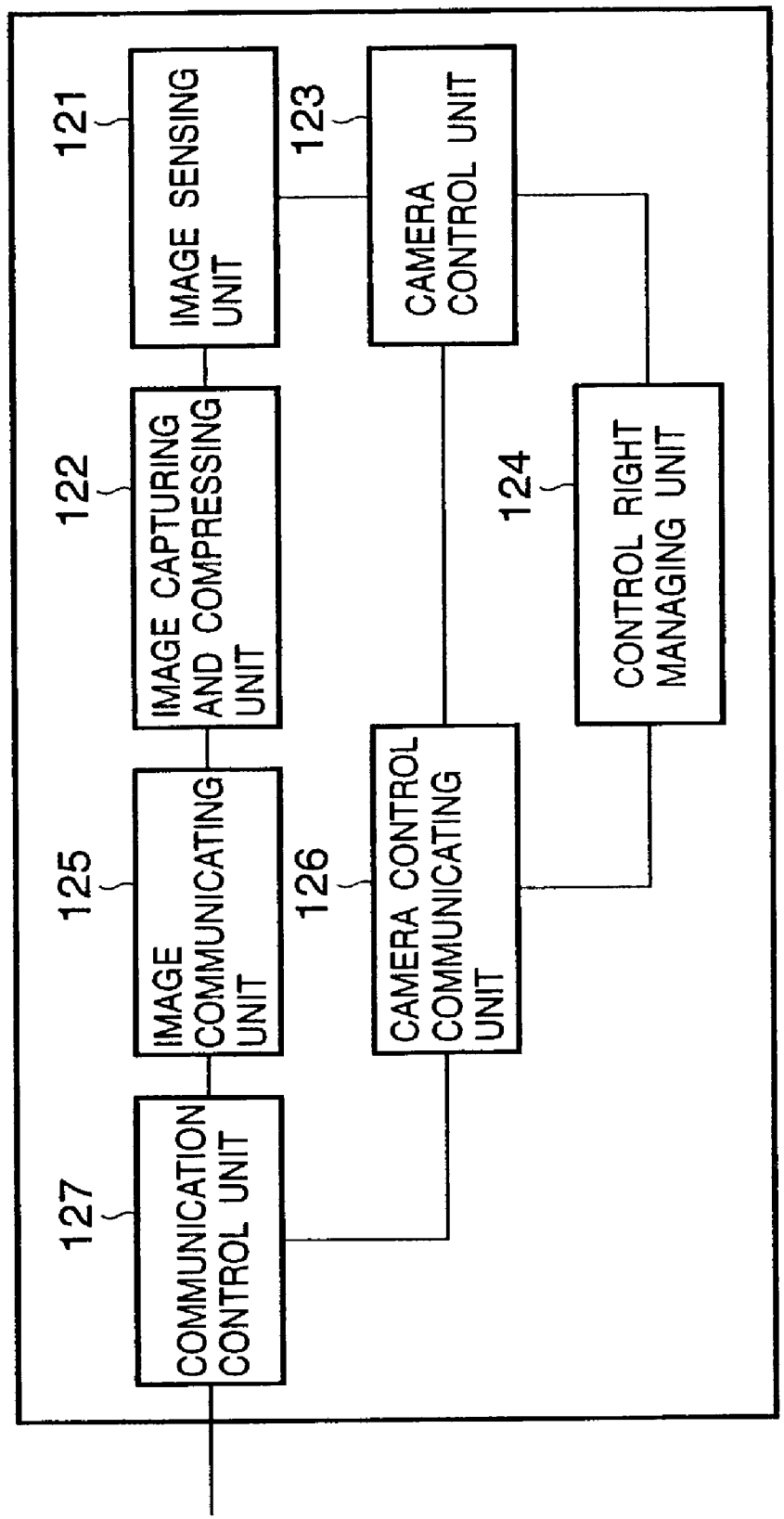
FIG. 2 is a block diagram showing a configuration of a camera server apparatus according to the first embodiment of the present invention.

FIG. 2 is a block diagram showing a configuration of the camera server apparatus 111, wherein an image sensed by an image sensing unit 121, namely a camera, is captured as digital data by an image capturing and compressing unit 122 to generate a compressed image of Motion JPEG format, and the image is delivered to the display operation terminal making a request for connection by an image communicating unit 125. If the request for connection is made from a plurality of display operation terminals, the image is delivered to a plurality of display operation terminals at a time. In addition, the display operation terminal acquiring the right to control the camera (camera control right) can issue a camera control command to a camera control unit 123 to perform camera control of pan, tilt, zoom and the like. A camera control communicating unit 126 generates and interprets such a camera control command and controls a response. A control right managing unit 124 manages information associated with control right, such as an amount of remaining time over which the display operation terminal currently owning the control right can control the image sensing unit 121, the list of display operation terminals making a request for the control right, and a priority. A communication control unit 127 controls the communication between the image communicating unit 125 and the camera control communicating unit 126, and the outside.

Figure 3:
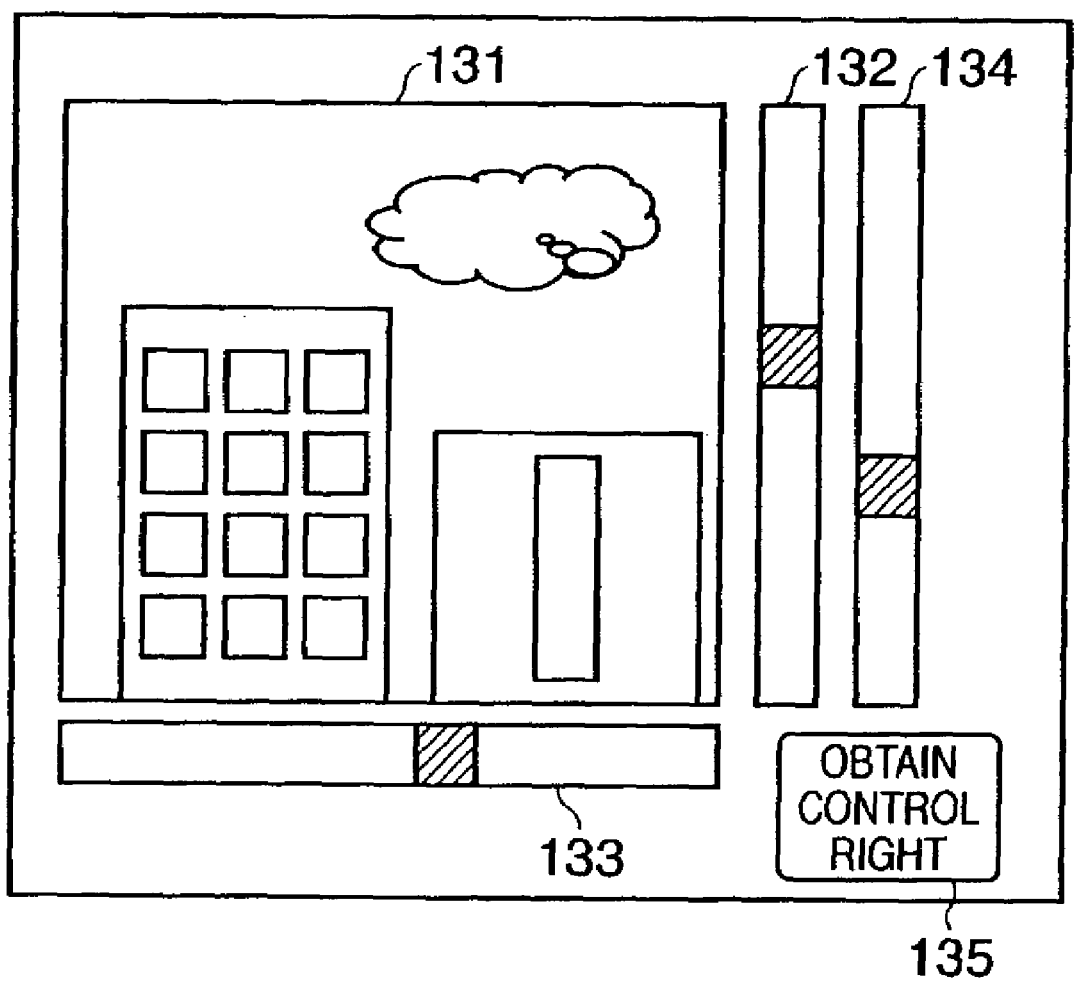
FIG. 3 shows one example of a user interface screen in a display operation terminal.
Figure 9:
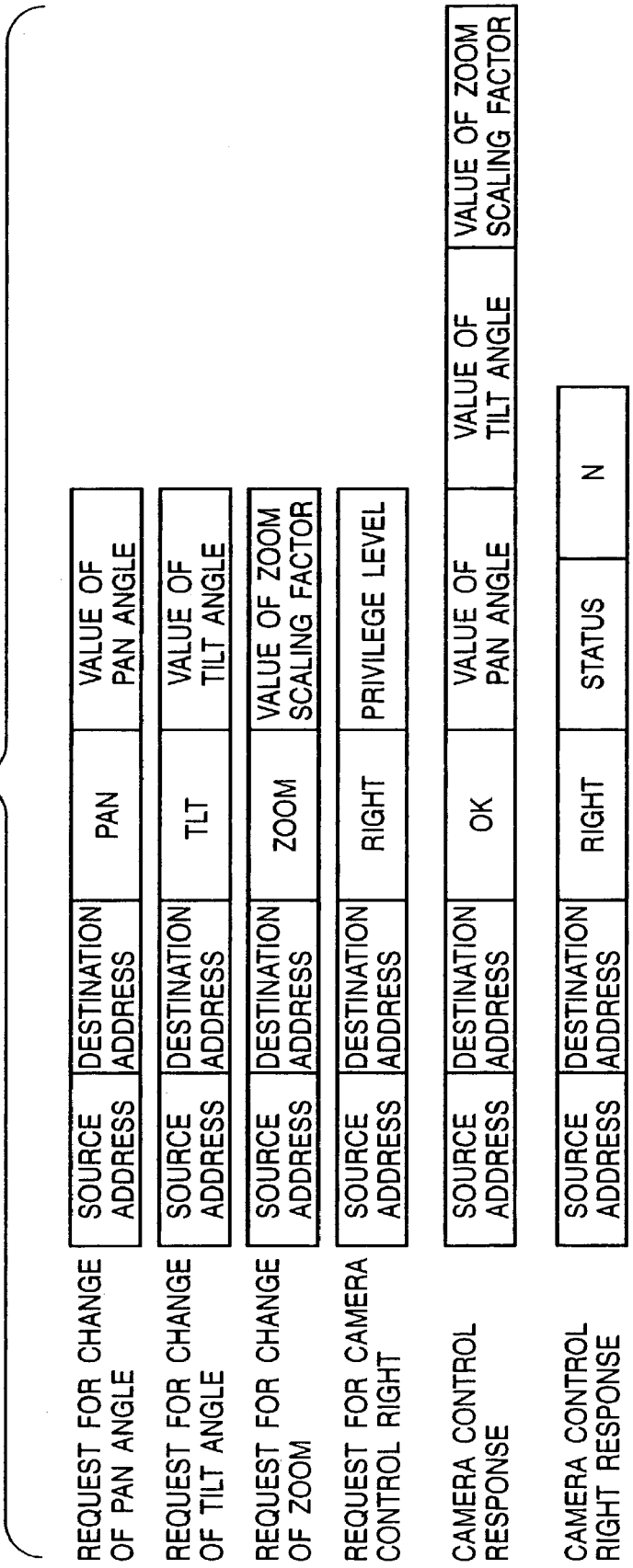
FIG. 9 shows a data format showing a request for the camera control right and the camera control command according to the first embodiment of the present invention.

In the first embodiment, the display operation terminal 112 is constituted by an apparatus such as a personal computer capable of performing graphical screen operations. When the address of the camera server apparatus 111 is designated from the display operation terminal 112 to establish connection with the camera server apparatus 111, a user interface screen as shown in FIG. 3 is displayed. In FIG. 3, reference numeral 131 denotes an image display window, in which an image obtained from the camera server apparatus 111 is displayed under extension. For controlling a camera, first a button 135 is pressed down, and after the control right is acquired, a scroll bar 132 for camera pan, a scroll bar 133 for camera tilt and a scroll bar 134 for camera zoom are operated to control camera. Note that the control right for camera operation can be acquired by only one client at a time for each camera server apparatus 111. The camera control command is issued in response to this operation, and camera control commands that are used here and responses from the camera server apparatus are shown in FIG. 9. Details on commands are described later.

The conversion server apparatus 114 converts a compressed image of Motion JPEG format obtained from the camera server apparatus 111 to a compressed image format (MPEG4 in the first embodiment) capable of being displayed by the portable display terminal 119, and information obtained from the advertisement server apparatus 115 is superimposed on the image as necessary, and the image is delivered to the delivery server apparatus 117 through the second network 116.

Figure 4:
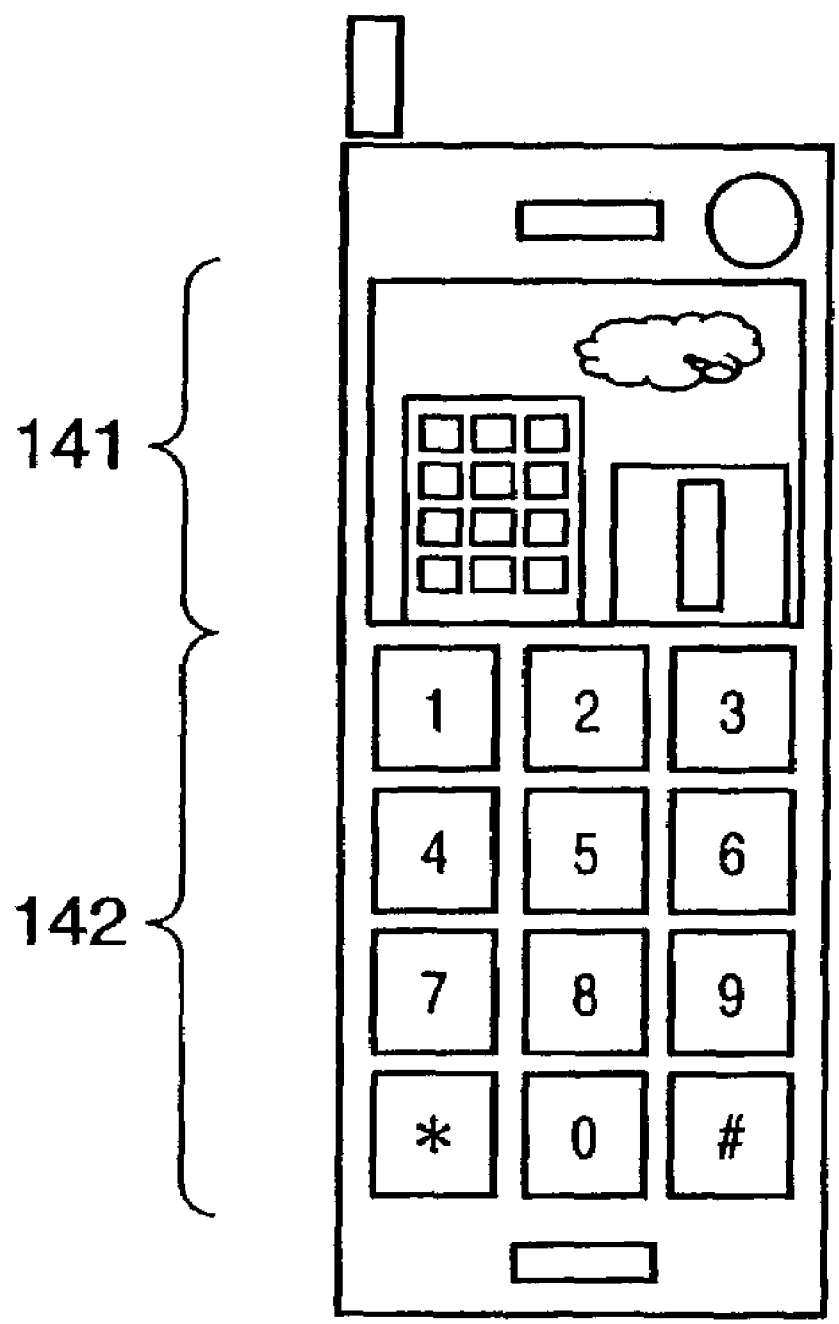
FIG. 4 shows one example of the external appearance of a portable display terminal.

In addition, the delivery server apparatus 117 delivers the image to a plurality of portable display terminals 119 with which connection is established. Each portable display terminal 119 decodes and displays the received MPEG4 image. Note, it is assumed that the portable display terminal 119, such as cellular phone and Personal Digital Assistants, can receive at a high speed a digital image of, for example, 64 kbps. An example of the portable display terminal 119 is shown in FIG. 4. The reference numeral 141 denotes an image and information displaying unit, and reference numeral 142 denotes a key button unit.

In the first embodiment, the conversion server apparatus 114 converts a Motion JPEG image into an MPEG4 image. Thus, the image format used in the system is assumed to have a simple profile such that the system extending from the camera server apparatus 111 to the conversion server apparatus 114 or the display operation terminal 112 is associated with Motion JPEG, and the system extending from the conversion server apparatus 114 to the portable terminal 119 is associated with a visual portion of MPEG4.

In the first embodiment, however, the image compression format is not particularly limited, and any system is acceptable as long as the compressed image format received from the camera server apparatus can be converted to a compressed image format capable of being displayed by the portable terminal 119 in the conversion server apparatus 114. In addition, format conversion is not necessarily performed if information can be superimposed as long as the image is correctly delivered and displayed. In addition, a non-compressed image is acceptable if the compression of the image is considered unnecessary from a viewpoint of processing and loads on the network.

Furthermore, as for the camera control, a request for control right is made from the portable terminal 119 to the camera server apparatus 111 to acquire the control right, and after the control right is acquired a control command is issued and delivered to the camera server apparatus 111 via the delivery server apparatus 117 and the conversion server apparatus 114. The first embodiment is described assuming that a bidirectional sound channel for speech communication is used to deliver a control signal and its response in the system extending from the portable terminal 119 to the delivery server apparatus 117 to the conversion server apparatus 114. This will be described in detail later.

Furthermore, the conversion server apparatus 114 looks identical to the display operation terminal 119 except for some part when seen from the camera server apparatus 111. Furthermore, each apparatus except for the portable display terminal 119, described in the first embodiment, is assigned an IP address (hereinafter referred to as address) as an identification address allowing each apparatus to be identified on the network. However, the portable display terminal 119 can be identified on the network using a cellular phone specific scheme, namely a telephone number. However, any identification scheme is acceptable as long as each apparatus and terminal can be identified for carrying out communications.

The first network 113 may be any digital network such as internet and intranet having a band sufficient for passing camera control commands and images between a plurality of operation display terminals 112, conversion server apparatuses 114 and camera server apparatuses 111 existing on the network. It should be noted that, in the first embodiment, the image passed through the first network 113 is packetized Motion JPEG, and the camera control command and the response thereto are also packetized for each command.

The second network 116 may be any digital network such as internet and intranet having a band sufficient for passing images, camera commands and responses between the conversion server apparatus 114 and the delivery server apparatus 117. In the first embodiment, the image passed through the second network 116 is a packetized MPEG4 image, and the camera control command and the response are bidirectional digital sound data with sound data digitized and packetized as described later.

In the first embodiment, the third network 118 is a cellular phone network that is wireless on the side of the portable display terminal 119 having a band sufficient for passing images and camera control commands from/to the delivery server apparatus 117 to/from the portable display terminal 119. Logically, any physical configuration is acceptable as the third network 118 as long as a band necessary and sufficient for carrying out communications between the delivery server apparatus 117 and the portable terminal 119 can be secured. In the first embodiment, the image passed through the third network 118 is a packetized MPEG4 image, and the camera control command and the response are passed as sounds of the bidirectional sound channel for speech communication on the second and third networks 116 and 118 as described later. In addition, the conversion server apparatus 114 may be connected to the advertisement server apparatus 115 via any network having a band sufficient for passing advertisement information.

Figure 5:
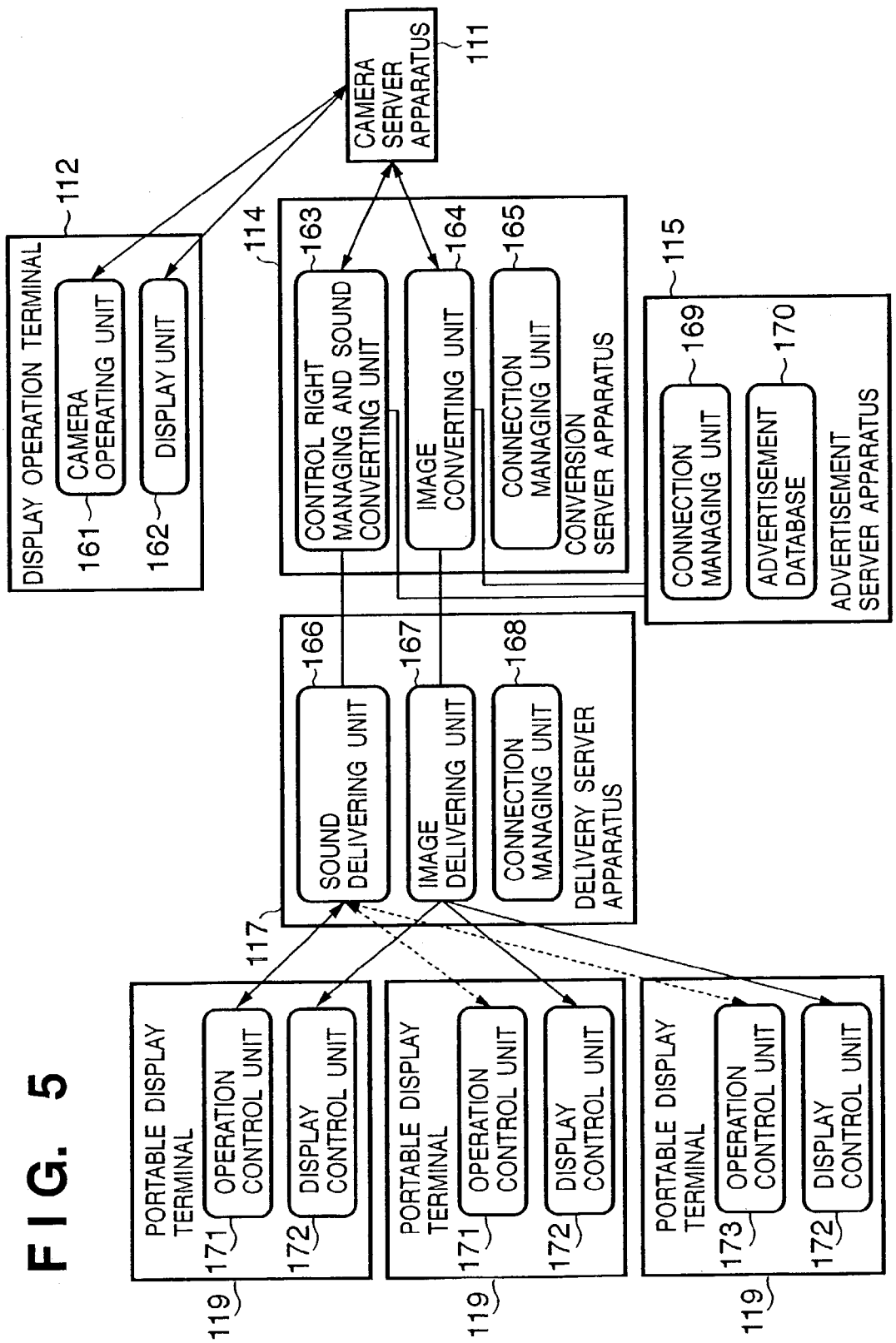
FIG. 5 shows a logical configuration of the information delivery system focusing on the flow of data according to the first embodiment of the present invention.

A logical configuration focusing on data flow is shown in FIG. 5. In FIG. 5, elements same as those of FIG. 1 are given the same reference numbers. The display operation terminal 112 is a client for the camera server apparatus 111. The camera server apparatus 111 is constituted by a camera operating unit 161 and a display unit 162. In the operation screen of FIG. 3, the camera operating unit 161 corresponds to elements 133 to 135, and the display unit 162 corresponds to the image display window 131. Data is exchanged with the camera control communicating unit 127 and the image communicating unit 125 of the camera server apparatus 111 to display an image on the display unit 162, and camera control is performed using the camera operation unit 161. Note that a plurality of display operation terminals 112 may be connected to one camera server apparatus 111 at a time as described previously.

The conversion server apparatus 114 is constituted by an image converting unit 164 carrying out stream conversion to convert the compression format of the image and superimposition of advertisement information obtained from an advertisement server apparatus 115 on the image, and a control right managing and sound converting unit 163 managing the control right as described later and converting specific digital sound data into a camera control command. When the conversion server apparatus 114 is activated, an address is assigned to each of the delivery server apparatus 117, the advertisement server apparatus 115 and the camera server apparatus 111 to establish connection. The addresses of destinations with which those apparatuses establish connection are stored in a connection managing unit 165, and these addresses are used to establish connection. There may be a plurality of delivery server apparatuses 117, advertisement server apparatuses 115 and camera server apparatuses 111 on the network with respect to the apparatus with which connection is established. In this case, one apparatus may be selected from each type of apparatuses.

The delivery server apparatus 117 is constituted by a sound delivering unit 166 and an image delivering unit 167, and is connected to the conversion server apparatus 114 on a one-to-one basis, but may be connected to a plurality of portable display terminals 119 at a time to exchange data therewith. The sound delivering unit 166 passes digital sound data from the portable display terminal 119 to the control right managing and sound converting unit 163 of the conversion server apparatus 114, and delivers a response (digital sound data) of the camera server apparatus 111 sent back from the control right managing and sound converting unit 163 to the requiring portable display terminal 119. The image delivering unit 167 delivers an MPEG4 image stream delivered from the conversion server apparatus 114 to a plurality of portable display terminals 119 connected to the delivery server apparatus 117 at a time.

The portable display terminal 119 is constituted by an operation control unit 171 and a display control unit 172, wherein the operation control unit 171 sends to the delivery server apparatus 117 a tone signal (digital sound data when outputted) generated as a sound of a pressed key by pressing down the key button unit 142 of FIG. 4, and the display control unit 172 performs control to display on the display unit 141 images and characters of the MPEG4 stream and the like sent from the delivery server apparatus 117.

First, the operation in FIG. 5 will be described more in detail focusing on the flow of images. The camera server apparatus 111 delivers a Motion JPEG-compressed image captured by the image sensing unit 121 to all clients connected to the camera server apparatus 111, namely the display operation terminal 112 and the conversion server apparatus 114. Note that FIG. 5 shows one display operation terminal 112 and one conversion server apparatus 114, but a plurality of apparatuses may exist for each type of apparatus as a matter of course.

Figure 6:
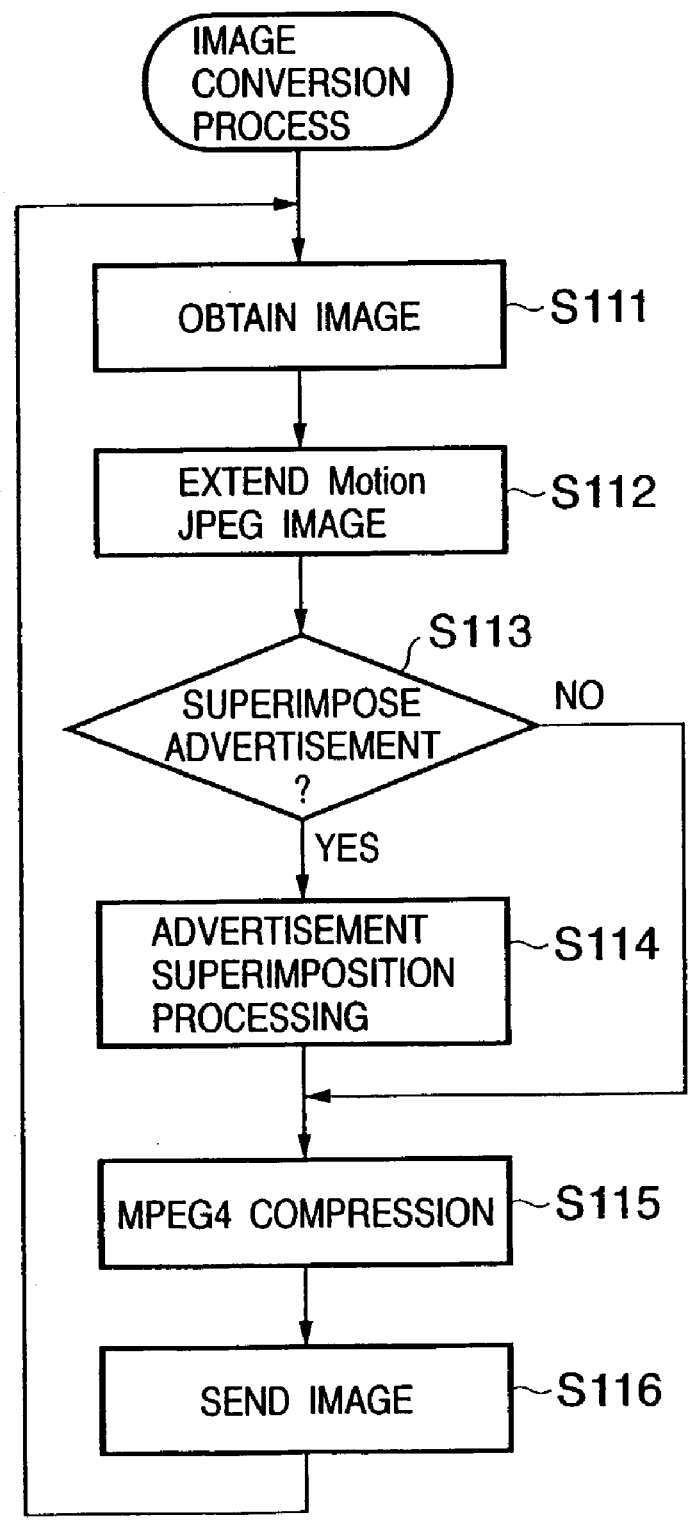
FIG. 6 is a flowchart showing operations of an image converting unit of a conversion server apparatus according to the first embodiment of the present invention.

The flow in the image converting unit 164 of the conversion server apparatus 114 is shown in FIG. 6. First, an image is obtained from the camera server 111 at step S111, and the image converting unit 164 extends the received Motion JPEG compressed image for each frame (step S112), subjects the image advertisement superimposition processing (step S114) if superimposition of an advertisement is necessary (if YES in step S113), MPEG4-compresses the image again (step S115) and sends the image to the delivery server apparatus 117 (step S116). At this time, in the advertisement superimposition processing at step S114, PTZ values (pan angle, tilt angle and zoom scale factor) retained in the control right managing and sound converting unit 163 of the conversion server apparatus 114 are passed to the advertisement server apparatus 115, required advertisement information corresponding to the PTZ values is obtained from an advertisement database 170, and the advertisement is superimposed on the image using this advertisement information. The delivery server apparatus 117 delivers the received MPEG4 image stream to a plurality of portable display terminals (denoted by reference numeral 119 in FIG. 5) connected to the delivery server apparatus 117 at a time. Note that there may be cases where the advertisement information obtained from FIG. 7 described later has no contents depending on time periods and/or PTZ values, and in these cases, no advertisement is superimposed. This means no superimposition of advertisement in step S113.

Advertisement information is a combination of an advertisement file and a position of superimposition. A database is provided in the advertisement server apparatus 115, whereby the advertisement file and the position of superimposition can be obtained if an inquiry is made with the current time and PTZ values of a camera being presented. In the database, a table having a format shown in FIG. 7 is searched in an ascending order with the smallest entry number the first, and the advertisement file and the superimposition position information of the first entry appropriate to the corresponding time and PTZ range are acquired. * in FIG. 7 means no range specified (always appropriate). Advertisement files obtained include telop character stirrings, still images and image sequence clips.

The still image and image sequence clip have α plane information, and information can be superimposed in such a manner that the image as a background is partially seen as required. In the case of a moving image, information is superimposed in synchronization for each frame. Furthermore, advertisement information is superimposed in the first embodiment, but such information is not limited to advertisement information, and any information that needs to be added to the image in midstream may be superimposed. For example, control state information of the camera server apparatus obtained from the camera server apparatus with which connection is established, such as the number of clients waiting for the control right, the amount of time to be spent for acquiring the control right and pan/tilt/zoom values may be superimposed. In the advertisement superimposition processing at step S114, the position of superimposition (upper, lower, left, right, center, etc.) and the display size of advertisement information (large/medium/small) are determined based on the superimposition position information.

Furthermore, the delivery server apparatus 117 has a telephone number as a network interface on the side of the portable display terminal 119, and when the portable display terminal 119 makes a call to the telephone number, connection is established and an image is passed from the delivery server apparatus 117, and the image is then displayed under extension in the display control unit 172. Connection can be established at a time with the same telephone number even if connection is established from a plurality of portable display terminals 119. The delivery server apparatus 117 has a capacity for passing images and sound bidirectionally described later to a plurality of portable display terminals 119. Furthermore, here, designation by the IP address in internet connection such as the i-mode(R) service, a service from NTT DoCoMo Co., Ltd. and URL (Uniform Resource Locator)

designation in the connection destination designation method of WWW may be used instead of connection by the telephone number.

Figure 8:
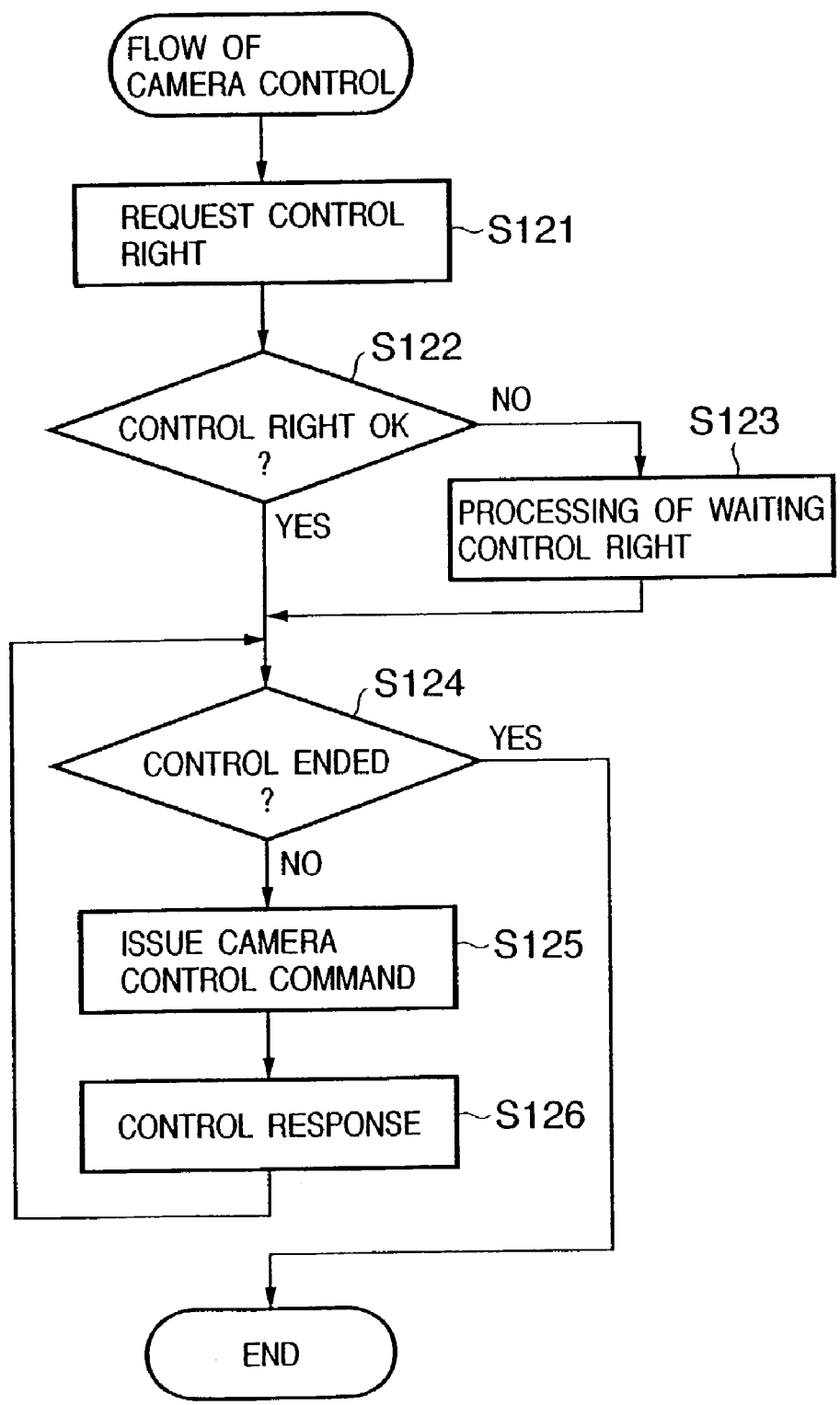
FIG. 8 is a flowchart showing the flow of from acquirement of a camera control right to issuance of a camera control command according to the first embodiment of the present invention.

The operation in FIG. 5 will now be described in detail focusing on the flow of control. The flow of operations starting with acquirement of the camera control right and ending with issuance of the camera control command is shown in FIG. 8. When camera control is to be performed, the portable display terminal 119, the conversion server apparatus 114 and the display operation terminal 112 each issues a request for acquirement of the control right to the camera server apparatus 111 (step S121), and repeatedly sends control commands for operation of the camera server apparatus 111 and receives the responses (steps S125 and S126) until the control right is lost (NO in step S124) after the control right is acquired (YES in step S122). In this way, the flow of part associated with camera control is basically the same. However, the flow in a plurality of portable display terminals 119 connected is different in that the bidirectional sound data channel can be used.

The request for the camera control right and camera control commands are shown in FIG. 9. The request for the control right, commands such as a pan angle, a tilt angle and a zoom change and responses thereto are shown in FIG. 9. In the case of the portable display terminal 119, however, these commands are not directly issued, but sound data corresponding to the control command is issued using a various kinds of key buttons of the key button unit 142 of FIG. 4, and is converted into the camera control command shown in FIG. 9 by the conversion server apparatus 114 to perform camera control. The same process is carried out for the request for the control right.

Figure 10:
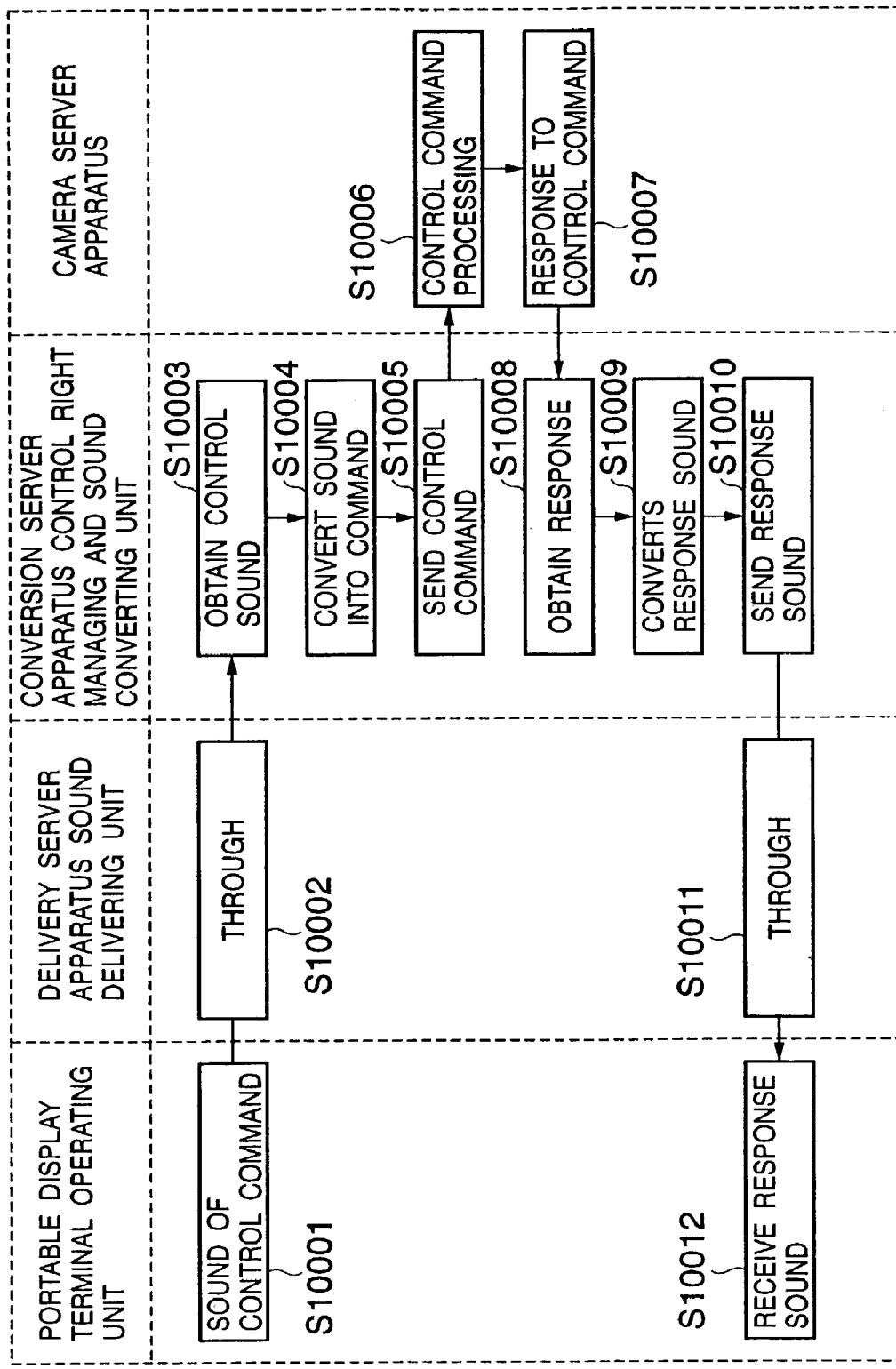
FIG. 10 shows the flow of from issuance of a control command sound to reception of a response sound according to the first embodiment of the present invention.

The flow of the control command is shown in FIG. 10. When various kinds of key buttons corresponding to control operations in the key button unit 142 of the portable display terminal 119 are pressed, a tone signal sound (control command sound) is generated. In the operation control unit 171, the sound is encoded with GSM AMR or the like and converted into digital sound data, and is passed to the sound delivering unit 166 of the delivery server apparatus 117. The sound delivering unit 166 simply passes the sound data to the control right managing and sound converting unit 163 of the conversion server apparatus 114.

Figure 12:
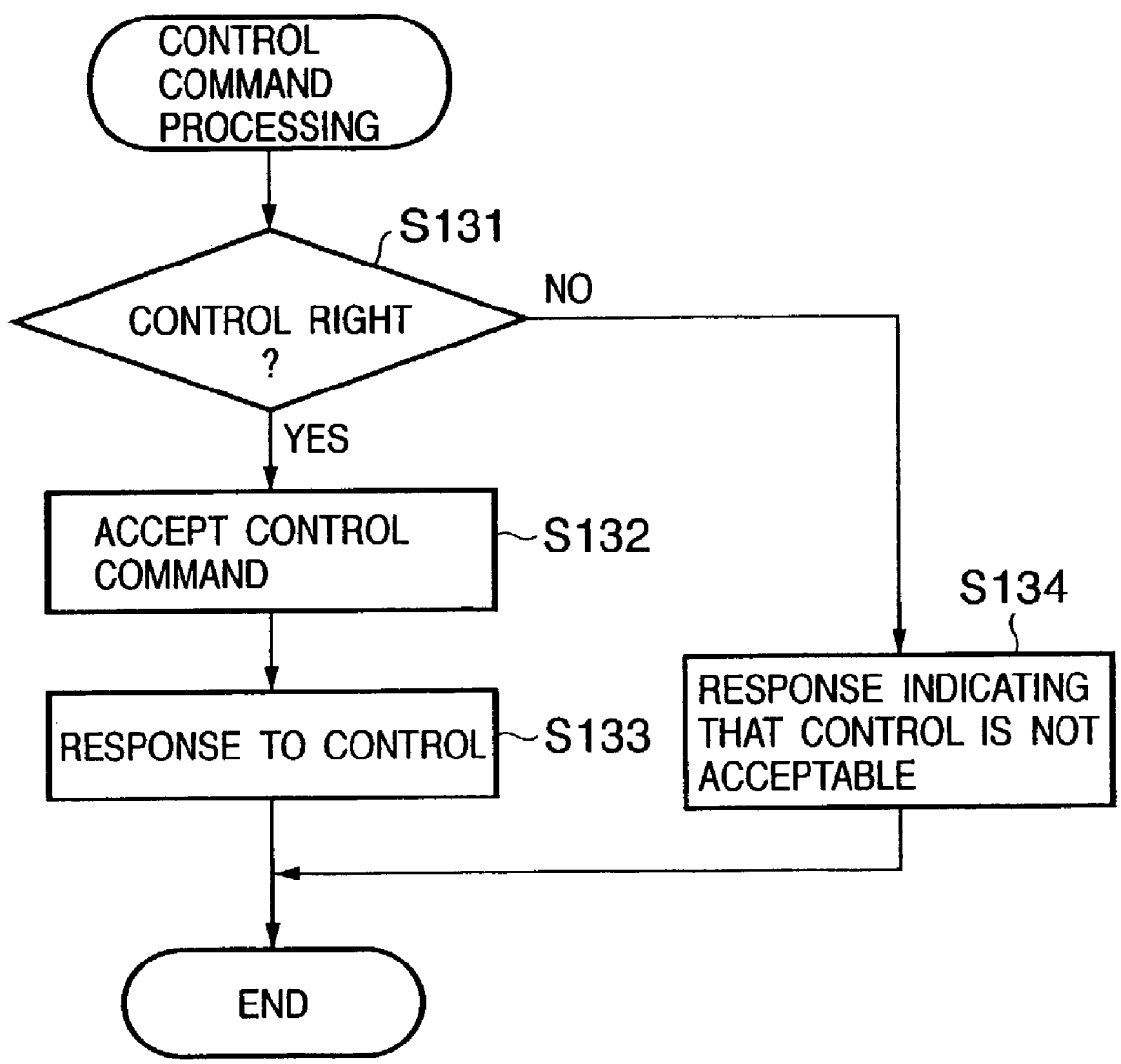
FIG. 12 is a flowchart showing the flow of response operations according to the control command by the camera server apparatus according to the first embodiment of the present invention.

In the control managing and sound converting unit 163, this sound data is obtained, and is converted into a corresponding camera control command and issued to the camera server apparatus 111, thereby performing camera control. The flow of the response to camera control is opposite to that of the control command. A table of correspondence between key buttons and camera control commands is shown in FIG. 11A. The key button combination operation generates a control command sound. For pan/tilt/zoom values, digit keys are entered. FIG. 12 shows the flow of response operation corresponding to the control command by the camera server apparatus 111. When the camera server apparatus 111 determines that an object apparatus has the control right (step S131), it accepts the control command (step S132) and sends response information (step S133). On the other hand, if the camera server apparatus 111 determines the received control command is from an apparatus having no control right, sends a response indicating that control cannot be accepted (step S134).

A table of correspondence between responses from the camera server apparatus 111 and response sounds played back in the portable display terminal 19 is shown in FIG. 11B. When the response arrives, a sound reading aloud words in the correspondence table is generated. Furthermore, in FIG. 11B, reference symbols θ, φ and z denote numbers showing pan tilt angles and a zoom scale factor, respectively.

An example of camera control is shown. When three key buttons of 4, 2 and 0 are pressed in a row with the control right already acquired, A camera control command shown in FIG. 13 to pan in the left direction by 20 units is generated by the conversion server apparatus 114 and passed to the camera server apparatus 111. Note that −20 means panning in the left direction by 20 units from the current position. +20 indicates a command to pan in the right direction by 20 units.

Furthermore, in the camera control command and the response of FIG. 9, first and second items, namely the source address and the destination address refer to the addresses of source and destination apparatuses, respectively, for sending commands and responses, and the third item refers to identification character strings for types of commands and responses. The change of pan and tilt angles and the change of the zoom scale factor each specify a change of angle with relative values. The + symbols of values refer to right pan, up-tilt and zoom scaleup, respectively, and the − symbols of values refer to left pan, down-tilt and zoom scaledown, respectively. The value itself is defined with a minimum control amount as one unit. For the camera control response, pan and tilt angles and the zoom factor obtained as a result of control are sent back in the form of values.

Responses are each sent back only to the portable display terminal issuing a control command sound, but only the camera control response is sent back to all the portable display terminals connected to provide by sound a notification of conditions of pan/tilt/zoom of the camera. The data format of sound exchanged between the delivery server apparatus 117 and the conversion server apparatus 114 is shown in FIG. 14.

Data may be divided into small packets at the time when it is sent, but basically data in format described above is bidirectionally exchanged. When sound data is passed from the delivery server apparatus 117 to the conversion server apparatus 114, the data is constituted by digital sound data corresponding to the control command sound and the identifier (telephone number) of the portable display terminal 119 issuing the control command sound, while when sound data is passed from the conversion server apparatus 114 to the delivery server apparatus 117, the data is constituted by digitized reading sound and the identifier (telephone number) of the portable display terminal to which sound is sent. Furthermore, if sound data is sent back to all the portable display terminals 119 connected as in the case of sending the camera control response, it should be indicated uniquely that the sound data is not intended to be passed to a specific portable display terminal by, for example, assigning number 0 to all portable display terminals as an identifier (telephone number) of the portable display terminal as shown in FIG. 15.

Figure 16:
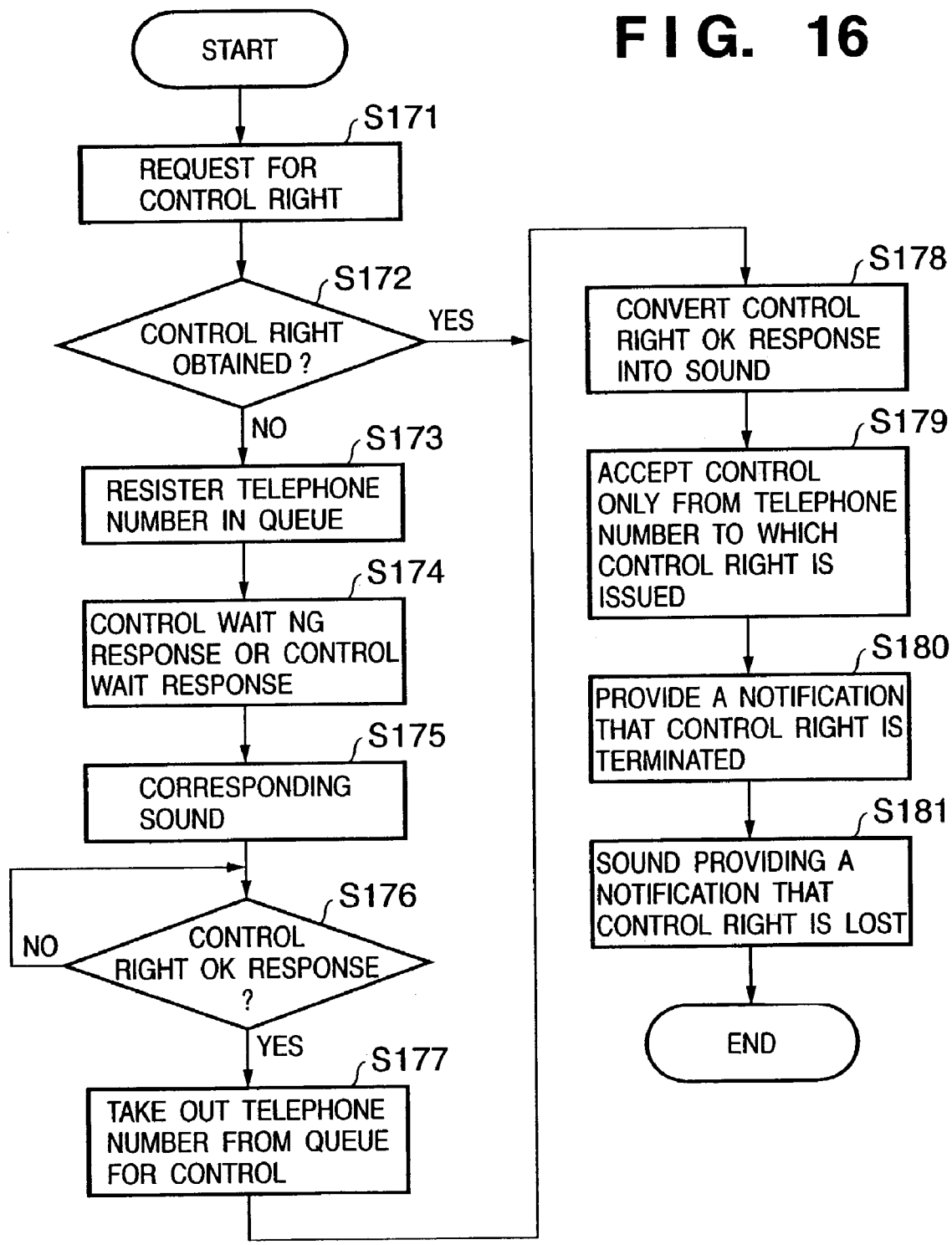
FIG. 16 is a flowchart showing the outline of the flow during the request for the control right in a control right managing and sound converting unit of the conversion server apparatus according to the first embodiment of the present invention.

The outlined flow of the request for the control right in the control right managing and sound converting unit 163 of the conversion server apparatus 114 is shown in FIG. 16. The conversion server apparatus 114 retains the queue of the identifier (telephone number) of the portable display terminal 119, and when a request for the control right is newly made by sound from the portable display terminal 119, the conversion server apparatus 114 converts it into the corresponding camera control command and sends the command to the camera server 111 (step S171). If the control right can immediately be acquired (YES in step S172), then processing proceeds to step S178 described later. On the other hand, if the control right cannot be acquired immediately (NO in step S172), then the identification telephone number is registered in the end of the queue (step S173). When a notice indicating that the client can or cannot be added in the queue for the control right is provided from the camera server apparatus 111 at step S174, a sound corresponding to such a notice is sent to the portable display terminal 119 at step S175. Thereafter, when the control right assignment response is sent back from the camera server apparatus 111 (YES in step S176), the identification telephone number is taken out from the head of the queue (step S177), and a corresponding sound is sent back to the corresponding portable display terminal 119 (step S178). At step S179, control from the telephone number of the portable display terminal 119 that can acquire the control right is accepted.

When a notice indicating that the control right is terminated due to the expiration of the effective period of the control right or the like is provided from the camera server apparatus 111 at step S180, a sound indicating the termination of the control right is sent to the portable display terminal 119 having the control right at step S181.

Note that, for the functions achieved by the conversion server apparatus 114, the delivery server apparatus 117 and the advertisement apparatus 115, the physical configuration of apparatus is not particularly limited, and for example, those functions may all be performed on the same apparatus as long as the respective functions can be performed.

According to the first embodiment, a different image with additional information superimposed thereon such as advertisement information can be delivered only to a specific terminal by using the conversion server apparatus 114 in the line through which the image is delivered, and camera server apparatus 111 does not have to have a content for the portable display terminal 119. In addition, in conjunction with the advertisement server apparatus 115, this additional information can be switched to different information according to time and camera control values (PTZ values) and the switched information is superimposed. In addition, not only a still image but also a moving image and a text can be used as the additional information.

In addition, in the first embodiment, for the control apparatus such as the camera server apparatus 111 that cannot accept control directly from key buttons of the cellular phone and the like, acquirement of camera control right and camera control operations can be performed with key buttons by converting sound data of key buttons into a control command in the conversion server apparatus 114. Furthermore, result of control can be known with sound because the response from the camera server apparatus 111 is converted into a sound. The states of pan/tilt/zoom of the camera can also be known with sound.

Second Embodiment

In the first embodiment, the camera with which connection is established is determined at the time of startup in the delivery server apparatus 117 and the conversion server apparatus 114. In the second embodiment, the conversion server apparatus 114 switches from the outside the camera server apparatus 111 with which connection is established. Here, the method of performing the switching of the camera server apparatus 111 from the portable display terminal 119 will be described.

Figure 17:
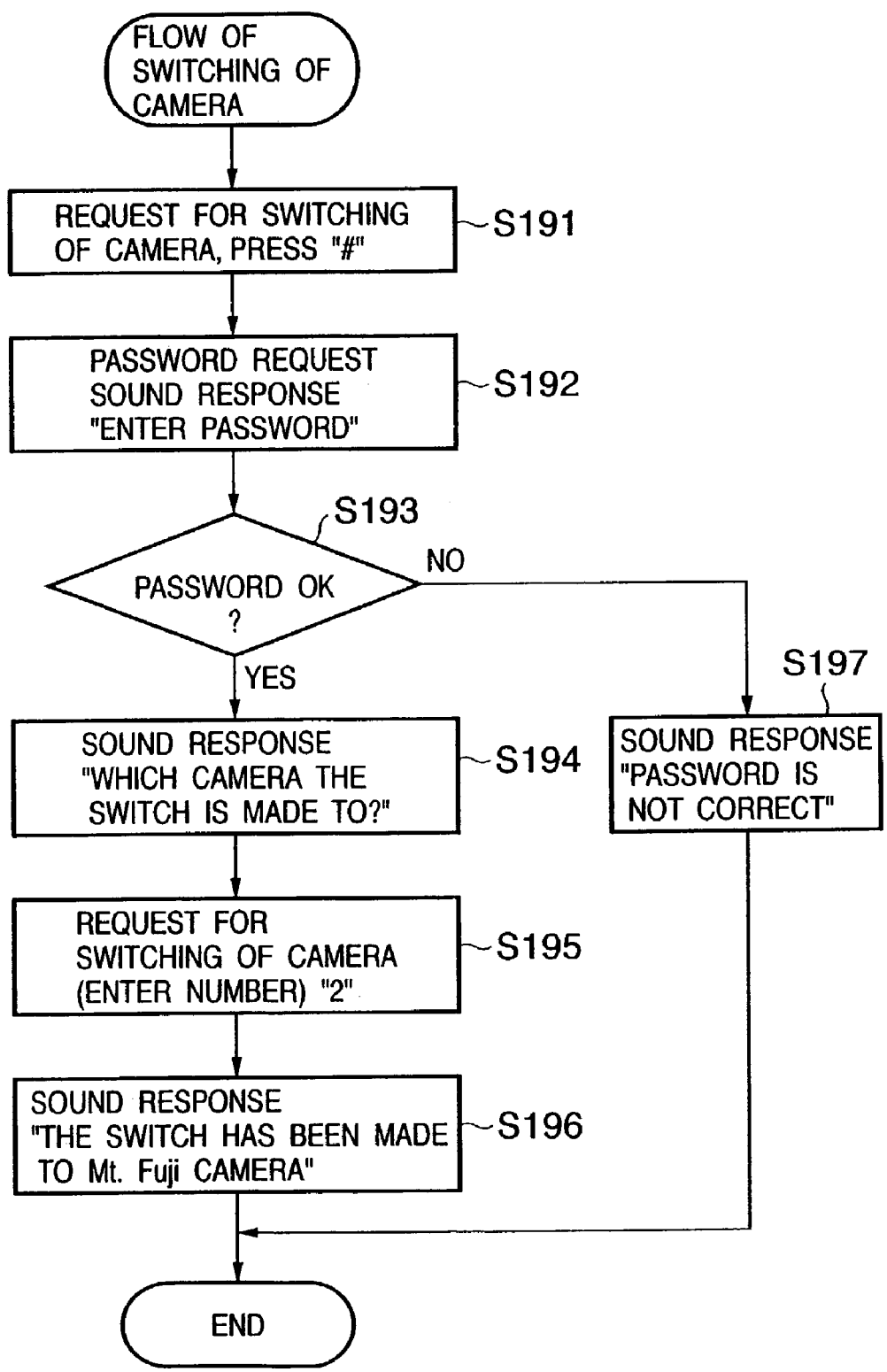
FIG. 17 is a flowchart showing the flow of camera switching control according to a second embodiment of the present invention.

The method is basically same as that of the first embodiment, but the operation of the conversion server apparatus 114 is slightly different, and only aspects different from those of the first embodiment will be described. The flow of camera switching control seen from the portable display terminal 119 is shown in FIG. 17. In the portable display terminal 119 connected to the delivery server apparatus 117, a camera switching command is issued. The camera switching command is specified in combination of key buttons of the key button unit 142 shown in FIG. 4. In this case, "#" is pressed (step S191). Thereupon, a digital sound travels to the control right managing and sound converting unit 163 of the conversion server apparatus 114 as in the case of the request for the control right and the camera control command in the first embodiment.

If this is considered as a command to change camera server apparatuses, the control right managing and sound switching unit 163 provides a sound response and makes an inquiry about a password (step S192). Then, the portable display terminal 119 enters the password, and sends back a sound response (step S194) so that the number of the camera to be changed to is entered if the password is correct (step S193). The control right managing and sound converting unit 163 has a camera number-camera name (with sound data)-camera address correspondence table shown in FIG. 18, and obtains a response sound and the address of the camera server apparatus 111 using this information.

When the camera number is entered (step S195), the control right managing and sound converting unit 163 converts it into the address of the corresponding camera server apparatus 111 (e.g. 100.20.30.102) using the table of FIG. 18, and terminates the connection previously established with the camera server apparatus 111, and newly establishes connection with the camera server apparatus 111 having the address of 100.20.30.102. In this way, the switching of the camera server apparatus 111 can be performed from the portable display terminal 119. Finally, the portable display terminal 119 is notified of the camera that is changed to at step S196.

Note that the changing of camera server apparatus can also be performed in such a manner that the conversion server apparatus 113 is provided with an additional connection port, and then the address of the connected camera server apparatus is changed to establish connection with a different camera server apparatus 111.

Third Embodiment

In the third embodiment, advertisements are changed according to the connected camera server apparatus when the changing of the camera server apparatuses is performed as in the second embodiment.

The process is basically same as that of the first embodiment except that the camera server apparatus 111 connected to the conversion server apparatus 114 can be changed from the outside, and that the advertisement information table of the advertisement server apparatus 115 is different. The changing of the camera can be performed by the method described in the second embodiment. At this time, if an advertisement information table shown in FIG. 19 is held instead of that shown in FIG. 7 as a database of the advertisement server apparatus 115, the address of the connected camera server apparatus is passed in addition to the current time and PTZ values of the camera as data passed from the conversion server apparatus 114 to the advertisement database 170, and advertisement information, namely the position of superimposition and advertisement file data of the entry first matching with the address of the camera server apparatus in the table of FIG. 19 is brought to the conversion server apparatus 114. In this way, the switching of advertisement information to be displayed can be switched according to the camera server apparatus 111 to be connected.

Fourth Embodiment

The fourth embodiment is such that the delivery server apparatus 117, the conversion server apparatus 114 and the advertisement server apparatus 115 can be connected selectively for a plurality of paths when a connection path from the portable information terminal 119 to the camera server apparatus 111 is envisioned in the configuration of the first embodiment.

Figure 20:
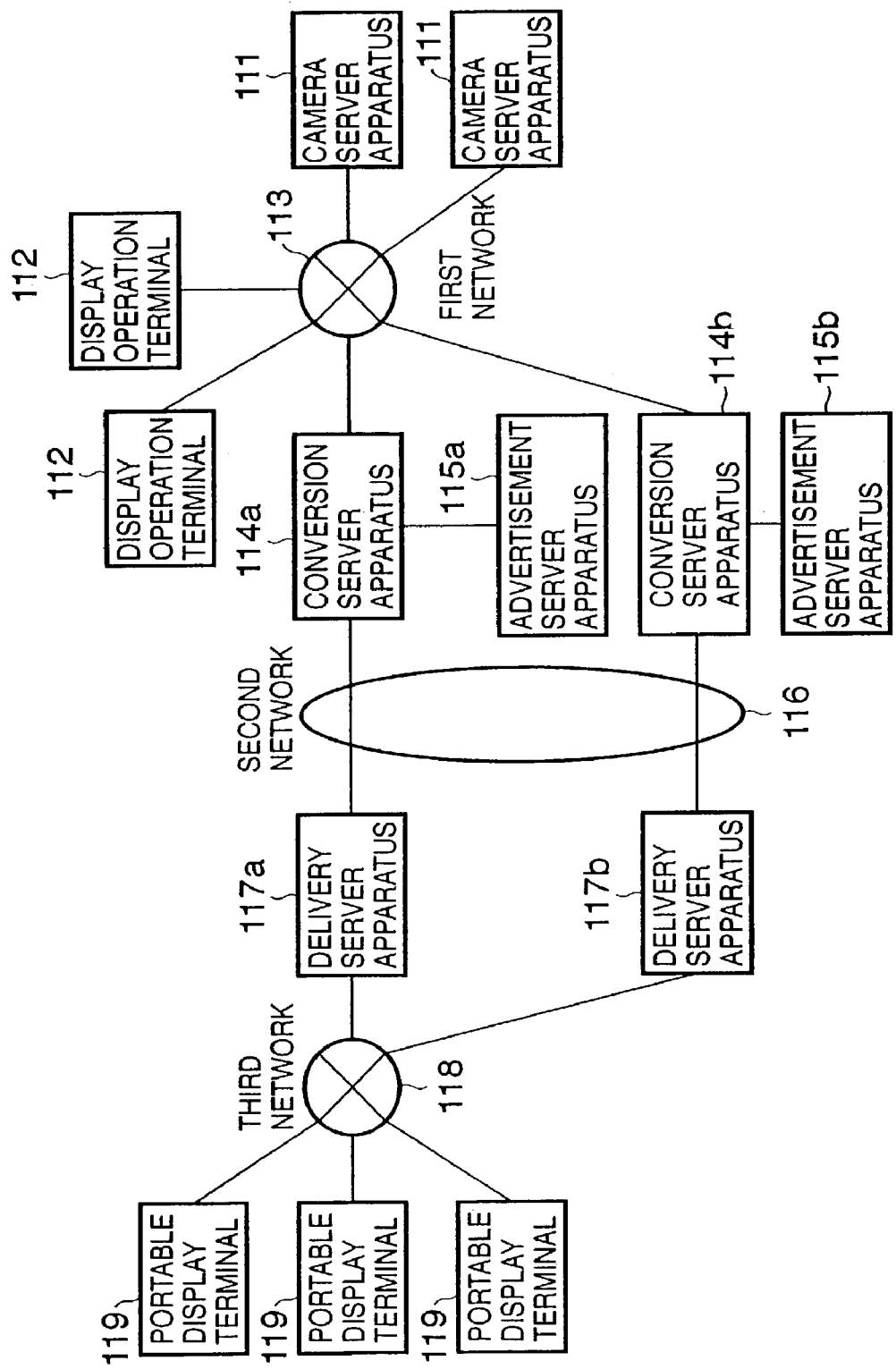
FIG. 20 is a block diagram showing a configuration of the information delivery system according to a fourth embodiment of the present invention.

The configuration of the fourth embodiment is shown in FIG. 20. Apparatuses and terminals are each located on a plurality of networks, and can be uniquely identified as in the case of the first embodiment. The operations of the apparatuses are same as those of the first embodiment, and therefore only the difference as a system will be described here with same reference numbers being given to apparatuses having same configurations as those of FIG. 1.

The portable display terminal 119 makes a call to the telephone number of the delivery server apparatus to establish connection, and provides image display and performs camera control, and a different connection telephone number is assigned for each of a plurality of delivery server apparatuses 117. Therefore, if connection is established with a different delivery server apparatus 117, connection will be established with a different conversion server apparatus 114 and a different advertisement server apparatus 115. For example, in FIG. 20, a conversion server apparatus 114a and an advertisement server apparatus 115a will be used if connection is established with a delivery server apparatus 117a, and a conversion server apparatus 114b and an advertisement server apparatus 115b will be used if connection is established with a delivery server apparatus 117b. If the conversion server apparatuses 114a and 114b are connected to the same camera server apparatus 111, a viewed image is the same and camera control is performed in the same way.

However, if the contents of the advertisement information table of FIG. 7 held by the advertisement server apparatus 115 are different, different information may be superimposed even if connection is established with the same camera.

In this way, when the number of advertisements wanted to be contained is too large for the camera server apparatus, for example, this configuration is adopted, thereby making it possible to perform the switching of advertisement contents even for the image of the same camera server apparatus.

Fifth Embodiment

The fifth embodiment is such that information is not superimposed on the image but is displayed by making the switch from the image to the information in the first embodiment. Aspects different from those of the first embodiment will be described.

Figure 21:
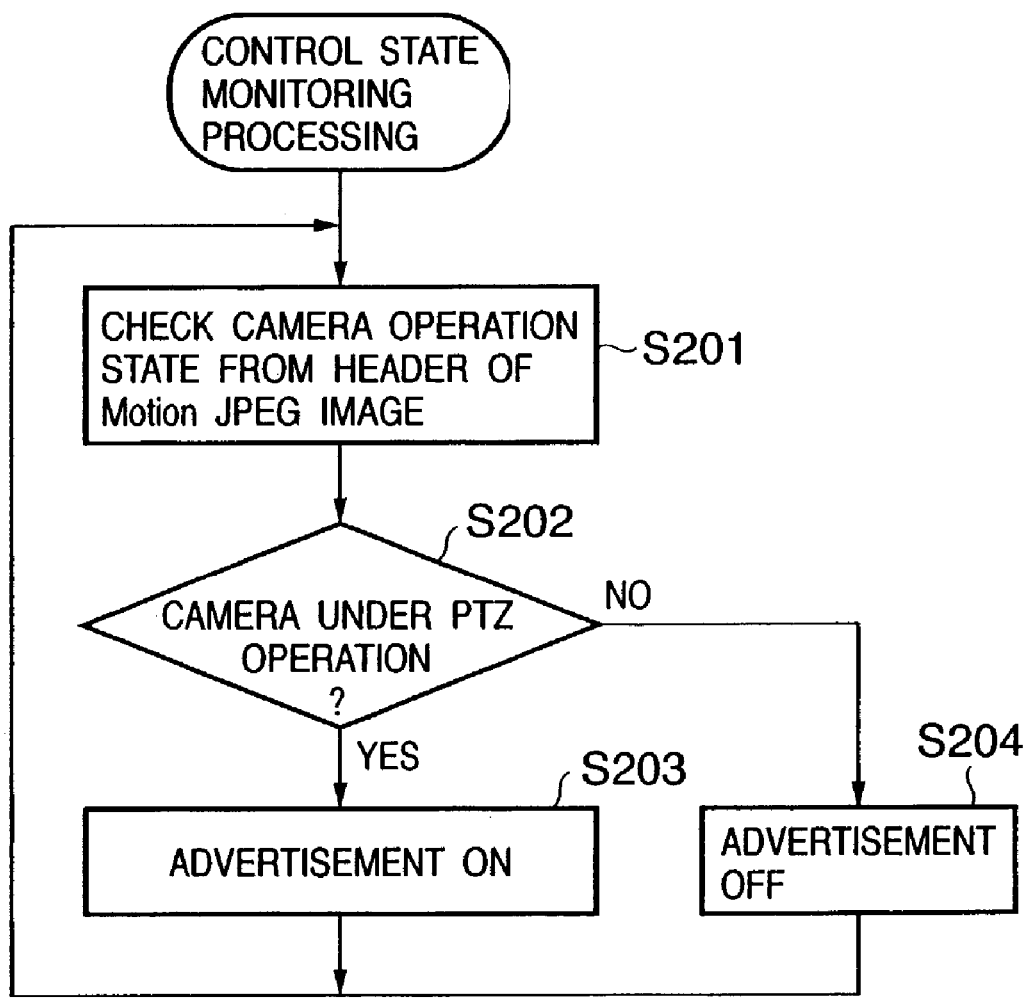
FIG. 21 is a flowchart showing operations of the conversion server apparatus according to a fifth embodiment of the present invention.

In the conversion server apparatus 114, the camera image may temporarily be interrupted to switch the image to a picture, an image and a text retrieved from the advertisement database, control state information obtained from the camera server apparatus or the like instead of superimposition of the advertisement at steps S113 and S114 in FIG. 6. For timing to make the switch to advertisement information, the switch may be made to advertisement information during the period over which the camera server apparatus 111 is controlled according to control information because the image is often rolled and thus rendered unclear during camera control. Therefore, a flow shown in FIG. 21 is additionally provided. That is, information that the state in which PTZ control is started and the PTZ operation is not stopped, in other words the information indicative of state in which the camera is currently under PTZ operation is returned from the camera server apparatus 111 to the conversion server apparatus 114 (step S201). The state in which the camera is under PTZ operation is included in each frame header of the Motion JPEG image. Then, this state in which the camera is under PTZ operation may be detected in the flow of FIG. 21 (step S202) to put the advertisement during the period over which the camera is under PTZ operation (step S203).

Advertisement information is displayed by making the switch to the advertisement information in the fifth embodiment, but in addition thereto, advertisement information may be inserted into the image to display the information in the following ways:

1) the switch is made to advertisement information to display the advertisement information during the period over which camera control right is awaited;

2) the conversion server apparatus is connected to the camera server apparatus, and the switch is made to advertisement information to display the advertisement information until image data arrives at the conversion server apparatus; and 3) the switch is made to advertisement information to display the advertisement information periodically.

Furthermore, in the first to fifth embodiments described above, displayed information is not necessarily advertisement information, any information that must not or cannot be held in the camera server apparatus because it has a large amount of data, it is preferably inserted in midstream and so on, and that should be superimposed in midstream is acceptable.

According to the embodiments described above, the conversion server apparatus is used in the path though which data is delivered, whereby additional information such as advertisement information can be superimposed only for the requiring terminal, and an image containing different additional information can be delivered in specific timing, and camera sever apparatus 111 does not have to have a content for the portable display terminal 119. In addition, in conjunction with the advertisement server apparatus, the different information can be added in accordance with the time and camera control values (PTZ values) to superimpose and display the information. In addition, for the additional information, not only a still image but also a moving image, a text and the like can be used.

Sixth Embodiment

The sixth embodiment provides an information delivery system in which an image server controlling the camera and sending an image, a sound server sending a sound, and a relay server coding data of the image server and the sound server into an image with sound and sending the same to a reception terminal are placed on the network. In the information delivery system, when the reception terminal makes a request for a specific camera image to the relay server, a desired camera image and sound data predetermined in the relay server are coded into an image with sound and sent back.

Figure 22:
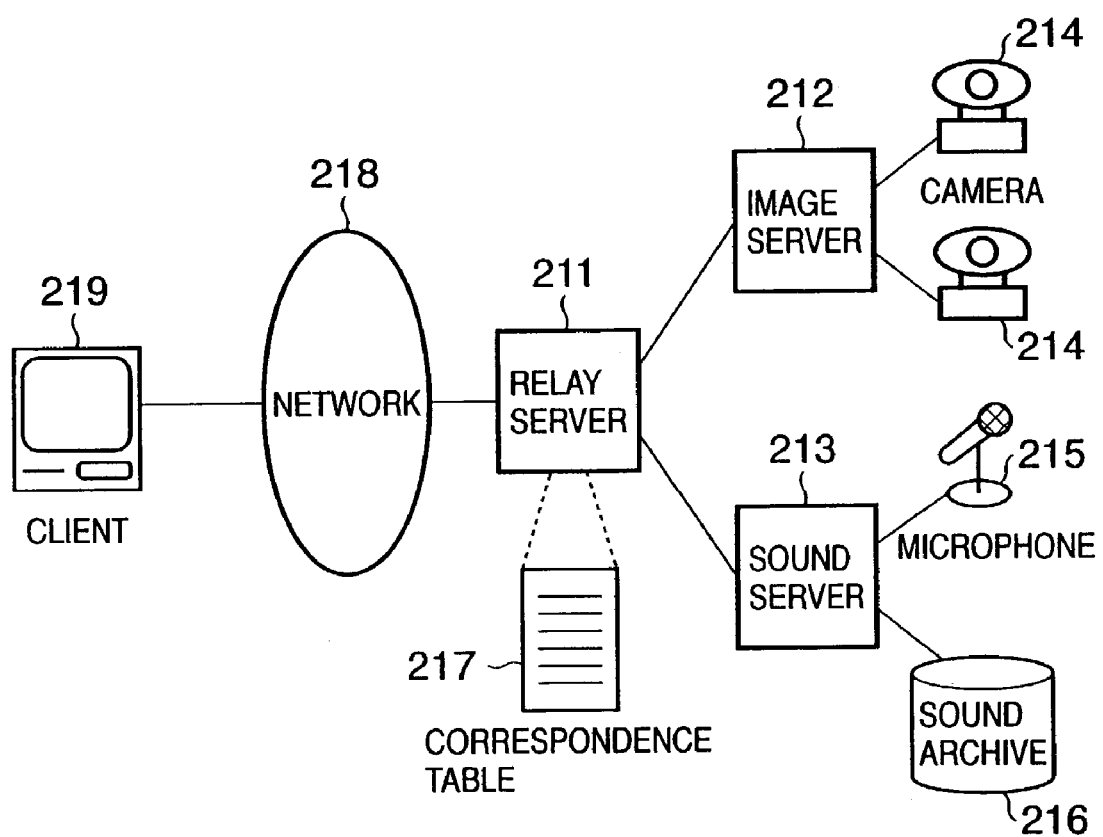
FIG. 22 shows an outlined configuration of the information delivery system according to a sixth embodiment of the present invention.

The overall configuration of the information delivery system in the sixth embodiment is shown in FIG. 22. A relay server 211, an image server 212, a sound server 213 and a client 219 are connected to a network 218.

A camera 214 is connected to the image server 212, and the client 219 can operate the camera 214 and obtain an image via the network 218. This is achieved by, for example, a method in which when a URL-encoded command is sent to the image server 212 by HTTP (HyperText Transfer Protocol), then the image server 212 sends back images of a plurality of frames. Note that, for the image data, many coding methods such as Motion JPEG and H.261 and MPEG exist, but the present invention is independent of the coding method.

The sound server 213 has connected thereto a microphone 215 and a sound archive 216 in which sound data is accumulated, and sends sound on the network. Sound data in the sound archive 216 can also be stored in an internal storage device of the sound server 213. A command can be provided to the sound server 213 in the same manner as the case of the image server 212, and when a request is sent, the sound server 213 sends back sound data of fixed time length. Here, the coding method of sound data includes methods such as G.711, G.726, G.729 and GSM-AMR, but the present invention is independent of the coding method.

The client 219 establishes connection with the network 218 by dialup or broadband connection. When the client 219 requests the relay server 211 to send an image, the relay server 211 makes a request for the image to the image server 212. On the other hand, the relay server 211 makes a request for sound data to the sound server having a sound corresponding to the image by referring to a correspondence table 217 between images and sound possessed in advance. The image server 212 and the sound server 213 respectively sends back image data and sound data to the relay server 211 based on the request. The relay server 211 codes the image data and sound data into one image data with sound and sends back the data to the client 219. The client 219 receives and plays back the data.

The client 219 may make a request for camera control to the relay server 211 in addition to the image, and in this case, the relay server 211 directly sends this request to the image server 212 to request the image server 212 to perform camera control.

Figure 23:
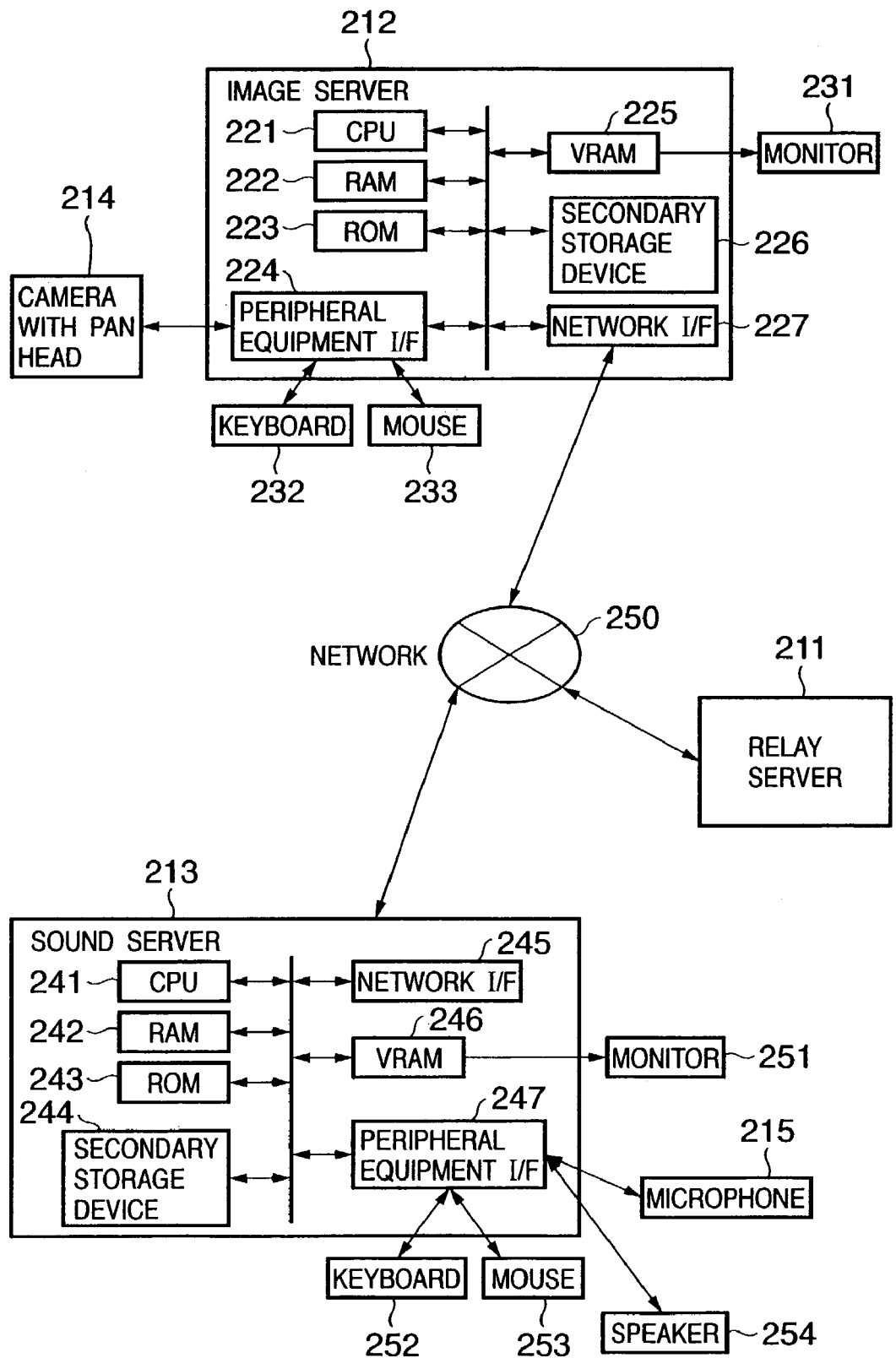
FIG. 23 is a block diagram showing hardware configurations of an image server and a sound server according to the sixth embodiment of the present invention.

The hardware configuration of the server will now be described with reference to FIG. 23. In FIG. 23, the image server 212, the sound server 213 and the relay server 211 are connected to the network 250.

The image server 212 comprises a CPU 221, a RAM 222, a ROM 223 and a secondary storage device 226. In addition, the image server 212 comprises a video RAM (VRAM) 225 and has a monitor 231 connected thereto for providing screen display. In addition, the image server 212 comprises a peripheral equipment interface 224 for connecting with a peripheral equipment, and a keyboard 232 for performing operations, a pointing device 233 such as a mouse and the camera 214 with or without a pan head are connected to the image server 212. In addition, the image server 212 comprises a network interface 227 for connection with the network 250. Note that, for the peripheral equipment interface 224, specifications such as PS/2, RS-232C, USB and IEEE1394 may be used, but this embodiment is not dependent on such specifications.

The CPU 221, the RAM 222, the ROM 223, the secondary storage device 226, the VRAM 225, the peripheral equipment interface 224 and the network interface 227 are connected to an internal bus. The configuration of the image server 212 described above can easily be achieved by using a commercially available personal computer, but the image server 212 can take a form of a so-called set top box having none of the VRAM 225, the monitor 231, the keyboard 232 and the mouse 233 without any problems because it can be operated from the outside via the network.

The sound server 213 is almost identical in configuration to the image server 212, and only the input device to be connected to the server 213 is different. The sound server 213 is constituted by the microphone 215 and a speaker 254 for a sound monitor in addition to a CPU 241, a RAM 242, a ROM 243, a secondary storage device 244, a VRAM 246, a monitor 251, a peripheral equipment interface 247, a network interface 245, a keyboard 252 and a pointing device such as a mouse 253. Also, the sound server 213 can easily be achieved by using a commercially available personal computer. In addition, the sound server 213 can take a form of a set top box having none of the VRAM 246, the monitor 251, the keyboard 252, the mouse 253 and the speaker 254 without any problems. In addition, if the sound server 213 has the sound archive 216 in the internal storage device and no external sound source is used, does not have the microphone 215 connected thereto.

Finally, the relay server 211 has a configuration same as that of the image server 212 except that the camera 214 with a pan head is not provided, or has a set top box configuration having none of the camera 214 with a pan head, a VRAM 225, a monitor 231, a keyboard 232 and a mouse 233, and therefore the explanation of the relay server 211 is not presented here.

Figure 24:
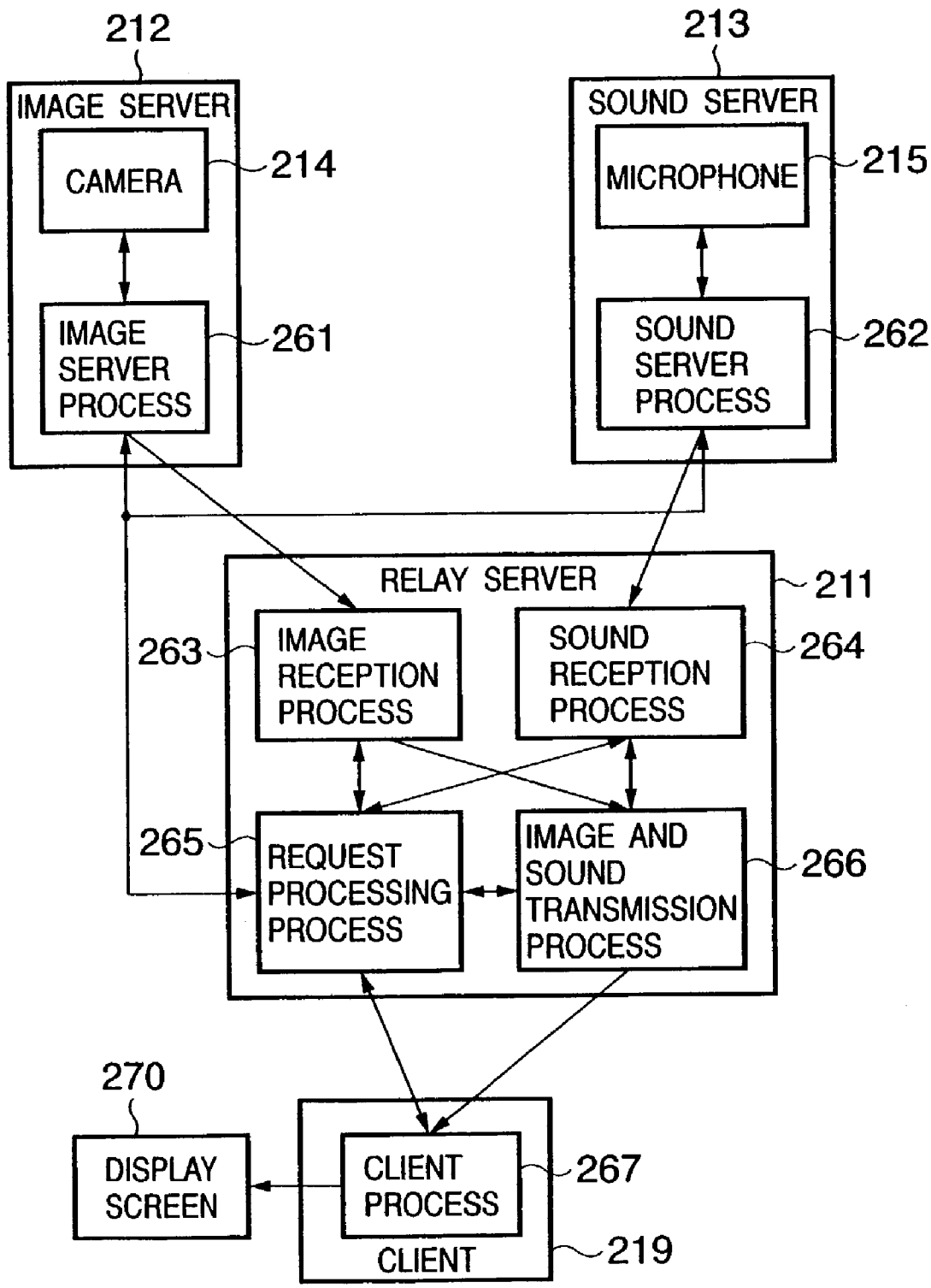
FIG. 24 is a block diagram showing a software configuration of the information delivery system according to the sixth embodiment of the present invention.

Now, an example of software configuration of the sixth embodiment is shown in FIG. 24. An image server process 261 in the image server 212, a sound server process 262 in the sound server 213, a request processing process 265, an image reception process 263, a sound reception process 264, an image and sound transmission process 266 in the relay server 211, and a client process 267 in the client operate. Here, the process means a program unit operating in a multitask operation system.

Figure 25:
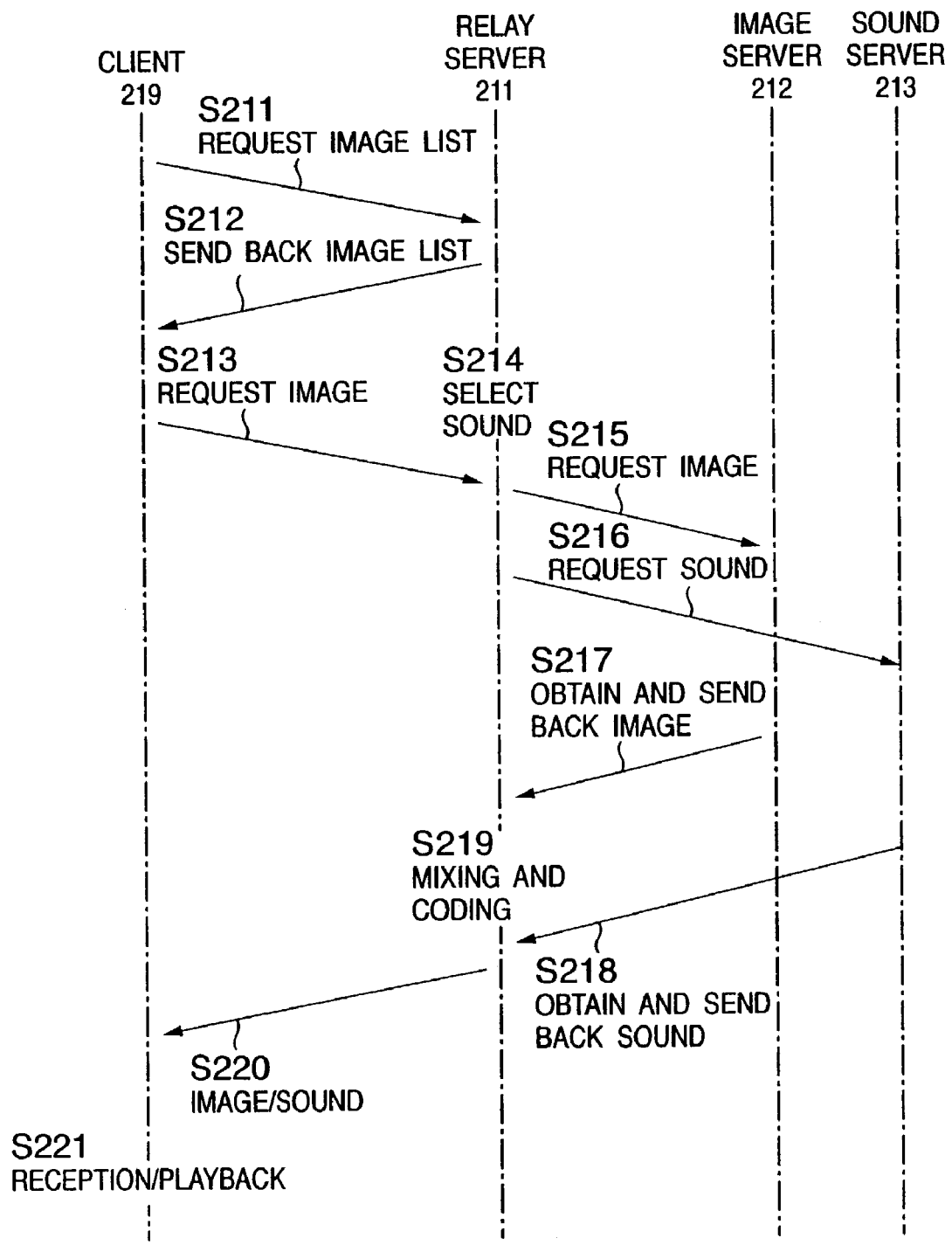
FIG. 25 shows an operation procedure of a software module of the information delivery system according to the sixth embodiment of the present invention.

The outlined operation of each process will be described with reference to FIG. 25. The client process 267 makes a request for an image list to the request processing process 265 of the relay server 211 at the time of startup (S211). The request processing process 265 sends back the image list (S212). The image list includes information shown in FIG. 26A, and its contents will be described later. The client, which receives the list, has the list of images displayed, and the user selects one of the images. Thereupon, the client process 267 makes a request for connecting to acquire the image to the request processing process 265 (S213). Note that, in the case where the user inputs directly to the client 219 the destination of connection for acquiring the image, steps S211 and S212 are not necessary.

The request processing process 265 of the relay server 211, which receives the request for connecting to acquire the image, selects the sound server 213 and a sound by referring to the correspondence table 217 between images and sound (S214). Then, the image server 212 and the camera 214 are designated to start the image reception process 263, and the sound server 213 and the microphone 215 or the sound file name are designated to start the sound reception process 264. In addition, the image and sound transmission process 266 for coding the received image and sound data into one image data with sound and sending the data is started. The image reception process 263 makes a request for an image to the image server 212 (S215). In addition, the sound reception process 264 makes a request for a sound to the sound server 213 (S216).

The image server process 261, which receives the request, obtains the image from the corresponding camera 214 (S217), and sends back the image to the image reception process 263 of the relay server 211. The sound server process 262 similarly obtains corresponding sound data from the microphone 215 or the sound archive 216 and sends back the sound data to the sound reception process 264 (S218). The image and sound data sent back are coded into one image data with sound in the image and sound transmission process 266 (S219), and the data is sent back to the client process 267 (S220). The client process 267 receives the image with sound, and thereafter decodes and plays back the image with sound (S221).

Information about images and sound retained by the relay server and information about correspondence between images and sound will now be described with reference to FIGS. 26A to 26C. There are three types of information, namely an image table 271 shown in FIG. 26A, a sound table 272 shown in FIG. 26B and a correspondence table 273 shown in FIG. 26C. The image table 271 is assigned an image number and an image name for each camera 214 connected to the image server 212 and manages the IP address and the port number of the image server 212 and camera names as attributes. The client 219 selects an image name to designate an image from a desired camera. In addition, the sound table 272 is similarly assigned a sound number and a sound name for each microphone 215 or file, and manages the IP address and the port number of the sound server 213, and microphone names or file names as attributes.

The correspondence table 273 shows correspondence between image numbers and sound numbers, and retains a plurality of sound numbers corresponding to respective image numbers. When the user makes a request for an image of which name is designated, the relay server 211 determines an image number from the image table 271, then references to the image number in the correspondence table 273 to acquire a sound number corresponding to the image number, and references to the sound number in the sound table 272 to pinpoint the location of the sound on the network. Here, a plurality of sound sources can be registered, and if the user continuously views the image for a long time, sound corresponding to these sound sources is delivered one after another. If a sound cannot be accessed for some reason, the switch is made to another sound assigned to the same image. In the figure, N/A means that no data exists.

The outlined operation of a group of servers in the sixth embodiment has been described above, and operation procedures of processes of the relay server 211 playing a predominant role in the sixth embodiment will be described in detail with reference to flowcharts of FIGS. 27 to 30. The relay server 211 consists of the request processing process 265, the image reception process 263, the sound reception process 264 and the image and sound transmission process 266, and for three processes other than the request processing process 265, one process is generated for one client, and each process independently operates.

Figure 27:
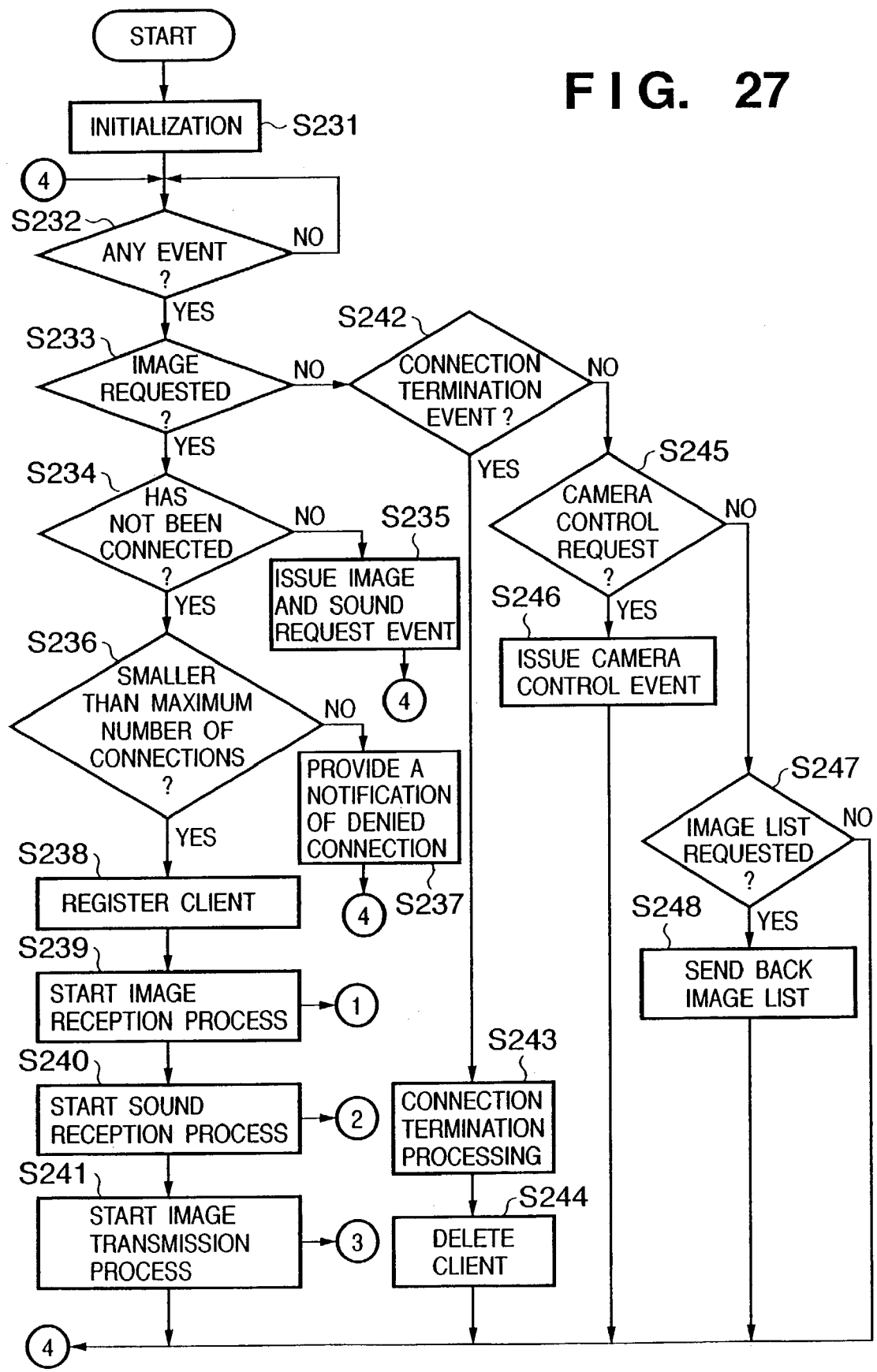
FIG. 27 is a flowchart showing a procedure of request processing process of the relay server according to the sixth embodiment of the present invention.

FIG. 27 is a flowchart showing the procedure of the request processing process 265 of the relay server 211. After starting, initialization is carried out at step S231, and an event is awaited at step S232. When the event occurs, processing of the event is carried out. Here, an event only from the client process 267 will be described, and events dependent on the OS and so on will not be described.

If the event is a request for the image (YES in step S223), whether the client has been already connected is determined at step S234. If the client has been already connected (NO in step S234), an image request event and a sound request event are issued to the image server 212 and the sound server 213, respectively, at step S235, and processing is returned to S232, where a next event is awaited. If the client has not been connected (YES in step S234), processing proceeds to step S236, where whether the number of connections is equal to or smaller than the maximum number is checked. If the number of connections exceeds the maximum number (NO in step S236), a connection rejection notice is provided to the client at step S237, and processing is returned to step S232, where a next event is awaited. The maximum number of connections is determined in advance in view of the processing capacity of the relay server 211.

If the number of connections is smaller than the maximum number (YES in step S236), the IP address of the client is registered as registry processing for the client 219 at step S238. If personal information of the client 219 is sent at the same time, the information is also registered. Then, a sound corresponding to the image is determined, the image reception process 263, the sound reception process 264 and the image and sound transmission process 266 are started at step S239, step S240 and step S241, respectively, and processing is returned to step S232, where a next event is awaited.

If the event is not a connection request event in step S233, processing proceeds to step S242, where whether the event is a connection termination event is determined. This event may be sent by the client 219, or may be raised as an exception event when the image and sound cannot be sent to the client in the image and sound transmission process 266. If it is the connection termination event (YES in step S242), processing proceeds to step S243, where connection termination processing is carried out. In the connection termination processing, the image reception process 263, the sound reception process 264 and the image and sound transmission process 266 started at the time of starting connection are terminated. Then, processing proceeds to step S244, where the client is deleted from the list of connecting clients, and processing returns to step S232, where a next event is awaited.

If the event is not the connection termination event (NO in step S242), processing proceeds to step S245, where whether the event is a camera control request event is determined. If it is the camera control request event, processing proceeds to step S246, where a camera control command from the client is transferred to the image server 212, and after it is completed, processing proceeds to step S232, where a next event is awaited.

If the event is not the camera control request event (NO in step S245), processing proceeds to step S247, where whether the event is an image list request event is determined. If it is the image list request event, an image list is sent back to the client at step S248, and thereafter processing returns to step S232, where a next event is awaited. If the event is not the image list request event (NO in step S246), processing returns to step S232, where a next event is awaited.

Figure 28:
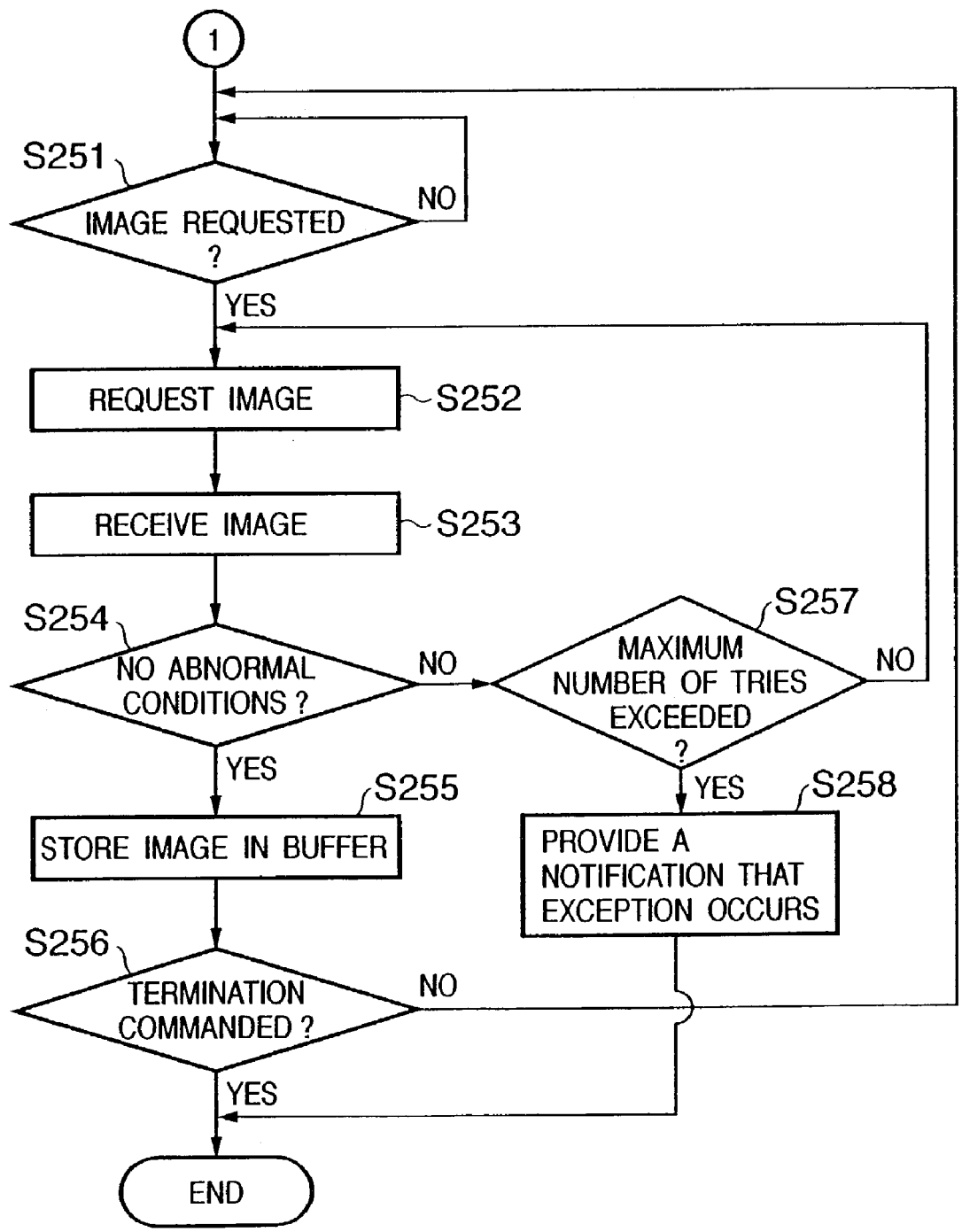
FIG. 28 is a flowchart showing a procedure of image reception process of the relay server according to the sixth embodiment of the present invention.
Figure 29:
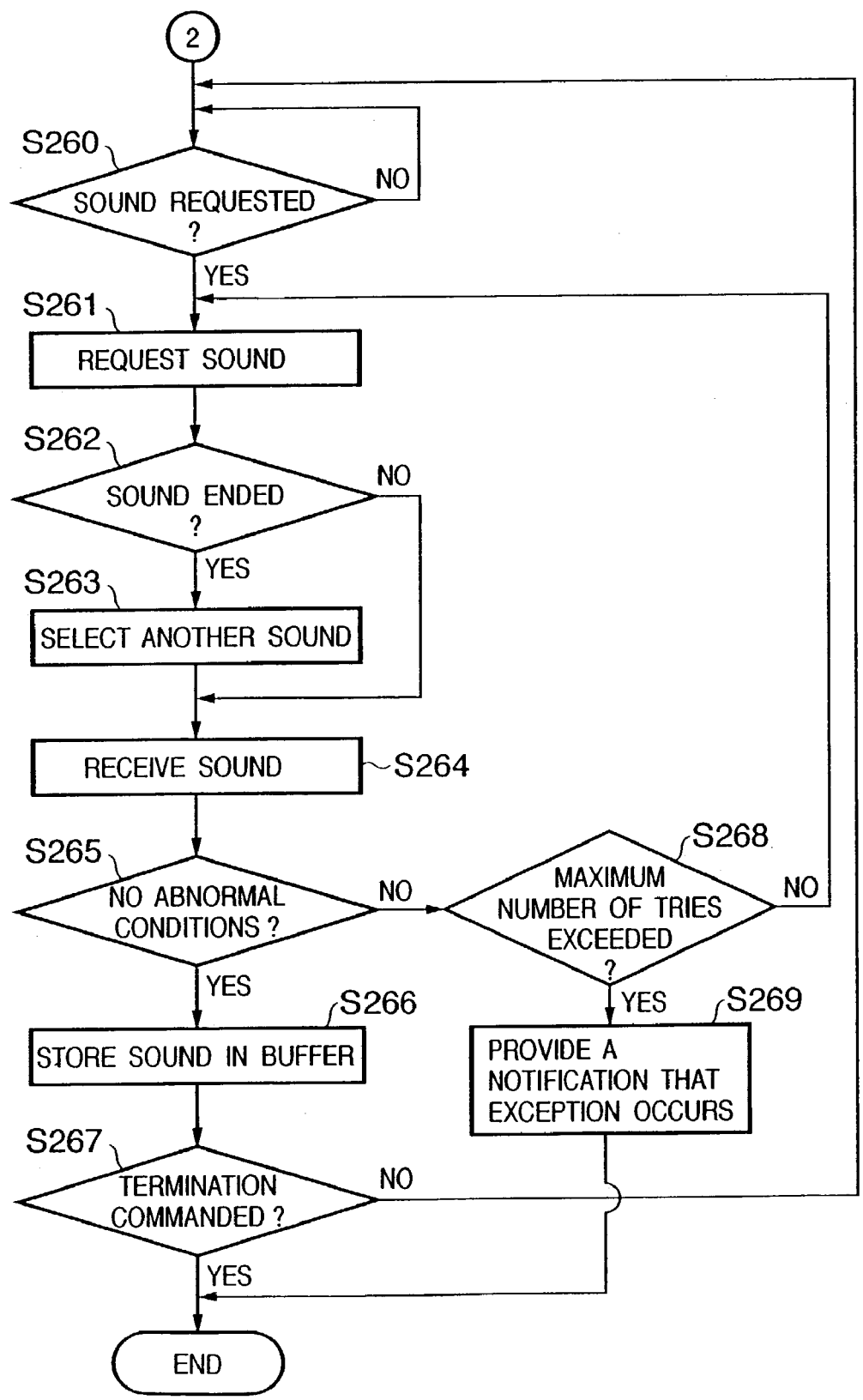
FIG. 29 is a flowchart showing a procedure of sound reception process of the relay server according to the sixth embodiment of the present invention.

The operation procedures of the image reception process 263 and the sound reception process 264 in the relay server 211 will now be described. FIG. 28 shows the operation procedure of the image reception process, and FIG. 29 shows the operation procedure of the sound reception process.

After processing is started, the image reception process 264 waits at step S251 until the image request event is raised from the request processing process 265. When the image request event occurs (YES in step S251), a request for the image is made to the image server 212 by designating the camera name at step S252, and at least an image of one frame is received at step S253. The number of frames may be requested from the client process 267, or the fixed number of frames may be preset.

Then, whether the image could be successfully obtained without abnormal conditions at steps S252 and S253 is determined at step S254. The abnormal condition refers to the cases where the image could not be received perfectly because the network was disconnected in the course of reception and so on. If it is determined that some abnormal condition occurred (NO in step S254), processing proceeds to step S257, where if it is determined that the number of tries is equal to or smaller than the maximum number, processing returns to step S252, where a try is made again to obtain the image. If the number of tries exceeds the maximum number, processing proceeds to step S258, where an exception raising event is issued to terminate the processing.

If it is determined that no abnormal conditions occurred at step S254, processing proceeds to step S255, where the received image is stored in a buffer. Then, whether a termination command is issued is checked at step S256. This is a command issued at step S243 in FIG. 27. If this command is issued, the processing is terminated. If the command is not issued, processing returns to step S251 to continue the processing.

The sound reception process 264 waits until the sound request event is raised from the request processing process 265 at step S260 after processing is started. When the sound request event is raised (YES in step S260), a request for a sound is made to the sound server 213 by designating the microphone 215 or the file name at step S261. Then, at step S262, if the requested sound is a sound file or the like, whether the sound ends is checked. This can be known by a response to the sound request. If the sound ends, a reference is made to the correspondence table 217 at step S263, and if there are a plurality of corresponding sound sources, the sound server 213 is requested to select another sound. Then, a sound of fixed duration is received at step S264. The period of time is set to a period of time corresponding to the number of frames received at a time by the image reception process 263.

Then, whether the sound could be successfully obtained without abnormal conditions at steps S261 and S264 is determined at step S265. The abnormal condition refers to the cases where the sound could not be received perfectly because the network was disconnected in the course of reception and so on. If it is determined that some abnormal condition occurred, processing proceeds to step S268, where if it is determined that the number of tries is equal to or smaller than the maximum number, processing returns to step S261, where a try is made again to obtain the sound. If the number of tries exceeds the maximum number, processing proceeds to step S269, where an exception raising event is issued to terminate the processing.

If it is determined that no abnormal conditions occurred (YES in step S265), processing proceeds to step S266, where the received sound is stored in a buffer. Then, whether a termination command is issued is checked at step S267. This is a command issued at step S243 in FIG. 27. If this command is issued, the processing is terminated. If the command is not issued, processing returns to step S260 to continue the processing.

Figure 30:
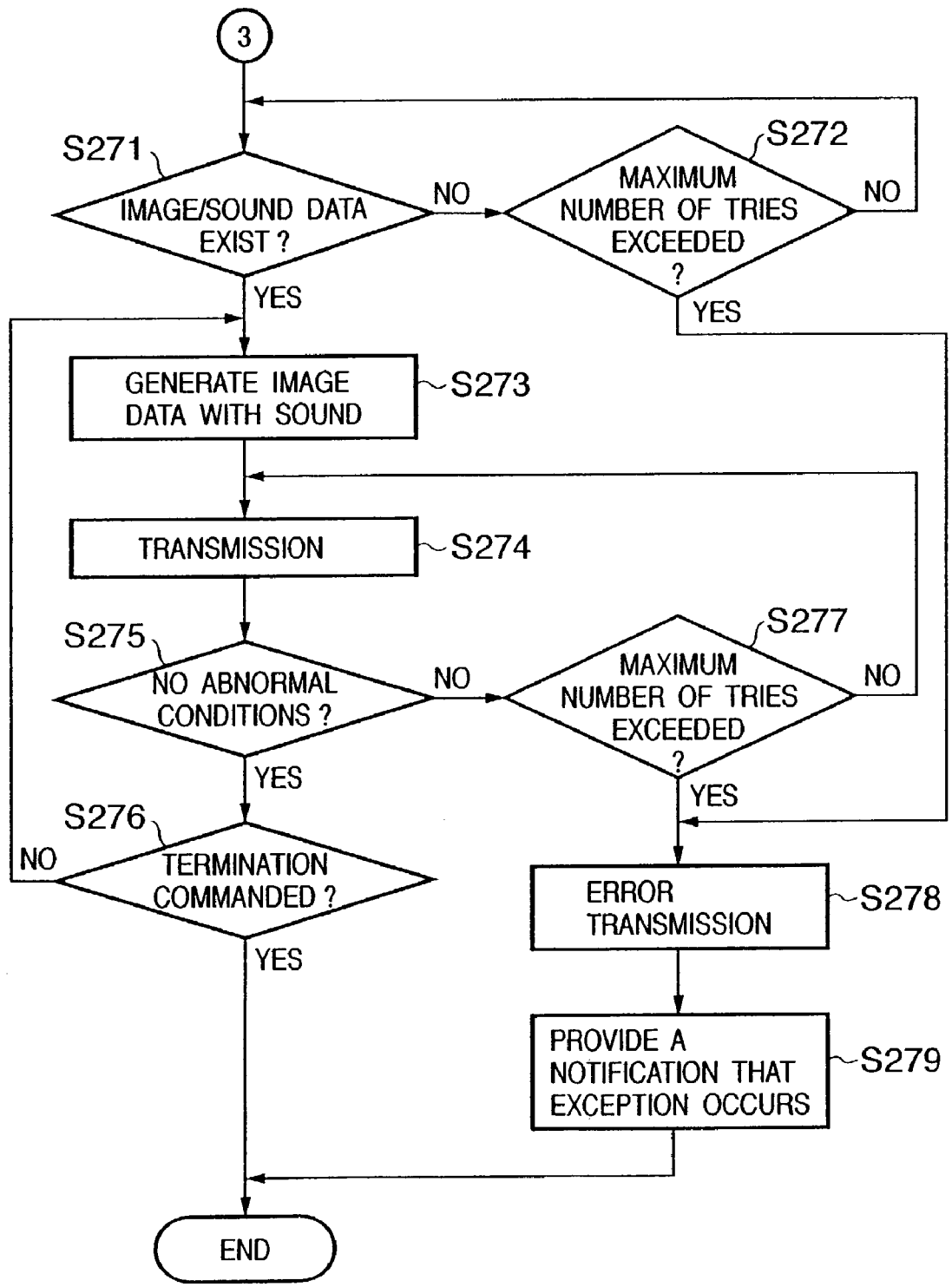
FIG. 30 is a flowchart showing a procedure of image-sound synthesis and transmission process of the relay server according to the sixth embodiment of the present invention.

The operation procedure of the image and sound transmission process 266 will now be described with reference to FIG. 30. After processing is started, whether image and sound data exist in an image buffer and a sound buffer is determined at step S271. If none of the data exists, processing proceeds to step S272. If it is determined more than the maximum number of tries that no image and sound data exit at step S272, processing proceeds to step S278, where an error is sent to the client 219, and at step S279, an exception event is raised to terminate the processing. If the number of tries is equal to or smaller than the maximum number, the step S271 is carried out again after waiting time elapses.

If it is determined that image and sound data exist at step S271, processing proceeds to step S273, where coded data is generated using each image and sound as an image with sound. There are a plurality of coding methods such as MPEG, RealVideo and Windows(R) Media, but the present invention is independent of the coding method. If either one of the image or the sound only exists, data can be coded. After data is coded, coded data is sent to the client 219 at step S274.

Then, whether an abnormal condition occurred at the time of sending data is determined at step S275. If it is determined that an abnormal condition occurred, whether a predetermined maximum number of tries for sending data is exceeded is determined at step S277. If it is determined that the maximum number is exceeded, processing proceeds to step S278, where an error is sent, and then the exception event is raised to terminate the processing at step S279. If the maximum number of tries is not exceeded, processing returns to step S274, where data is sent again.

If it is determined at step S275 that no abnormal condition occurred at the time of sending data, whether the termination command has been issued is determined at step S276. This may be issued in step S243 in FIG. 27, or may be issued as the exception event in the image reception process 263 or sound reception process 264. If it is determined that the termination command has been issued, the processing is terminated. If it is determined that the termination command has not been issued, processing returns to step S273, where data is kept coded and sent.

As apparent from the above description, according to the sixth embodiment, a web camera system and an information delivery system capable of adding an explanation of an image and an advertisement with sound can be built.

Seventh Embodiment

The seventh embodiment of the present invention will now be described. The seventh embodiment is such that the correspondence table 217 held by the relay server 211 is improved in function so that more detailed correspondence can be dealt with in the sixth embodiment. More detailed correspondence means that the image is brought into correspondence with the sound more precisely using camera parameters such as pan, tilt and zoom, time periods, and personal data such as the age, sex and address of the user. The hardware and software configurations of the seventh embodiment are same as those of the sixth embodiment, and the correspondence table 217 managed by the relay server 211 and the operation of the request processing process 265 of the seventh embodiment are different from those of the sixth embodiment. Therefore, only aspects different from those of the sixth embodiment will be described below.

Examples of the correspondence table and condition table held by the relay server in this embodiment are shown in FIGS. 31A and 31B. FIG. 31A shows an example of a condition table 281, and FIG. 31B shows an example of the correspondence table 282. For the condition table 281, each line is assigned a number as one condition, and conditions of the time period, camera parameters such as pan, tilt and zoom, and personal information of the user such as the age, sex and address are retained as values and ranges of values for each condition number.

In the correspondence table 282, a column in which a condition of connection is retained as a condition number is added for each image number, compared with the correspondence table 273 of the sixth embodiment. If None is described in the condition column, it means that correspondence is unconditionally established. If the user designates an image, correspondence between the image and sound is permitted only when all accompanying conditions are satisfied. If all accompanying conditions are not satisfied, a sound may not be sent, or a sound to be brought into correspondence in such a case may be determined in advance.

Figure 32:
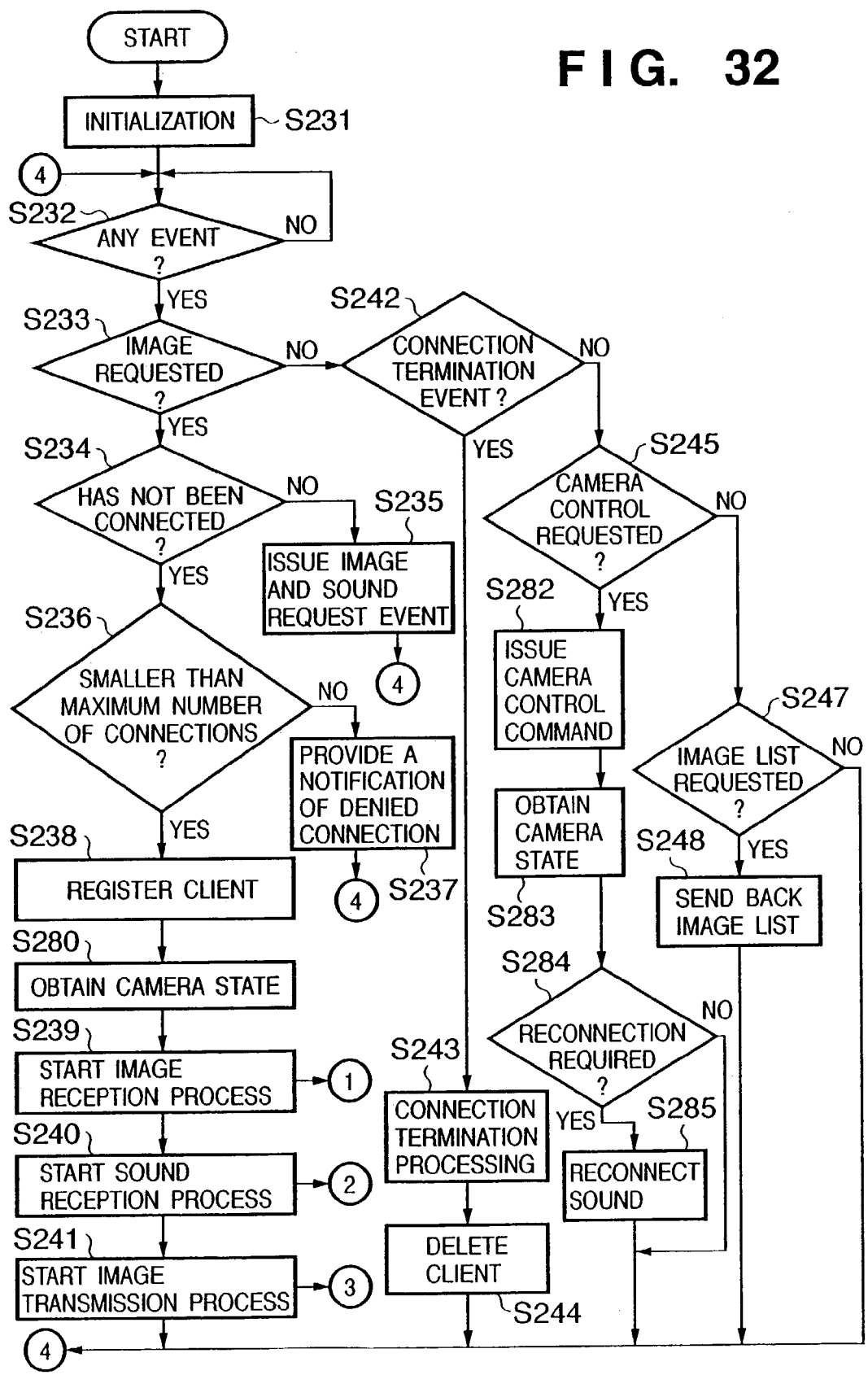
FIG. 32 is a flowchart showing a procedure of request processing process of the relay server according to the seventh embodiment of the present invention.

Now, the operation procedure of the request processing process 265 operating on the relay server 211 in the seventh embodiment is shown in FIG. 32. In FIG. 32, same step numbers are given to operations same as those in FIG. 27, and only different aspects will be described.

For processing of the image request event under step S233, if conditions of camera parameters exist in the condition table 281, a camera condition is obtained from the corresponding image server 212 referring to the table 271 of FIG. 26 at step S280. This is the processing of obtaining camera parameters of a camera corresponding to an image desired by the client. Then, a set consistent with conditions such as camera parameters is retrieved from the condition table 281 by referring to conditions in the condition table 281, and the sound corresponding to the condition number is selected from the correspondence table 282 of FIG. 31B. Then, the relay server 211 issues a request for obtaining the sound data to the corresponding sound server 213 corresponding to the sound selected in step S239, and receives the sound data.

If personal information of the user exists in the condition table 281, the client 219 needs to send the personal information of the user. In this case, the personal data is sent at the same time when a request for an image is sent from the client 219 to the relay server 211. The relay server 211 retrieves a set consistent with the condition from the condition table 281 based on the received personal data, and selects the sound corresponding to condition number from the correspondence table 282. Then, the relay server 211 issues a request for obtaining the sound data to the corresponding sound server 213 corresponding to the sound selected in step S239, and receives the sound data.

Also, if time information exists in the condition table 281, the relay server 211 retrieves from the condition table 281 a set of time periods included in the time just when the request for obtaining image data was made from the client 219, and selects the sound of a corresponding condition number from the correspondence table 282. Then, the relay server 211 issues a request for obtaining the corresponding sound data to the sound server 213 corresponding to the selected sound, and receives the sound data at step S239.

If the camera control request is made from the client (YES in step S245), a command for control the camera is issued to the image server 212 at step S282. Then, parameter information of the camera is obtained at step S283. Then, whether reconnection is necessary for the sound is determined at step S284. This is performed for checking whether the condition when the current connection was permitted is still effective after control of the camera by referring to the condition table 281 of FIG. 31A again. If the condition is still effective, processing proceeds to step S232, where a next event is awaited. If the condition is not effective, reconnection is required, and therefore the sound number of a corresponding condition number is found from the correspondence table 281 of FIG. 31B after referring to the condition table 281 of FIG. 31A again, and reconnection processing is carried out at step S285. This is the processing of designating the sound server 212 and the microphone 215 or the file to restart the sound reception process.

As described above, according to the seventh embodiment, correspondence can be determined in more detail by designating conditions such as time, camera parameters and personal information of the user, and as a result, what is displayed on the screen can accurately be explained when the image is explained with sound, and an effective sound can be added to an image in the sound advertisement and the like.

Eighth Embodiment

The eighth embodiment of the present invention will now be described. The eighth embodiment is such that a movable body terminal such as a cellular phone can be used in addition to the PC client in the sixth or seventh embodiment. The system configuration of the eighth embodiment is shown in FIG. 33.

Figure 33:
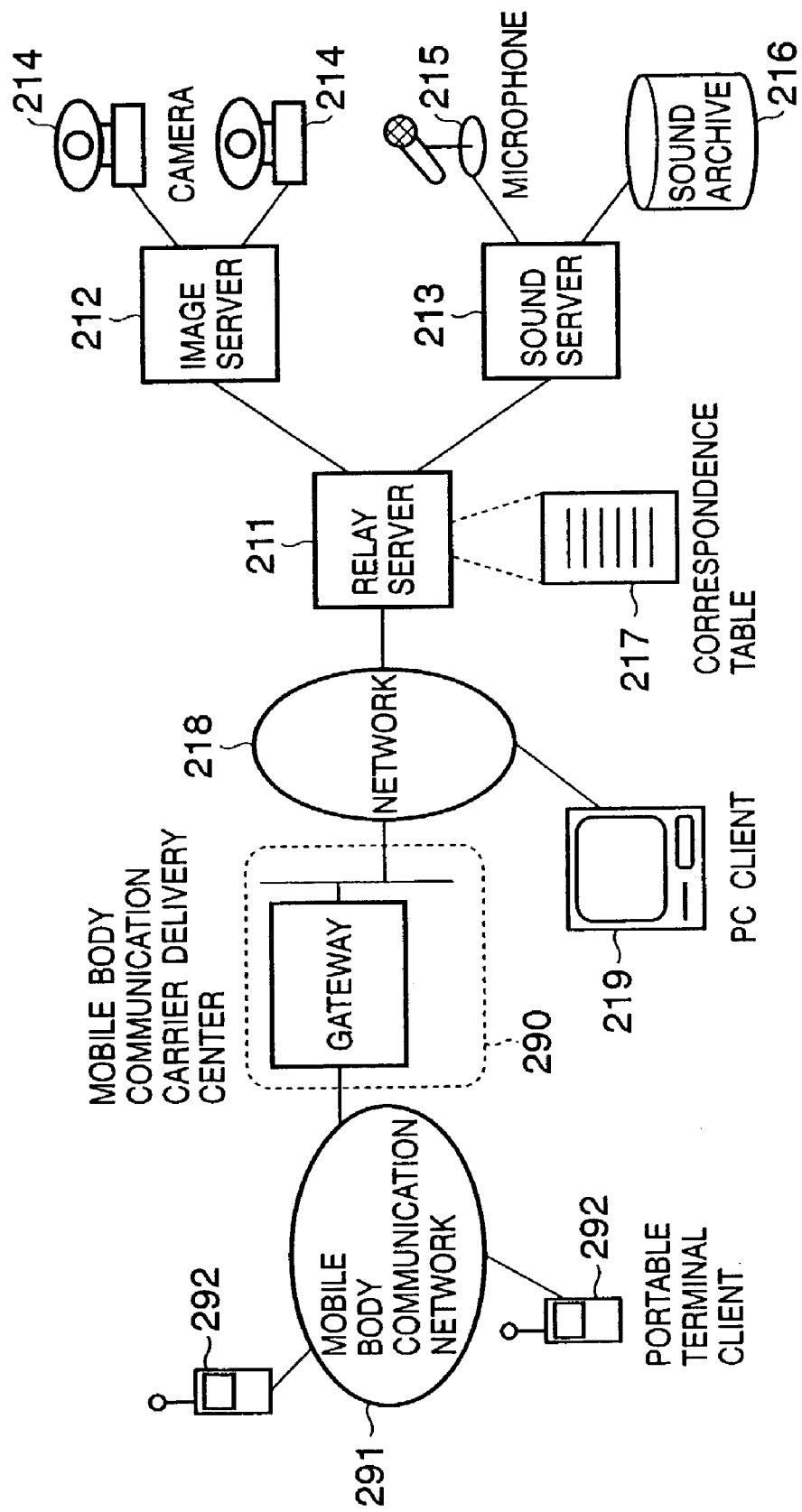
FIG. 33 is a block diagram showing an outlined configuration of the information delivery system according to an eighth embodiment of the present invention.

FIG. 33 shows a mobile body communication network and a cellular phone client in addition to entities shown in FIG. 22.

In FIG. 33, same reference numbers are given to configurations same as those in FIG. 22 and descriptions thereof are omitted, and only different aspects will be described. A portable terminal client 292 establishes connection with a gateway of a delivery center 290 of a mobile body communication carrier via a mobile body communication network 291. Then, the gateway converts data of a communication method in the mobile body communication network to data of a communication method on a network 218 to exchange information. Communication methods between the portable terminal client 292 and the gateway include a line exchange method and a packet communication method.

If a cellular phone is used as a terminal, a telephone number is assigned for each image sensed by each camera 214 in the gateway in the delivery center 290, and when a call is made from the terminal to a telephone number corresponding to an image, a request for the corresponding image is made from the gateway in the delivery center 290 to the relay server 211. Then, image data with sound from the relay server 211 is converted into an image stream for mobile body communication in the gateway, whereby the data can be received and played back by the terminal.

For connection by the packet communication method, if a well known service for playing back an image sequence clip, the relay server 211 creates and sends back a video clip with an image and a corresponding sound combined together when the camera 214 is designated to the relay server 211, and thus this video clip can be received via the gateway and played back by the terminal.

Also, if the line exchange and the packet exchange can be connected at a time, the camera can be operated on the screen on the cellular phone terminal, thus making it possible to obtain a still image while receiving sound data. In this case, image data with sound sent back from the relay server 211 is divided into still image data for packet communication and sound data for line exchange in the gateway, and is sent to the terminal.

As described above, according to the eighth embodiment, a web camera operation with sound using as a client the portable terminal using the mobile body communication network can be carried out in the sixth embodiment.

Ninth Embodiment

The ninth embodiment of the present invention will now be described. The ninth embodiment is such that the correspondence table 217 (273 or 282) between images and sounds and the condition table 281 held by the relay server 211 can be changed in the sixth and seventh embodiments. This is achieved by sending a request for addition, update, deletion and the like to the relay server 211.

a) Request for addition and update 1 to correspondence table: http://host-address:port/addctbl?video=id&sound=id [&sound=id . . . ] wherein the id represents an image number for video=id, and represents a sound number for sound=id (a plurality of numbers can be designated). Reply: HTTP/1.0 200 OKContent-Type text/plain¥r¥nOKvideo=video_id wherein video_id represents an image number.

b) Request for deletion from correspondence table: http://host-address:port/delctbl?video=id [&video=id . . . ] wherein the id of video=id represents an image number (a plurality of numbers can be designated). Reply: HTTP/1.0 200 OKContent-Type text/plain¥r¥nOK.

For the request for addition and update to the correspondence table, an image number and a sound number corresponding to the image are designated. A plurality of sound numbers can be designated. For the request for deletion, an image number is designated to delete corresponding data. A plurality of image numbers to be deleted can be designated. If the client makes a connection request for the deleted image number, only the image is relayed, or correspondence of a defined sound is determined in advance.

Next, for addition and update to and deletion from the condition table 281 shown in FIG. 31A, the following requests and replies can be defined and executed.

c) Request for addition and update to condition table: http://host-address:port/addqtbl?qid=num&attr=val1+val2[&attr=val1+val2...] wherein the num of qid=num represents a condition number. The attr of attr=val1+val2 represents an attribute name, and val1 and val2 represent lower and upper limits, respectively. Also, examples of attr include pan, tilt, zoom, time, age and sex. Reply: HTTP/1.0 200 OKContent-Type text/plain¥r¥nOKqid=qualify_id wherein qualify_id represents a condition number.

d) Request for deletion from condition table: http://host-address:port/delqtbl?qid=num [&qid=num...] wherein the id of qid=id represents a condition number (a plurality of numbers can be designated). Reply (when successful): HTTP/1.0 200 OKContent-Type text/plain¥r¥nOK.

In the case of addition and update to the condition table 281, if a condition of the designated condition number exists, the condition is updated, and if the condition does not exist, it is added. If the condition number is not designated, a new condition number is given and sent back. In the case where deletion from the condition table is designated, a condition corresponding to the condition number is deleted, if any.

Next, if accompanying conditions are updated in addition and update to the correspondence table 282 of FIG. 31B, attributes associated with the conditions may be added to the above described form of the request for addition and update. That is, the above described addition and update 1 to the correspondence table 273 is modified as follows.

e) Request for addition and update 2 to correspondence table: http://host-address:port/addctbl?video=id [&qid=id] [&sound=id [&sound=id ... ]] wherein the id of video=id represents an image number. The id of sound=id represents a sound number (a plurality of numbers can be designated). The id of qid=id represents a condition number.

For the operation of the relay server 211 for achieving the update, the procedure of update to the correspondence table and the condition table is added to the operation procedure of the relay server 211 in FIG. 32. That is, if requests such as those of a) to e) described above in event processing, alteration processing such as addition and update to and deletion from the correspondence table 273 or 282 and/or the condition table 281 is carried out, and a next event is awaited.

As described above, according to the ninth embodiment, correspondence and correspondent conditions can be altered dynamically by applying alteration processing such as addition and update and deletion to the correspondence table of images and sounds and the condition table used by the relay server in the sixth and seventh embodiments.

As described above, a system capable of receiving image data and sound data from an image sending apparatus and a sound sending apparatus, respectively, and delivering image data with sound with the received image and sound data combined together to a reception apparatus can be built.

Tenth Embodiment

Figure 34:
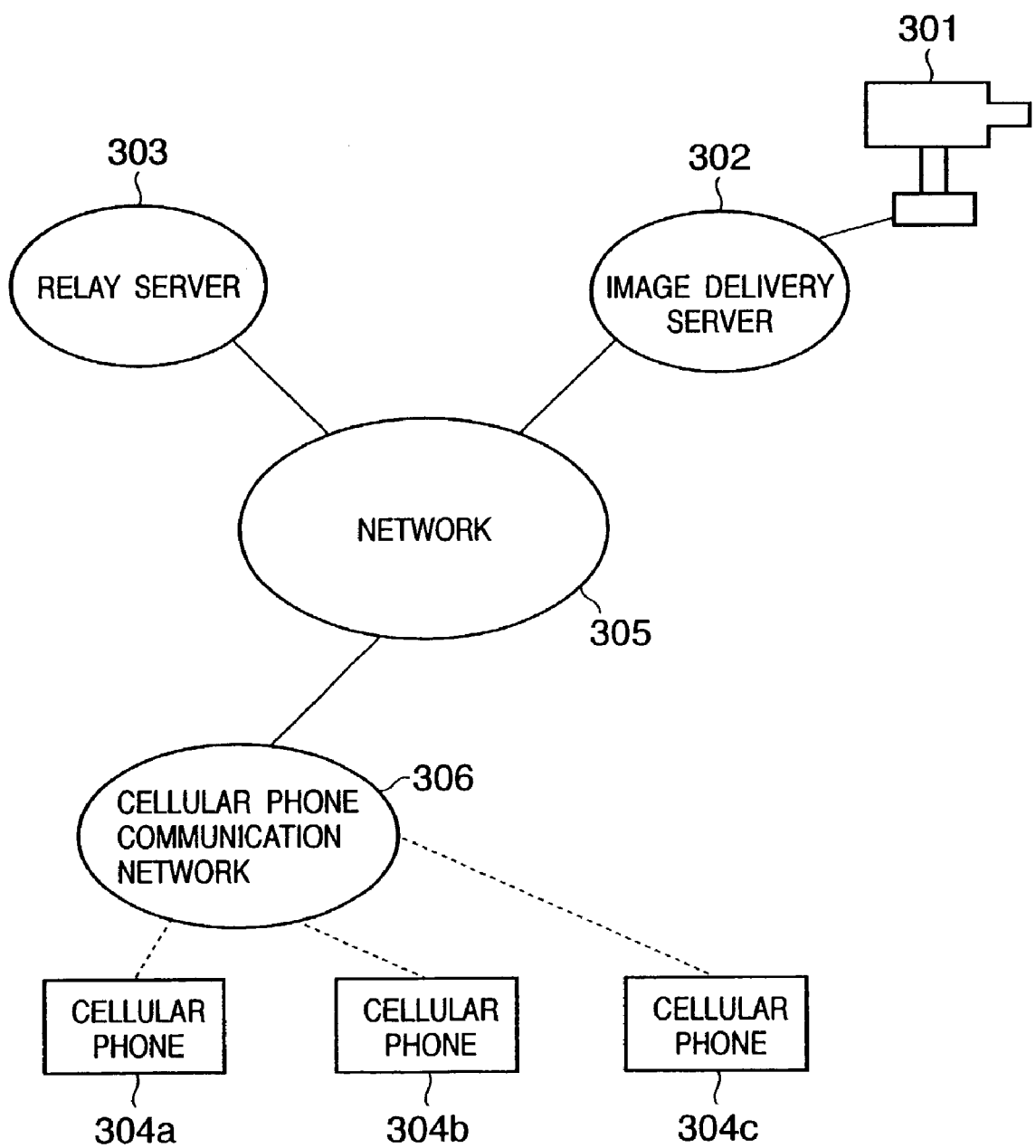
FIG. 34 shows a configuration of the information delivery system according to a tenth embodiment of the present invention.

FIG. 34 shows an example of an image delivery system using a relay server as a conversion apparatus for converting the coding method of image data in the tenth embodiment.

In FIG. 34, a camera 301 obtains an image in real time, and in an image delivery server 302, image data is converted to the QVGA or 1/16 VGA size, and the image data is coded by the JPEG method. A relay server 303 converts image data of the QVGA or 1/16 VGA size to image data of the QCIF image size and also converts JPEG image data to the MPEG image data in a manner described later for delivering the image to a cellular phone communication network 306. By the system described above, the image from the camera can be delivered to cellular phones 304a, 304b, 304c . . . .

Furthermore, in the tenth embodiment described below, the coding method of the image before conversion of coding is the JPEG coding method, and the coding method of the image after conversion of coding is the MPEG4 image coding method. However, the procedure is effective for combinations of other coding methods including processing procedures of block division, orthogonal conversion and entropy coding, and the images before and after conversion of coding may be of the same coding method.

Figure 35:
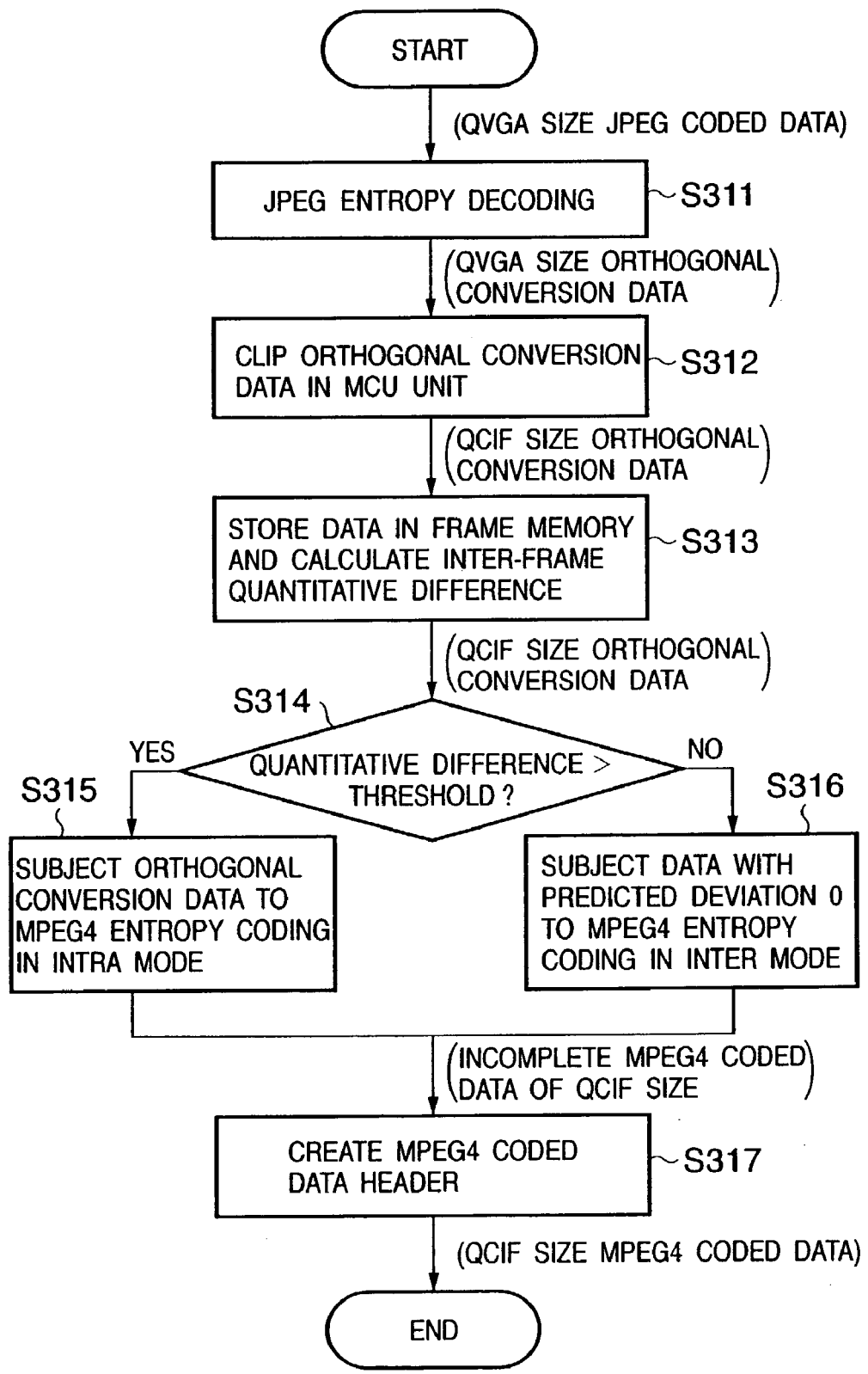
FIG. 35 is a flowchart showing conversion processing according to the tenth embodiment of the present invention.

FIG. 35 is a flowchart showing the procedure of a method of converting coded data by the relay server 303 in which image data for the QVGA image display size (lateral 320 pixels and longitudinal 240 pixels) is converted to image data for the smaller QCIF image display size (lateral 176 pixels and longitudinal 144 pixels) in the tenth embodiment of the present invention.

Note that, in the embodiment described below, the procedure is effective for combinations of other image sizes as long as the image size after conversion of coding is smaller than the image size before conversion of coding.

At step S311 of FIG. 35, JPEG coded image data of the QVGA size is subjected to JPEG entropy-decoding (Huffman-decoding or arithmetic-decoding) to create orthogonal conversion image data of the QVGA size (more specifically, create orthogonal conversion image data of each block obtained for each MCU (Minimum Coding Unit) included in the QVGA size image area).

At step S312, as described later with reference to FIG. 36, the area of QCIF size image data is clipped from the area of QVGA size image data along the partial MCU borderline (more generally, partial block borderline) to obtain QCIF size orthogonal conversion data (more specifically, obtain orthogonal conversion data of the block obtained for each MCU included in the QCIF size image area).

Now, the clipping of QCIF size image data from QVGA size image data will be described with reference to FIG. 36.

Figure 36:
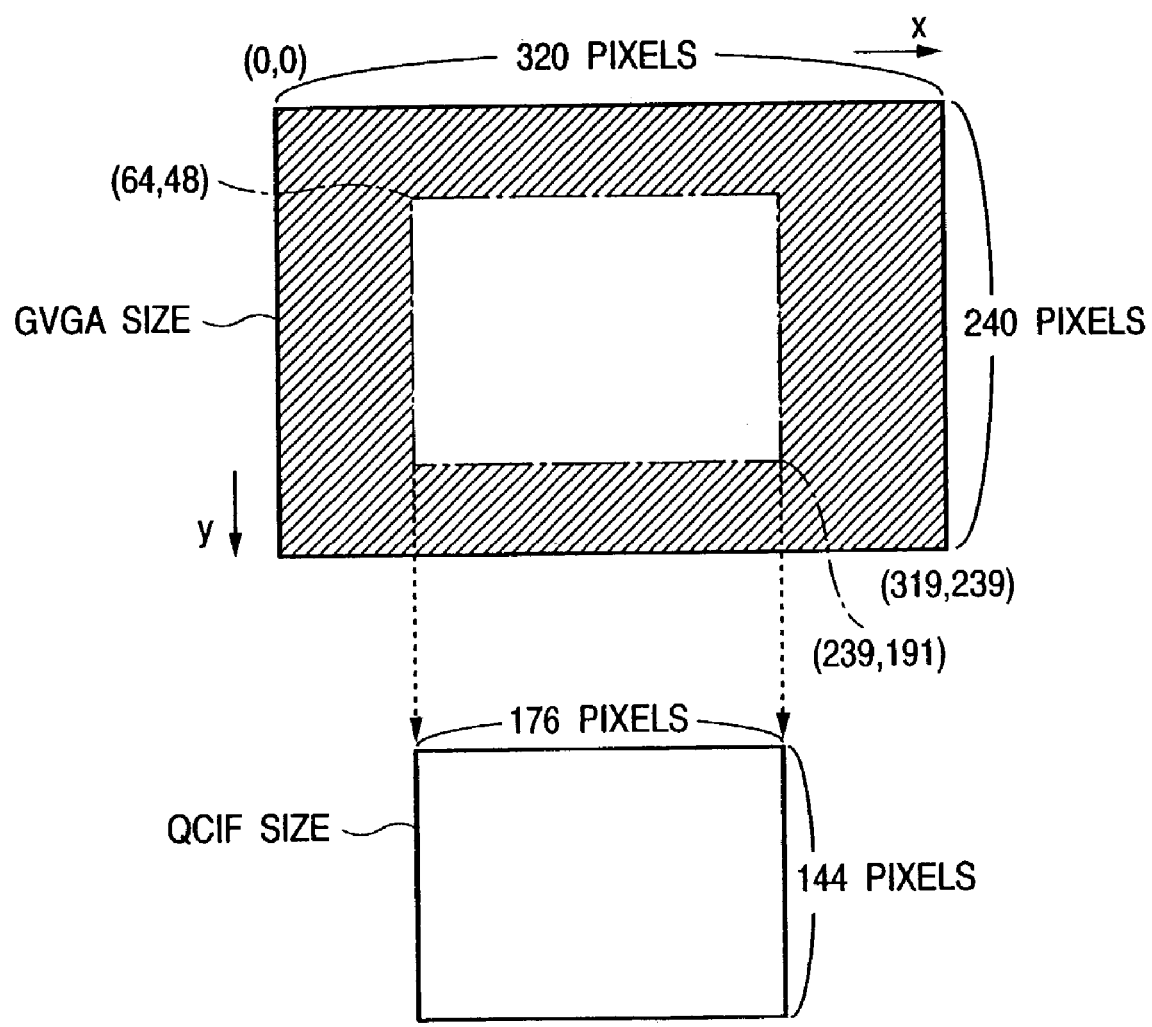
FIG. 36 illustrates the conversion of the image size according to the tenth embodiment of the present invention.

FIG. 36 shows the correspondence between image areas when the QCIF size image area is clipped from the QVGA size image area. Provided that the coordinate in the upper left-hand corner of the QVGA size image area is (0, 0) and the coordinate in the lower right-hand corner is (319, 239), and if the coordinate in the upper left-hand corner of the image area to be clipped therefrom is (x1, y1), the coordinate in the lower right-hand corner is (x1+175, y1+143). Here, x1 and y1 each should be a multiple of the size of a minimum processing unit, MCU (Minimum Coding Unit) in JPEG coding. If the MCU corresponds to the image area of lateral 16 pixels and longitudinal 16 pixels, each of x1 and y1 should be a multiple of 16, and a candidate value of x1 is one of 0, 16, 32, 48, 64, 80, 96, 112, 128 and 144, and a candidate value of y1 is one of 0, 16, 32, 48, 64, 80 and 96. FIG. 36 shows, as an example, the clipping of an image area in which the coordinate in the upper left-hand corner is (64, 48) and the coordinate in the lower right-hand corner is (239, 191).

Now, referring to FIG. 35 again, the QCIF size orthogonal conversion image data obtained at step S312 is stored in a frame memory, and orthogonal conversion image data of the immediately preceding frame stored in the frame data is compared with orthogonal conversion image data of the current frame obtained at step S312 for each block (image area including lateral 16 pixels and longitudinal 16 pixels) in MPEG4 to calculate an inter-frame quantitative difference of orthogonal conversion data for each block at step S313.

The inter-frame quantitative difference calculated at step S313 is compared with a predetermined threshold at step S314, and processing proceeds to step S315 if the inter-frame quantitative difference is larger than the threshold, and processing proceeds to S316 if the inter-frame quantitative difference is equal to or smaller than the threshold.

That is, either one of processing in step S315 and processing in step S316 is selected for each block depending on the inter-frame quantitative difference to carry out processing of image data.

Orthogonal conversion data obtained at step S312 is subjected to MPEG4 entropy coding (Huffman coding or arithmetic coding defined in MPEG4) in the INTRA mode (mode in which data is coded using image data in the current frame) at step S315. On the other hand, at step S316, it is determined that there is no inter-frame predicted deviation, and MPEG4 entropy coding is carried out in the Inter mode (inter-frame predictive coding mode) based on information of inter-frame predicted deviation.

At step S317, MPEG4 coded data in blocks created at step S315 or step S316 are arranged in order to create incomplete MPEG4 coded data of the QCIF size having no header, and an appropriate MPEG4 coded data header is created and added to the head of the data, whereby QCIF size MPEG4 coded data is created.

In this way, the coding conversion processing of converting data from QVGA size JPEG image data to the QCIF size MPEG image is completed.

It should be noted that all steps S313 to S316 are not always required. If all blocks are processed in the INTRA mode, steps S313, S314 and S316 may be omitted and only processing at step S315 is performed. However, use of the Inter mode results in a higher compressibility rate of coded data compared to the case where all blocks are processed in the INTRA mode.

Eleventh Embodiment

Processing in a method of converting coded data of an image by the image delivery server in the eleventh embodiment will be described below with reference to FIGS. 37 and 38.

Figure 37:
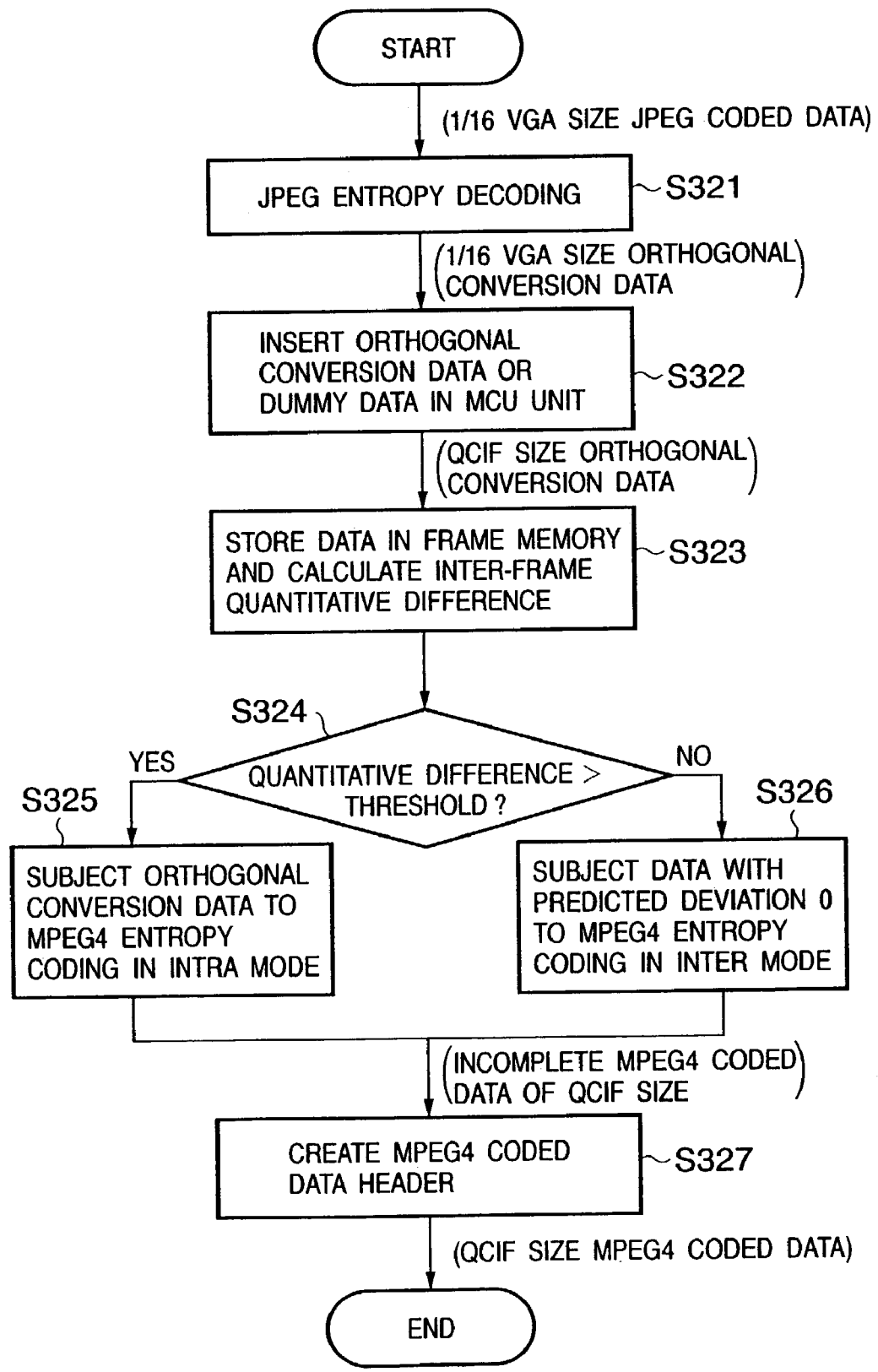
FIG. 37 is a flowchart showing conversion processing according to an eleventh embodiment of the present invention.

FIG. 37 is a flowchart showing the procedure of the method of converting coded data by the server in which image data of the 1/16 VGA image display size (lateral 160 pixels and longitudinal 120 pixels) is converted to image data of the larger QCIF image display size (lateral 176 pixels and longitudinal 144 pixels) in the eleventh embodiment.

Note that the procedure in the eleventh embodiment described below is effective for combinations of other image sizes as long as the image size after conversion of coding is larger than the image size before conversion of coding.

At step S321 of FIG. 37, JPEG coded image data of the 1/16 VGA size is subjected to JPEG entropy-decoding (Huffman-decoding or arithmetic-decoding) to create orthogonal conversion image data of the 1/16 VGA size (more specifically, create orthogonal conversion data of each block obtained for each MCU (Minimum Coding Unit) included in the 1/16 VGA size image area).

Figure 38:
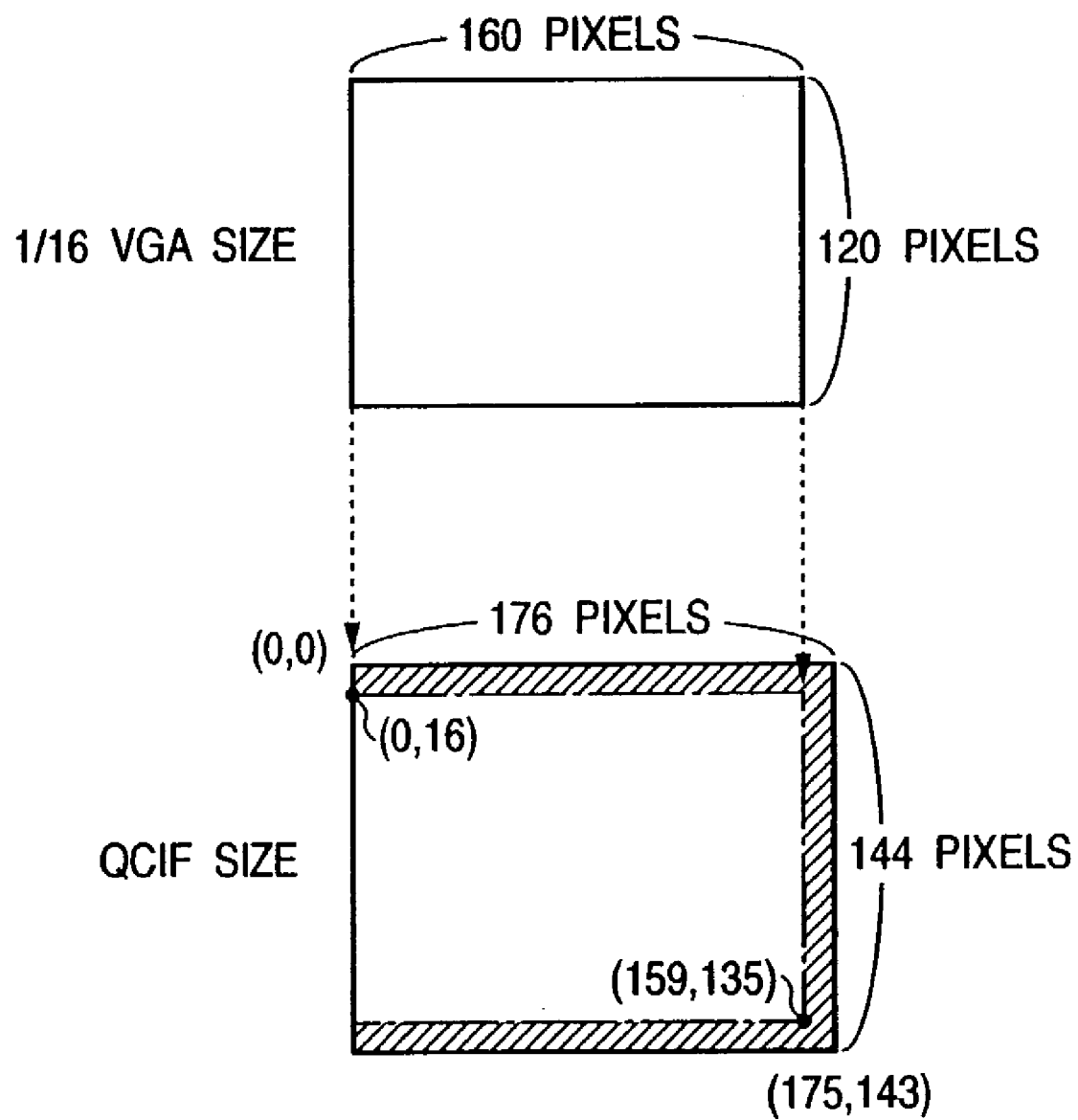
FIG. 38 illustrates the conversion of the image size according to the eleventh embodiment of the present invention.

At step S322, as shown in FIG. 38, the entire area of the 1/16 VGA size image is inserted along the partial MCU borderline (more generally partial block borderline) of the QCIF size image area, and dummy data (orthogonal conversion data having a predetermined value) is inserted in the remaining part to create QCIF size orthogonal conversion data (more specifically, create orthogonal conversion data of the block obtained for each MCU included in the QCIF size image area).

The method of generating QCIF size image data from QVGA size image data will now be described with reference to FIG. 38.

FIG. 38 shows the correspondence between image areas when the entire image area of the 1/16 VGA size is inserted in the QCIF size image area. Provided that the coordinate in the upper left-hand corner of the QCIF size image area is (0, 0) and the coordinate in the lower right-hand corner is (175, 143), and if the coordinate in the upper left-hand corner of the 1/16 VGA size image area to be inserted therein is (x2, y2), the coordinate in the lower right-hand corner is (x2+159, y2+119). Here, x2 and y2 each should be a multiple of the size of a minimum processing unit, MCU (Minimum Coding Unit) in JPEG coding. If the MCU corresponds to the image area of 16 pixels in width and 8 lines in height, x2 should be a multiple of 16 and y2 should be a multiple of 8, and in this case, a candidate value of x2 is 0 or 16, and a candidate value of y2 is 0, 8, 16 or 24. FIG. 38 shows, as an example, the insertion of the 1/16 VGA size image area in the position in which the coordinate in the upper left-hand corner is (0, 16) and the coordinate in the lower right-hand corner is (159, 135). Dummy data is inserted in the remaining image area shown by oblique lines.

Now, referring to FIG. 35 again, the QCIF size orthogonal conversion image data created at step S322 is stored in a frame memory, and orthogonal conversion image data of the immediately preceding frame stored in the frame memory is compared with orthogonal conversion image data of the current frame created at step S322 for each block (image area including 16 pixels in width and 16 lines in height) in MPEG4 to calculate an inter-frame quantitative difference of orthogonal conversion data for each block at step S323.

The inter-frame quantitative difference calculated at step S323 is compared with a predetermined threshold at step S324, and processing proceeds to step S325 if the inter-frame quantitative difference is larger than the threshold, and processing proceeds to S326 if the inter-frame quantitative difference is equal to or smaller than the threshold.

Processing is carried out for each block both at step S325 and step S326. Orthogonal conversion data created at step S322 is subjected to MPEG4 entropy coding (Huffman coding or arithmetic coding defined in MPEG4) in the INTRA mode (mode in which data is coded using image data in the current frame) at step S325. On the other hand, at step S326, it is determined that there is no inter-frame predicted deviation, and MPEG4 entropy coding is carried out in the Inter mode (inter-frame predictive coding mode) based on information of inter-frame predicted deviation.

At step S327, MPEG4 coded data in blocks created at step S325 or step S326 are arranged in order to create incomplete MPEG4 coded data of the QCIF size, and an appropriate MPEG4 coded data header is created and added to the head of the data, whereby QCIF size MPEG4 coded data is created.

In this way, the coding conversion processing of converting ¹⁄₁₆ VGA size JPEG image data to the QCIF size MPEG image data is completed.

Furthermore, a server can be built in conjunction with the tenth and eleventh embodiments. For example, whether the image display size before conversion of coding is larger than or smaller than the image display size after conversion of coding is determined in advance, and according to the result of the determination, whether processing of the tenth embodiment is carried out or processing of the eleventh embodiment is carried out is determined.

Twelfth Embodiment

Figure 39:
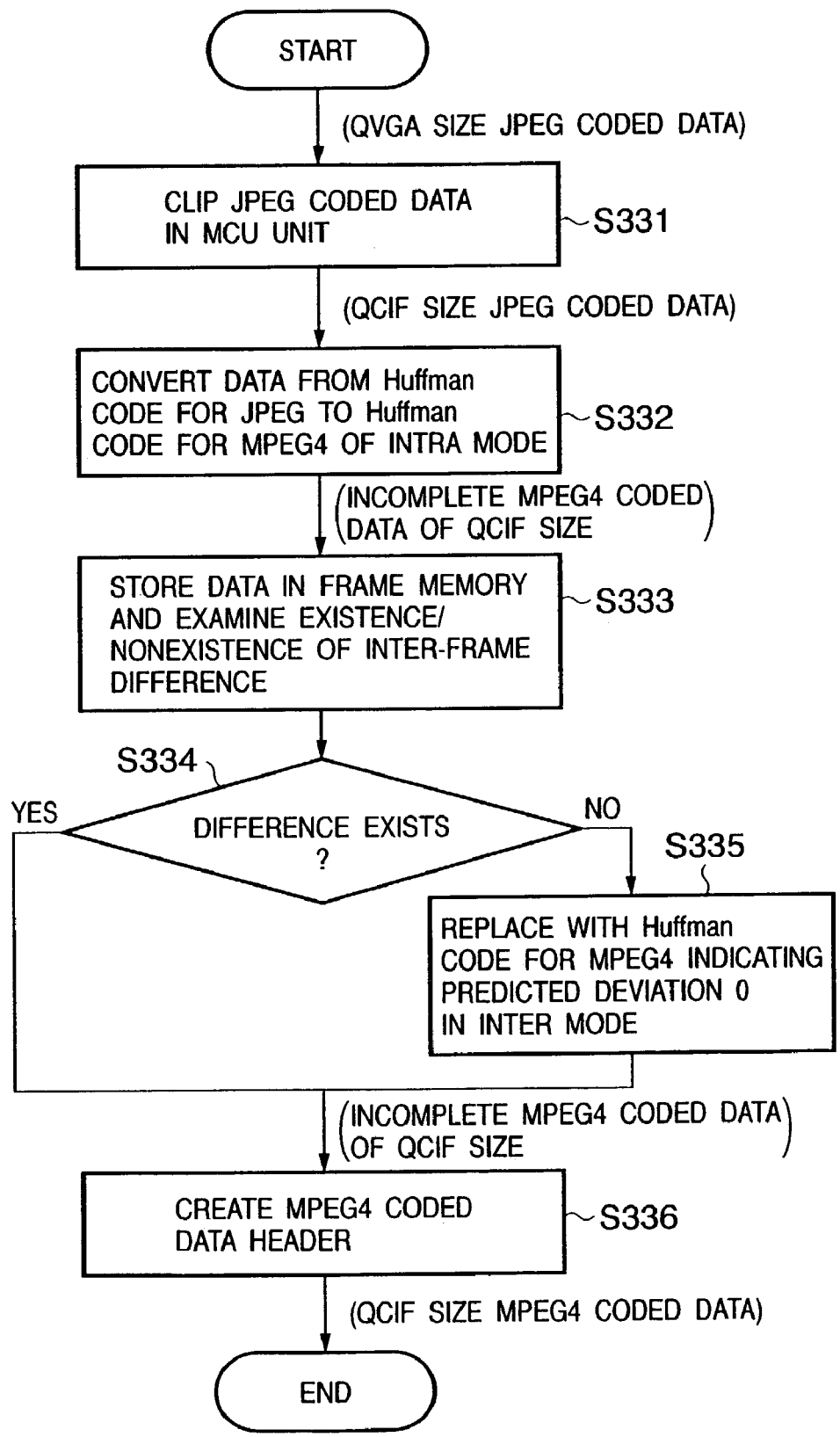
FIG. 39 is a flowchart showing conversion processing according to the twelfth embodiment of the present invention.

FIG. 39 is a flowchart showing another procedure of the method of converting coded data by the server in which image data of the QVGA image display size (lateral 320 pixels and longitudinal 240 pixels) is converted to image data of the smaller QCIF image display size (lateral 176 pixels and longitudinal 144 pixels) in the twelfth embodiment.

Orthogonal conversion data included in the image area clipped is obtained in the tenth embodiment, while JPEG coded data included in the image area clipped is obtained in the twelfth embodiment.

Note that the Huffman coding is used as an entropy coding method in both the JPEG coding and MPEG4 image coding, but an almost same procedure can be achieved for combinations of other coding methods including procedures of block division, orthogonal conversion and entropy coding.

Further, the twelfth embodiment described below, as in the case of the tenth embodiment, is effective for combinations of other image sizes as long as the image size after conversion of coding is smaller than the image size before conversion of coding.

At step S331 of FIG. 39, the QCIF size image area is clipped from the QVGA size image area along any MCU borderline (more generally block borderline) as shown in FIG. 36, whereby JPEG-coded image data of the QCIF size is obtained (more specifically, JPEG coded image data included in the QCIF size image area is obtained).

At step S332, data is converted from the Huffman code for JPEG (Huffman code used in JPEG coding) included in JPEG coded image data obtained at step S331 to the Huffman code for MPEG4 of the INTRA mode (Huffman code used in INTRA mode coding in the MPEG4 image coding). Here, for achieving the step S332, the contents of the Huffman code table for JPEG and the contents of the Huffman code table for MPEG4 should be recognized in advance.

Note that the Huffman code table for MPEG4 is recognized in advance because it is prepared by an apparatus (relay server) to which the twelfth embodiment is applied, or software itself. On the other hand, the Huffman code table for JPEG can be obtained by analyzing the header portion of JPEG coded data prior to the processing in FIG. 39 because the table is defined in the header portion of JPEG coded data. Alternatively, if it is known that the image delivery server sending JPEG coded data uses the Huffman code table for JPEG having same contents on every occasion, the Huffman code table for JPEG is simply stored.

If strings of Huffman codes for MPEG4 obtained at step S232 are brought together into one frame, incomplete (headerless) MPEG4 coded data of the QCIF size is obtained. At step S333, strings of Huffman codes for MPEG4 obtained at step S332 are stored in the frame memory one after another, and strings of Huffman codes for MPEG4 of the immediately preceding frame stored in the frame memory are compared with strings of Huffman codes for MPEG4 of the current frame obtained at step S332 for each block (area of lateral 16 pixels and longitudinal 16 pixels) in MPEG4 to examine existence/nonexistence of an inter-frame difference of strings of Huffman codes for MPEG4 for each block.

At step S334, according to existence/nonexistence of the inter-frame difference examined at step S333, processing immediately proceeds to step S336 (no additional processing is carried out) if the inter-frame difference exists, and processing proceeds to step S335 (additional processing is carried out) if no inter-frame difference exists. At step S335, all strings of Huffman codes for MPEG4 included in the currently processed macro block are replaced with strings of Huffman codes for MPEG4 indicating predicted deviation 0 of the Inter mode.

At step S336, stings of Huffman codes for MPEG4 obtained at step S332 or step S335 are brought together into one frame to create QCIF size MPEG 4 coded data, and an appropriate MPEG4 coded data header is created and added to the head of the data, whereby QCIF size MPEG4 coded data is created.

In this way, the coding conversion processing of converting the QVGA size JPEG image data to the QCIF size MPEG image data is completed.

It should be noted that steps S333 to S335 are not always required. If all macro blocks are processed in the INTRA mode, all of steps S333 to S335 may be omitted. However, use of the Inter mode results in a higher compressibility rate of coded data compared to the case where all macro blocks are processed in the INTRA mode.

Thirteenth Embodiment

Figure 40:
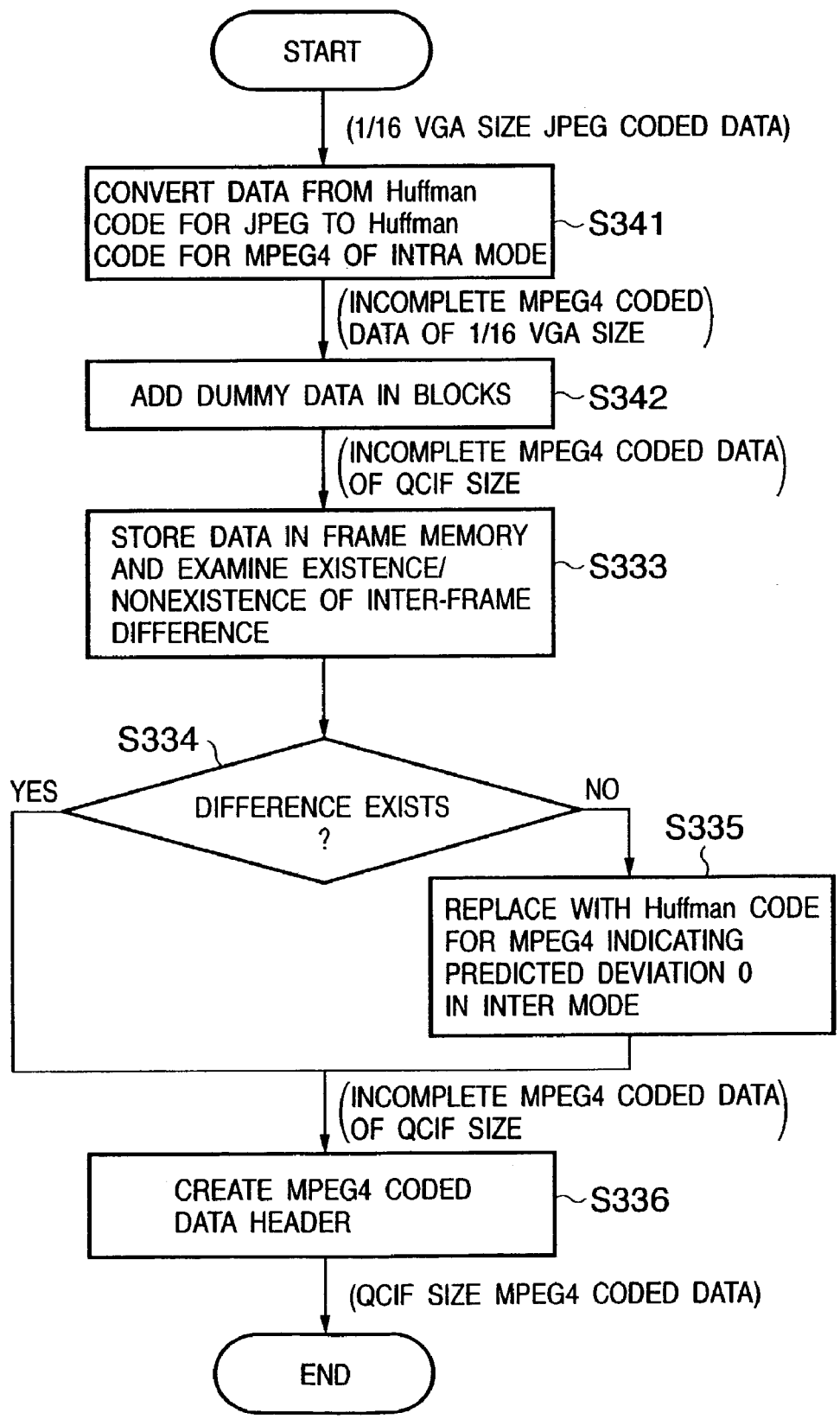
FIG. 40 is a flowchart showing conversion processing according to the thirteenth embodiment of the present invention.

FIG. 40 is a flowchart showing the procedure of the method of converting coded data by the server in which image data of the ¹⁄₁₆ VGA image display size (lateral 160 pixels and longitudinal 120 pixels) is converted to image data of the larger QCIF image display size (lateral 176 pixels and longitudinal 144 pixels) in the thirteenth embodiment.

Orthogonal conversion data is inserted in the QCIF size image area in the eleventh embodiment, while strings of Huffman codes for MPEG4 are inserted in the QCIF size image area in the thirteenth embodiment.

The Huffman coding is used as the entropy coding method in both the JPEG coding and MPEG4 coding, but an almost same procedure can be achieved for combinations of other coding methods including procedures of block division, orthogonal conversion and entropy coding.

Further, in the thirteenth embodiment described below, as in the case of the eleventh embodiment, the procedure is effective for combinations of other image display sizes as long as the image size after conversion of coding is larger than the image display size before conversion of coding.

At step S341 of FIG. 40, data is converted from the Huffman code for JPEG (Huffman code used in the JPEG coding) included in JPEG coded image data of the ¹⁄₁₆ VGA size to the Huffman code for MPEG4 of the INTRA mode (Huffman code used in INTRA mode coding of the MPEG4 image coding). Here, for achieving step S341, the contents of the table of the Huffman code for JPEG and the contents of the table of the Huffman code for MPEG4 should be known in advance, and these are previously prepared as in the case of the twelfth embodiment.

At step S342, the entire (string of Huffman codes for MPEG4 included in) image area of the ¹⁄₁₆ VGA size is inserted along any MCU borderline (more generally partial block borderline) in the QCIF size image area as shown in FIG. 38. Then, dummy data (string of Huffman codes for MPEG4 having a predetermined value) is inserted in the remaining image area, whereby incomplete (headerless) MPEG4 coded data of the QCIF size is created (more specifically, strings of Huffman codes for MPEG4 included in the QCIF size image area are created).

Steps S333 to S336 of FIG. 40 are same as those of FIG. 39, and therefore the descriptions of these steps are not presented here.

Fourteenth Embodiment

Figure 41:
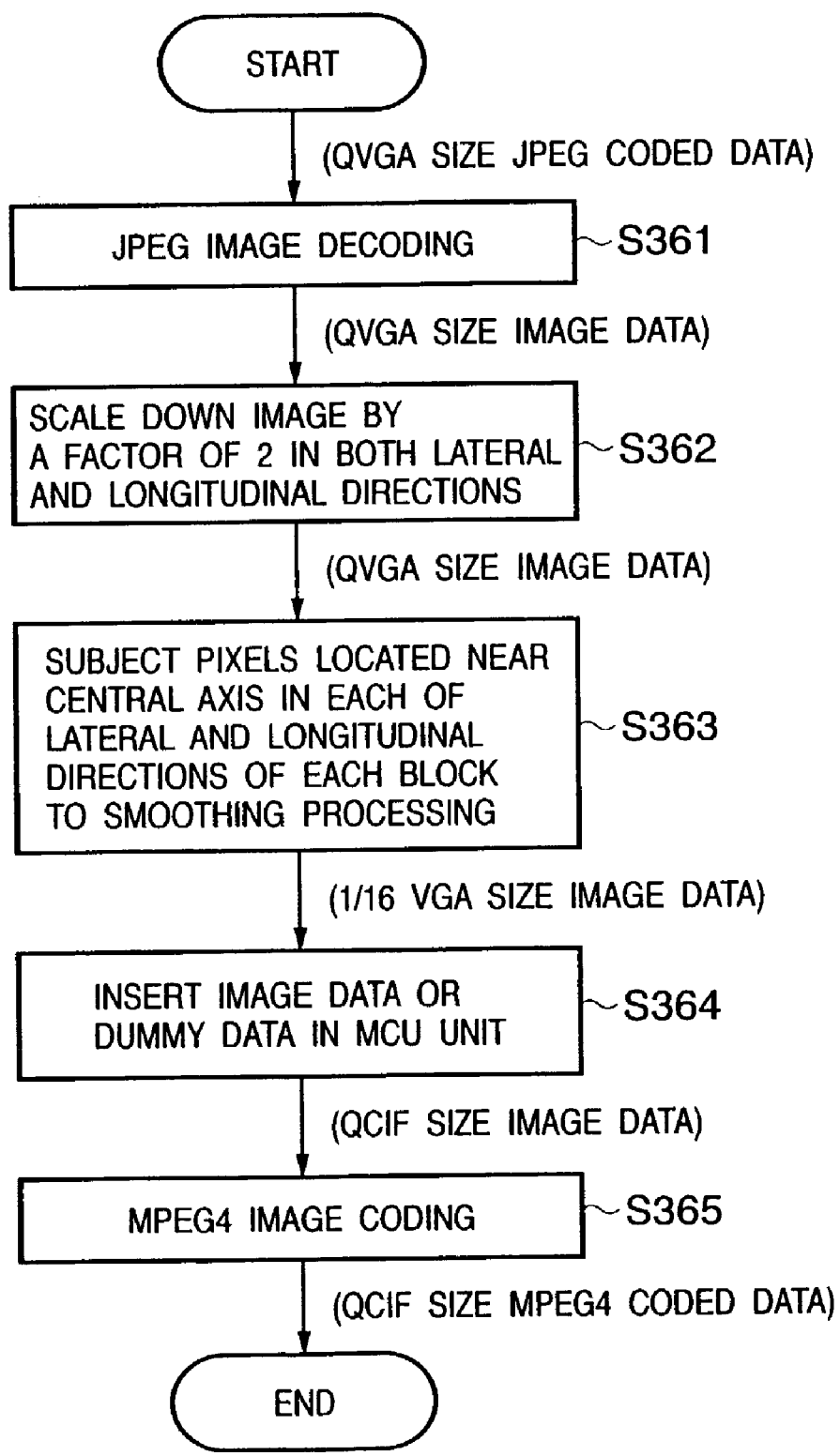
FIG. 41 is a flowchart showing conversion processing according to a fourteenth embodiment of the present invention.

FIG. 41 is a flowchart showing the procedure of the method of converting coded data by the server in which image data of the QVGA image display size (lateral 320 pixels and longitudinal 240 pixels) is converted to image data of the smaller QCIF image display size (lateral 176 pixels and longitudinal 144 pixels) in the fourteenth embodiment.

The fourteenth embodiment is different from the tenth embodiment in that the image size is reduced by a factor of 2, and dummy data is inserted before conversion of the coding method.

At step S361 of FIG. 41, JPEG coded data of the QVGA size is subjected to JPEG image decoding to create QVGA size image data.

At step S362, the image is thinned out to scale down image data by a factor of 2 (any factor allowing the image size to be reduced to a size smaller than the QCIF image size is acceptable) in both lateral and longitudinal directions, thereby creating 1/16 VGA size image data.

Figure 42:
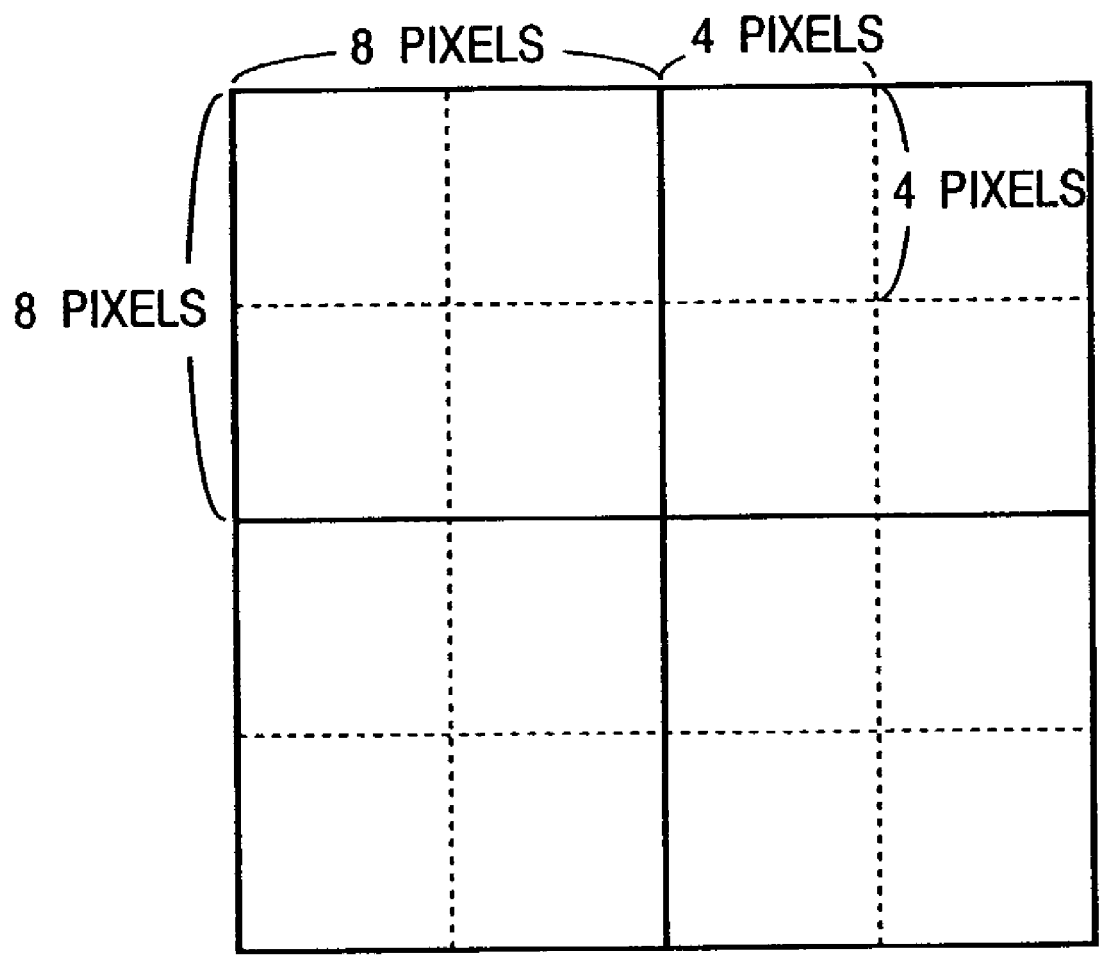
FIG. 42 shows a growth of block deformation occurring when the image size is reduced by a factor of 2 in both lateral and longitudinal directions according to the fourteenth embodiment of the present invention.

FIG. 42 shows a growth of block deformation occurring when the image size is reduced by a factor of 2 in both lateral and longitudinal directions. In this figure, block deformations caused by JPEG coding exist in the positions shown by solid lines (spaced by 8 pixels in width and by 8 lines in height). When the image is scaled down by a factor of 2 in both lateral and longitudinal directions, block deformations caused by JPEG coding are shifted to the positions shown by solid lines and dotted lines (spaced by 4 pixels in width and by 4 lines in height). In addition, when this image is subjected to MPEG4 image coding, a block deformation caused by MPEG4 image coding may be added in the position shown by the solid line. That is, an additional block deformation occurs in the position shown by the dotted line due to scaledown of the image.

Now, referring to FIG. 41 again, at step S363, each pixel located in proximity of the position shown by the dotted line (central axis in each lateral and longitudinal direction of each block) is subjected to smoothing processing for making unobtrusive the block deformation additionally occurring in the position shown by the dotted line as described with FIG. 42.

Then, at step S364, data of the entire image area of the 1/16 VGA size is inserted along any MCU borderline (more generally partial block borderline) of the QCIF size image area as shown in FIG. 38, and dummy data (image data having a predetermined value) is inserted in the remaining part, whereby QCIF size image data is created. At step S365, QCIF size image data is subjected to MPEG4 image coding to create MPEG4 coded image data of the QCIF size.

In this way, the coding conversion processing of converting data from QVGA size JPEG image data to the QCIF size MPEG image is completed.

Fifteenth Embodiment

Figure 43:
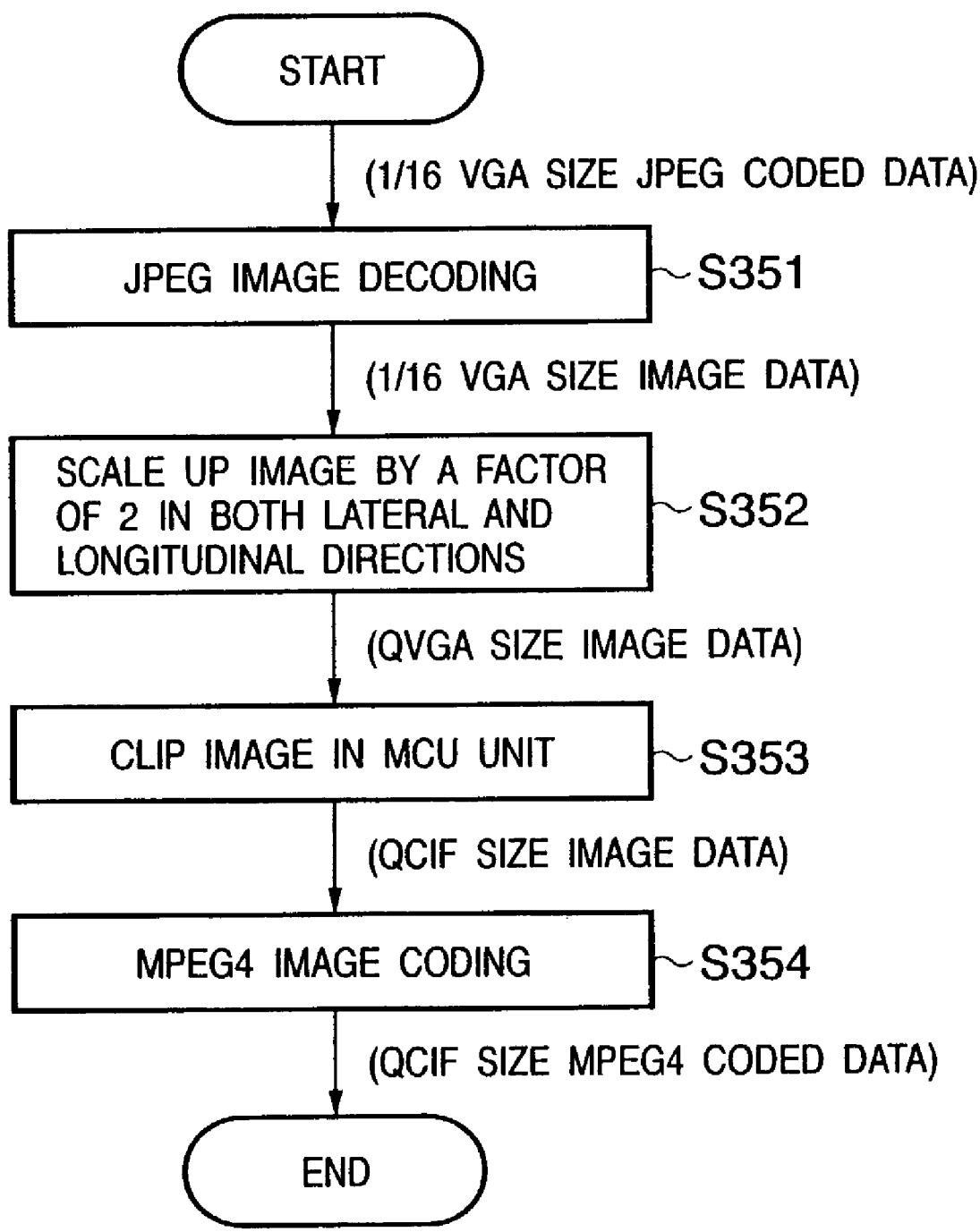
FIG. 43 is a flowchart showing conversion processing according to a fifteenth embodiment of the present invention.
Figure 44:
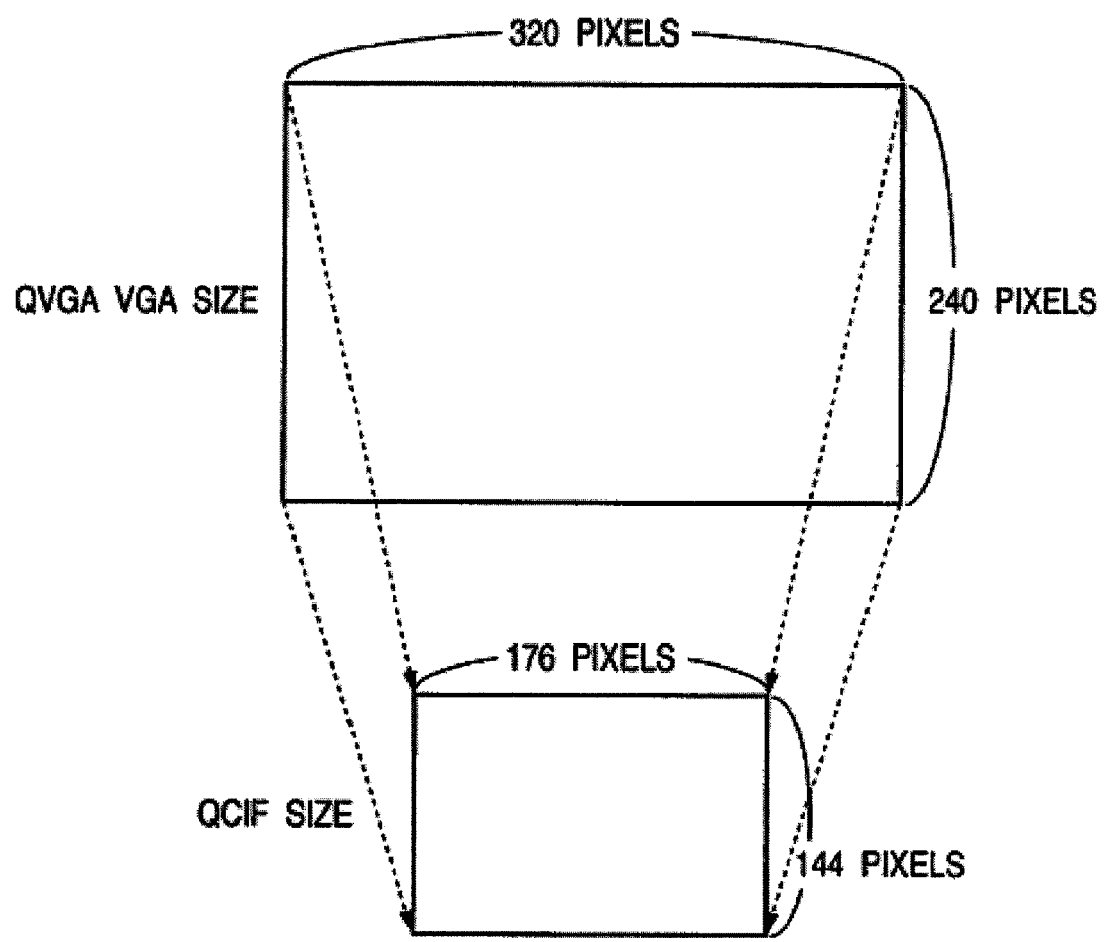
FIG. 44 illustrates the conversion of image size according to the prior art.
Figure 45:
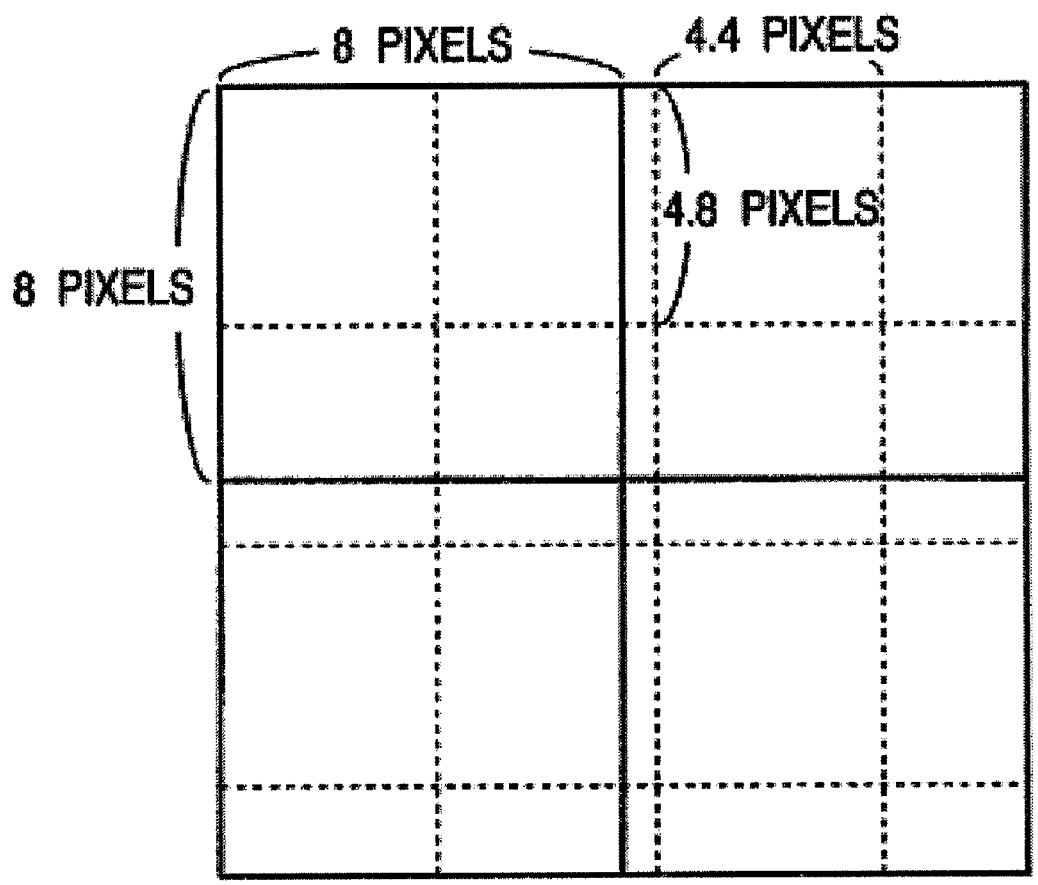
FIG. 45 illustrates the block deformation occurring when the image size is converted in the prior art.
Figure 46:
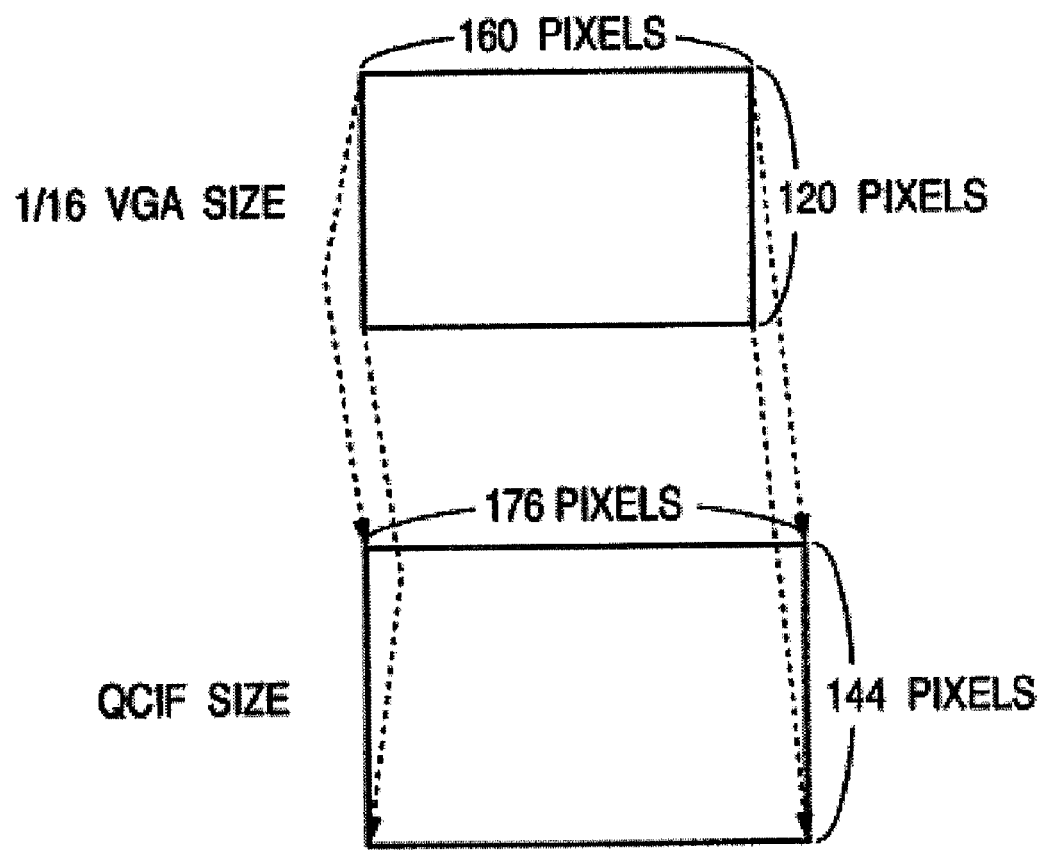
FIG. 46 illustrates the conversion of the image size in the prior art.
Figure 47:
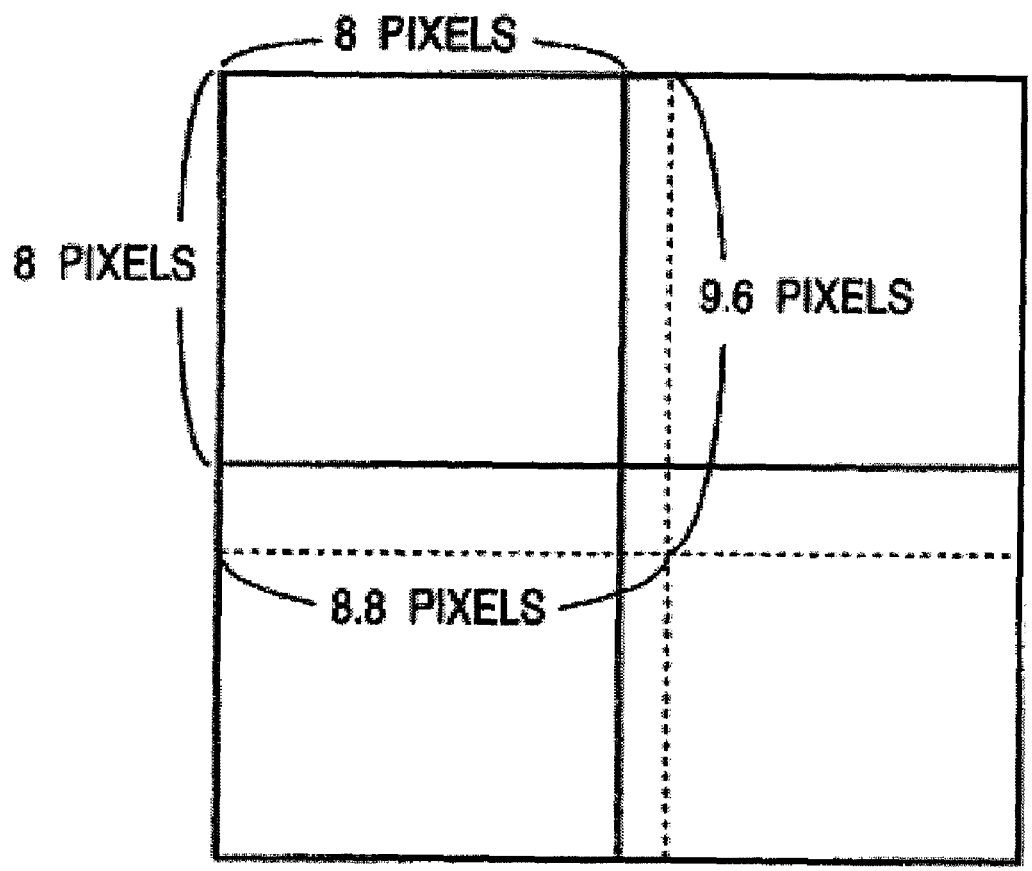
FIG. 47 illustrates the block deformation occurring when the image size is converted in the prior art.

FIG. 43 is a flowchart showing the procedure of the method of converting coded data by the server in which image data of the 1/16 VGA image display size (lateral 160 pixels and longitudinal 120 pixels) is converted to image data of the larger QCIF image display size (lateral 176 pixels and longitudinal 144 pixels) in the fifteenth embodiment.

The fifteenth embodiment is different from the eleventh embodiment in that the image size is increased by a factor of 2, and the QCIF size image is clipped from the enlarged image before conversion of the coding method.

At step S351 of FIG. 43, JPEG coded data of the QVGA size is subjected to JPEG image decoding to create QVGA size image data.

At step S352, the image is subjected to interpolation processing to scale up image data by a factor of 2 (any factor allowing the size of the data to be increased to a size larger than the QCIF image display size is acceptable), thereby creating QVGA size image data.

At step S353, as shown in FIG. 36, the QCIF size image area is clipped from the created QVGA size image data along any MCU borderline (more generally partial block borderline), whereby QCIF size image data is obtained.

At step S354, the QCIF size image data is subjected to MPEG4 image coding to create MPEG4 coded data of the QCIF size.

In this way, the coding conversion processing of converting data from 1/16 VGA size JPEG image data to the QCIF size MPEG image data is completed.

As described above, according to the tenth to fifteenth embodiments, measures are taken to prevent the block border line from being shifted before and after conversion wherever possible when coded data is converted to a different format, thereby making it possible to suppress degradation in image quality by block deformation caused by the conversion.

Other Embodiment

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network) can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

The present invention is not limited to the above embodiments and various changes and modifications can be made within the spirit and scope of the present invention. Therefore to apprise the public of the scope of the present invention, the following claims are made.

What is claimed is:

1. An image processing apparatus comprising:
   an image information reception unit adapted to receive image information compressed by a first compression method suitable for a first terminal from an image sensing apparatus;
   an expansion unit adapted to expand the image information of the first compression method received by said image information reception unit;
   a database adapted to store a plurality of pieces of information relating to a position at which information other than the image information expanded by said expansion unit is superimposed and relating to a size of the information other than the image information, the stored information corresponding to current time and control information of the image sensing apparatus including at least one of pan angle, tilt angle and zoom scaling factor;
   an image processing unit adapted to acquire information relating to the position and the size corresponding to a current position and control information from said database and superimpose information other than the image information on the image information expanded by said expansion unit in accordance with the acquired information relating to the position and the size;
   a compression unit adapted to compress the expanded image information on which the information other than the image information is superimposed, by a second compression method suitable for a second terminal which is different from the first compression method; and
   an image information delivering unit adapted to deliver the image information compressed by the second compression method to the second terminal which is different from the first terminal.

2. The image processing apparatus according to claim 1, wherein said image processing unit superimposes the information other than the image information on the expanded image information for a time period over which an operation of said image sensing apparatus is controlled.

3. The image processing apparatus according to claim 1, wherein said image processing unit superimposes the information other than the image information on the expanded image information for a time period until the image processing apparatus establishes connection with said image sensing apparatus.

4. An image processing method comprising:
   receiving image information of a first compression type suitable for a first terminal from an image sensing apparatus;
   expanding the received image information of the first compression type;
   acquiring information relating to a position and a size corresponding to a current position and control information from a database which stores a plurality of pieces of information relating to the position at which information other than the image information expanded by said expansion unit is superimposed and relating to the size of the information other than the image information, the stored information corresponding to current time and the control information of the image sensing apparatus including at least one of pan angle, tilt angle and zoom scaling factor;
   superimposing information other than the image information on the expanded image information in accordance with the acquired information relating to the position and the size;
   compressing the expanded image information on which the information other than the image information is superimposed onto image information of a second compression type which is different from the first compression type; and
   delivering the converted image information to a second terminal different from the first terminal.

5. A computer readable medium encoded with a computer program for carrying out the image processing method of claim 4.

6. An image processing apparatus comprising:
   an image information reception unit adapted to receive compressed image information from an image sensing apparatus;
   an expansion unit adapted to expand the compressed image information received by said image information reception unit;
   a database adapted to store a plurality of pieces of information relating to a position at which information other than the image information expanded by said expansion unit is superimposed or relating to a size of the information other than the image information, the stored information corresponding to current time and control information of the image sensing apparatus including at least one of pan angle, tilt angle and zoom scaling factor;
   an image processing unit adapted to acquire information relating to a position or a size corresponding to the current position and the control information from said database and superimpose information other than the image information on the image information expanded by said expansion unit in accordance with the acquired information relating to the position or the size;
   a compression unit adapted to compress the expanded image information on which the information other than the image information is superimposed; and
   an image information delivering unit adapted to deliver the compressed image information to a terminal.

7. An image processing method comprising:
   receiving compressed image information from an image sensing apparatus;
   expanding the received compressed image information;
   acquiring information relating to a position and a size corresponding to a current position and control information from a database which stores a plurality of pieces of information relating to the position at which information other than the image information expanded by said expansion unit is superimposed or relating to the size of the information other than the image information, the stored information corresponding to current time and control information of the image sensing apparatus including at least one of pan angle, tilt angle and zoom scaling factor;
   superimposing information other than the image information on the expanded image information in accordance with the acquired information relating to the position or the size;
   compressing the expanded image information on which the information other than the image information is superimposed; and delivering the compressed image information to a terminal.

8. A computer readable medium having computer executable instructions stored thereon for carrying out the image processing method of claim 7.

* * * * *